United States Patent
Dye et al.

(10) Patent No.: US 6,518,965 B2
(45) Date of Patent: Feb. 11, 2003

(54) GRAPHICS SYSTEM AND METHOD FOR RENDERING INDEPENDENT 2D AND 3D OBJECTS USING POINTER BASED DISPLAY LIST VIDEO REFRESH OPERATIONS

(75) Inventors: Thomas A. Dye, Austin, TX (US); Peter D. Geiger, Austin, TX (US); Manuel J. Alvarez, II, Austin, TX (US)

(73) Assignee: Interactive Silicon, Inc., Austin, TX (US)

( * ) Notice: Subject to any disclaimer, the term of this patent is extended or adjusted under 35 U.S.C. 154(b) by 0 days.

(21) Appl. No.: 09/971,107

(22) Filed: Oct. 4, 2001

(65) Prior Publication Data

US 2002/0158865 A1 Oct. 31, 2002

Related U.S. Application Data

(63) Continuation of application No. 09/291,366, filed on Apr. 14, 1999.
(60) Provisional application No. 60/083,177, filed on Apr. 27, 1998.

(51) Int. Cl.$^7$ ............................................. G06T 15/00
(52) U.S. Cl. ..................................................... 345/419
(58) Field of Search ................................ 345/419, 420, 345/421, 619, 620, 426, 428

(56) References Cited

U.S. PATENT DOCUMENTS

| | | | |
|---|---|---|---|
| 4,868,557 A | 9/1989 | Perlman | 340/799 |
| 4,967,375 A | 10/1990 | Pelham et al. | 364/518 |
| 5,043,714 A | 8/1991 | Perlman | 340/750 |
| 5,295,235 A | 3/1994 | Newman | 395/133 |
| 5,838,334 A | 11/1998 | Dye | 345/503 |
| 5,977,987 A | 11/1999 | Duluk, Jr. | 345/441 |

FOREIGN PATENT DOCUMENTS

| | | |
|---|---|---|
| WO | 97/05575 | 2/1997 |

*Primary Examiner*—Phu K. Nguyen
(74) *Attorney, Agent, or Firm*—Jeffrey C. Hood

(57) ABSTRACT

A spanning based method for rendering and display of 3D graphical data on a display device. The method first parses the geometry data, generates independent vertex-sorted geometric primitives (e.g., triangles) and then performs setup on the geometric primitives. The method then computes horizontal segments that make up each triangle, performs a Y sort of the triangles for each span line, and performs an X sort of triangle segments and vertices for each span line. The method then performs a Z rules determination for each span line to discard or reject hidden segments. The method then constructs the 3-D VDRL list for each span line comprising pointers which reference viewed triangle spans. During execution, the 3-D VDRL is read and interpreted to generate pixel data. The pixel data includes the viewed triangle spans and may include texture data or other data referenced by the VDRL.

42 Claims, 32 Drawing Sheets

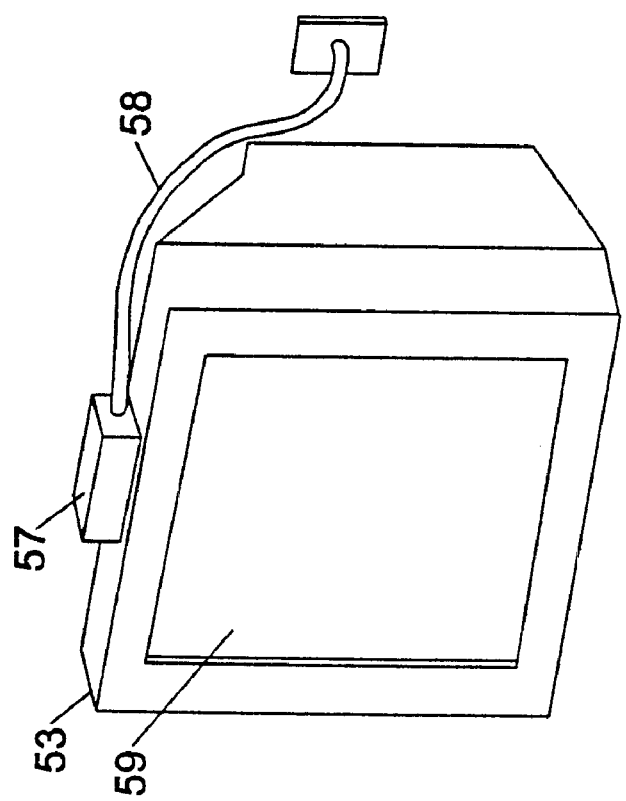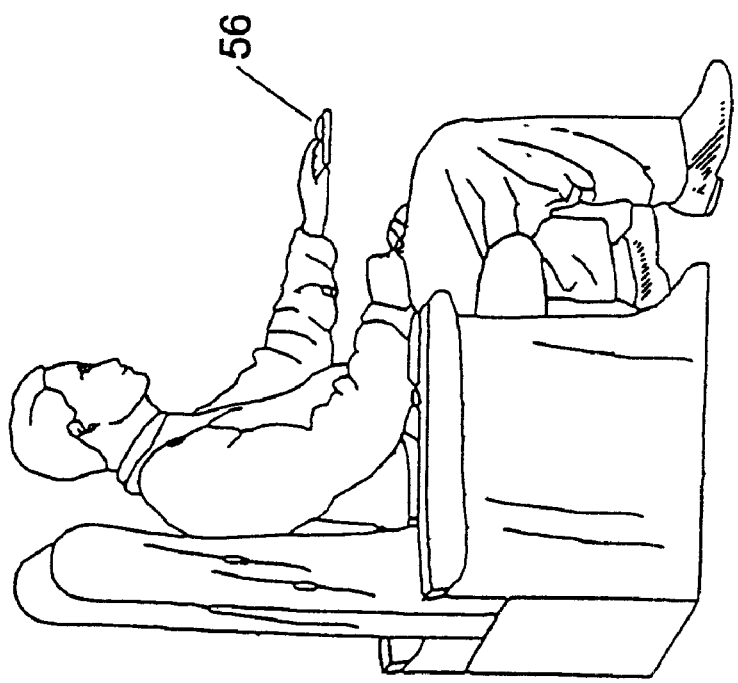
FIG. 1B

| Load Sort Array: | 5,@p1 | 7,@p2 | 2,@p3 | 8,@p4 | 1,@p5 | 5,@p6 | 4,@p7 | 3,@p8 |
|---|---|---|---|---|---|---|---|---|
| Clock cycle 1: | + | | + | | + | | + | |
| Clock cycle 2: | 5,@p1 | 7,@p2 | 2,@p3 | 8,@p4 | 1,@p5 | 5,@p6 | 3,@p8 | 4,@p7 |
| | | − | | − | | − | | |
| Clock cycle 3: | 5,@p1 | 2,@p3 | 7,@p2 | 1,@p5 | 8,@p4 | 3,@p8 | 5,@p6 | 4,@p7 |
| Clock cycle 4: | 2,@p3 | 5,@p1 | 1,@p5 | 7,@p2 | 3,@p8 | 8,@p4 | 4,@p7 | 5,@p6 |
| | | − | | − | | − | | |
| Clock cycle 5: | 2,@p3 | 1,@p5 | 5,@p1 | 3,@p8 | 7,@p2 | 4,@p7 | 8,@p4 | 5,@p6 |
| Clock cycle 6: | 1,@p5 | 2,@p3 | 3,@p8 | 5,@p1 | 4,@p7 | 7,@p2 | 5,@p6 | 8,@p4 |
| Clock cycle 7: (First, All True) | 1,@p5 | 2,@p3 | 3,@p8 | 4,@p7 | 5,@p1 | 5,@p6 | 7,@p2 | 8,@p4 |
| | + | + | + | + | 0 | + | + | + |
| Clock Cycle 8 (All True, END) | 1,@p5 | 2,@p3 | 3,@p8 | 4,@p7 | 5,@p1 | 5,@p6 | 7,@p2 | 8,@p4 |

FIG. 9

Totally Visible Span Segments

Totally Hidden Span Segments

Case 0

Case #1

Case #2

Case #3

Casa #4

Case #5A

Case #5B

Case #5C

Case #6

Case #7

Case #8

Case #9A

FIG. 27 Case #9B-1 and Case #9B-2

GRAPHICS SYSTEM AND METHOD FOR RENDERING INDEPENDENT 2D AND 3D OBJECTS USING POINTER BASED DISPLAY LIST VIDEO REFRESH OPERATIONS

PRIOR DATA

This application is a continuation of Ser. No. 09/291,366 titled "Graphics System and Method for Rendering Independent 2D and 3D Objects Using Pointer Based Display List Video Refresh Operations" which was filed on Apr. 14, 1999, whose inventor was listed as Thomas A. Dye, which claims benefit of priority of provisional application Ser. No. 60/083,177 titled "Graphics System and Method for Rendering Independent 2D and 3D Objects Using Pointer Based Display list Video Refresh Operations" which was filed on Apr. 27, 1998, whose inventor was Thomas A. Dye.

CROSS REFERENCES TO RELATED APPLICATIONS

The following applications are related to the present application, and are hereby incorporated by reference as though fully and completely set forth herein:

Ser. No. 08/340,667 titled "Integrated Video and Memory Controller With Data Processing and Graphical Processing Capabilities" and filed Nov. 16, 1994;

Ser. No. 08/463,106 titled "Memory Controller Including Embedded Data Compression and Decompression Engines" and filed Jun. 5, 1995;

Ser. No. 08/916,464 titled "Memory Controller Including Embedded Data Compression and Decompression Engines" and filed Aug. 8, 1997;

Ser. No. 09/241,139 titled "Memory Controller Including Embedded Data Compression and Decompression Engines" and filed Feb. 1, 1999;

Ser. No. 08/565,103 titled "Memory and Graphics Controller Which Performs Pointer-Based Display List Video Refresh Operations" and filed Nov. 30, 1995, which has issued as U.S. Pat. No. 5,838,334;

Ser. No. 08/770,017 titled "System and Method for Simultaneously Displaying a Plurality of Video Data Objects Having Different Bit Per Pixel Formats" and filed Dec. 19, 1996;

Ser. No. 08/604,670 titled "Graphics System Including a Virtual Frame Buffer Which Stores Video/Pixel Data in a Plurality of Memory Areas" and filed Feb. 21, 1996;

Ser. No. 09/056,021 titled "Video/Graphics Controller Which Performs Pointer-Based Display List Video Refresh Operations" filed on Apr. 6, 1998;

Ser. No. 09/239,659 titled "Bandwidth Reducing Memory Controller Including Scalable Embedded Parallel Data Compression and Decompression Engines" whose inventors are Thomas A. Dye, Manuel J. Alvarez II, and Peter Geiger, and filed on Jan. 29, 1999.

FIELD OF THE INVENTION

The present invention relates to computer system graphics architectures, and more particularly to a graphics controller which performs pointer-based display list video operations to build and manipulate two and three dimensional objects and transfer the objects video data from a memory to a display device.

DESCRIPTION OF THE RELATED ART

Since their introduction in 1981, the architecture of personal computer systems has remained substantially unchanged. The current state of the art in computer system architectures includes a central processing unit (CPU) which couples to a memory controller interface that in turn couples to system memory. The computer system also includes a separate graphical interface for coupling to the video display. In addition, the computer system includes input/output (I/O) control logic for various I/O devices, including a keyboard, mouse, floppy drive, hard drive, etc.

In general, the operation of a modern computer architecture is as follows. Programs and data are read from a respective I/O device such as a floppy disk or hard drive by the operating system, and the programs and data are temporarily stored in system memory. Once a user program has been transferred into the system memory, the CPU begins execution of the program by reading code and data from the system memory through the memory controller. The application code and data are presumed to produce a specified result when manipulated by the system CPU. The code and data are processed by the CPU and data is provided to one or more of the various output devices. The computer system may include several output devices, including a video display, audio (speakers), printer, etc. In most systems, the video display is the primary output device.

Graphical output data generated by the CPU is written to a graphical interface device for presentation on the display monitor. The graphical interface device may simply be a video graphics array (VGA) card, or the system may include a dedicated video processor or video acceleration card including separate video RAM (VRAM). In a computer system including a separate, dedicated video processor, the video processor includes graphics capabilities to reduce the workload of the main CPU. Modern prior art personal computer systems typically include a local bus video system based on either the peripheral component interconnect (PCI) bus or the VESA (Video Electronics Standards Association) VL bus, or perhaps a proprietary local bus standard. The video subsystem is generally positioned on a local bus near the CPU to provide increased performance.

Therefore, in summary, program code and data are first read from the hard disk to the system memory. The program code and data are then read by the CPU from system memory, the data is processed by the CPU, and graphical data is written to the video RAM in the graphical interface device for presentation on the display monitor. The CPU typically reads data from system memory across the system bus and then writes the processed data or graphical data back across the system bus to the I/O bus or local bus where the graphical interface device is situated. The graphical interface device in turn generates the appropriate video signals to drive the display monitor. It is noted that this operation requires data to make two passes across the system bus and/or the I/O subsystem bus. In addition, the program that manipulates the data must also be transferred across the system bus from the main memory. Further, two separate memory subsystems are required, the system memory and the dedicated video memory, and video data is constantly being transferred from the system memory to the video memory frame buffer.

One recent trend in computer system architecture and design is referred to as a "shared" or "unified" memory, also referred to as a unified memory architecture (UMA). In this architecture, the main or system memory is used for operating system and applications software as well as for the video frame buffer. However, one problem with the "unified" or "shared" memory approach is the perceived need for additional bandwidth to perform video functions such as bit block transfers and video refresh, rasterization and display of three dimensional objects, as well as CPU manipulation of programs and data within the same memory subsystem.

Current 3D display system use a method called the "immediate" mode to render 3D objects. This mode draws a single triangle at a time checking a Z-buffer and reading a texture map or other source data to cover each single triangle. This prior art requires increased memory bandwidth due to triangles that are completely drawn and new triangles that overlap or hide previously drawn triangles. UMA architectures that use immediate mode 3D will be slower and lower performance due to these limitations.

Computer systems are being called upon to perform larger and more complex tasks that: require increased computing power. In addition, modern software applications require computer systems with increased graphics capabilities. Modem software applications typically include graphical user interfaces (GUIs) which place increased burdens on the graphics capabilities of the computer system. Further, the increased prevalence of multimedia applications, such as digital video and 3D graphics, also demands computer systems with more powerful graphics capabilities. Therefore, a new computer system and method is desired which provides increased system performance while reducing system cost, in particular, increased video and 2D/3D graphics performance than that possible using prior art.

SUMMARY OF THE INVENTION

The present invention comprises a video, 2D and 3D graphics controller, also referred to as the Integrated Memory Controller (IMC), which includes a novel spanning based system and method for rendering and display of 2D and 3D graphical data on a display device or video monitor, preferably using the main system memory in a unified or shared manner. The novel object based and spanning based display refresh list system for display of 2D and 3D graphical data can also be used within a graphics adapter with it's own local memory system. The IMC performs pointer-based display list video operations for rendering of 2D and 3D video data. The graphics controller of the present invention minimizes data movement for 2D/3D and video data manipulation for video display updates and thus greatly increases system performance. The graphics system uses a list of object pointers to assemble the output display. The objects may reside in virtual locations such as memory or across LAN or WAN communication links and be of any data type (i.e. graphics, video, audio, or control) or color format. In addition, objects use a virtual addressing system for the display output which allows unrestricted movement on the display surface without actual data movement required in prior art frame buffer systems. The IMC is capable of manipulating 3D graphical data similar to streaming video sources. This makes the invention well suited for display and manipulation of environments where 3D graphics and streaming video formats are mixed. In the preferred embodiment, the IMC transfers data between the CPU local bus and system memory and also transfers data between the system memory and the video display output. The IMC may eliminate the need for one or more of a separate 2D/3D graphics, audio, video, and telephony and core logic subsystems.

The IMC uses techniques to improve overall system performance and user response time by use of the main system memory as a virtual graphical frame buffer and program/data storage. The IMC includes a unique system level architecture that reduces data bandwidth requirements for general media input/output functions. Because the host CPU is not required to move data between main memory and the graphics, audio and/or telephony subsystems as in conventional computers, data can reside virtually in the same subsystem as the main memory. Therefore, for media output data (audio, video, telephony) the host CPU or DMA master is not limited by external available proprietary bus bandwidth, thus improving overall system throughput.

The integrated memory controller (IMC) preferably includes an advanced memory controller, 2D/3D graphics, audio, video, and optionally telephony processing capabilities. The 3D graphics capabilities of the IMC include numerous significant advances that provide greatly increased performance over prior art systems. The memory controller (IMC) of the present invention may sit on the main CPU bus, (not limited to that bus) or a high-speed system peripheral bus such as the PCI or the accelerated graphics peripheral (AGP) bus. The IMC includes one or more symmetric memory ports for connecting to system memory. The IMC also includes video outputs, (where the term "video outputs" may be used to refer to display output to drive the output display device) preferably RGB (red, green, blue) outputs as well as NTSC, HDTV or PAL video plus horizontal and vertical synchronization signal outputs. These signals directly drive the video display monitor. The IMC may also include one or more video outputs, preferably (but not limited to) industry standard RGB, YUV, NTSC, PAL, HDTV and flat panel display interfaces. The IMC also may include numerous other interfaces for video, audio, Internet and/or telephony devices, among others The IMC includes a novel system and method for manipulating and rendering 3D graphics. The IMC first operates to construct a 3-D Virtual display refresh list (3-DVDRL) in system memory. The IMC then executes the 3-D VDRL by reading the VDRL and generating and/or accessing the appropriate pixel data from system memory to construct an image or display objects. For example, execution of the 3-D VDRL causes the generated pixel data to be stored in memory as an image.

After the IMC executes the 3-D VDRL, the IMC may then create a separate 2-D VDRL which references the pixel data, and then execute the 2-D VDRL to render the pixel data on the screen. In alternate embodiments the 2-D VDRL and or 3-D VDRL may be created outside the IMC by an external CPU or computing device. Alternatively, the IMC stores the pixel data generated by execution of the 3-D VDRL in a conventional frame buffer and performs a refresh of the frame buffer to render the pixel data on the screen. The IMC may also provide the pixel data directly to a rendering engine for real time display after executing the 3-D VDRL.

The IMC operates to construct the 3-D VDRL by first parsing the 3D object and generating independent vertex-sorted geometric primitives and then performing setup on the geometric primitives. Geometric primitives may comprise trapezoids, splines, triangles, lines or points, and are generically termed polygons or triangles within this disclosure. This includes assembling a list of parameters for each of the triangle vertices and determining slope values for the triangle edges. The IMC uses 3D vertex and slope information to compute horizontal segments that make up each triangle, The IMC then performs a Y sort of the triangles for each span line, and an X sort of triangles segments and vertices for each span line. The Y sort operates to sort triangles by minimum Y position as well as the minimum Y vertex for each triangle. For each span line, triangle segments are generated and X sorted based on starting X position of triangles for each segment. Span lines are horizontal line of pixels that run the entire length of the display device and segments are portions of the span line that represent horizontal triangle start to stop segments for a respective triangle. After the Y and X sorts, the IMC performs a Z rules determination for each span line. The Z rules determination, determines the segments that are visible, and discards those segments that are hidden, i.e., is used to reject the now one-dimensional triangle segments that are hidden by other triangle segments.

The IMC or attached CPU then constructs a 3-D VDRL list for each span line comprising pointers which reference viewed triangle spans. The 3-D VDRL comprises pointers which reference viewed triangle spans. Thus, the 3D geometry is flattened to a one dimensional set of triangle segments for a plurality of triangles and a plurality of span lines, and the information for source textures, position, and 3D attributes is stored within the 3-D VDRL.

The 3-D VDRL is then executed. More specifically, the 3-D VDRL is read and interpreted for triangle parameter data, texture address, attributes and other control information. The 3D graphics engine then renders all the triangle segments for multiple triangles for an entire span line as indicated in the 3-D VDRL. During execution of the 3-D VDRL, the 3-D VDRL is fetched for instructions and pointers to control the rasterization of the output image by the 3D engine. Execution of the 3-D VDRL may cause rasterization of the output image to the memory on to the display device.

BRIEF DESCRIPTION OF THE INVENTION

A better understanding of the present invention can be obtained when the following detailed description of the preferred embodiment is considered in conjunction with the following drawings, in which:

FIG. 1B illustrates a television system, including a set top box, wherein one or more of the television or set top box include the present invention;

FIG. 9 illustrates an example that shows a simple 8 term sort with the IMC fast-sort algorithm;

Figure 1A:
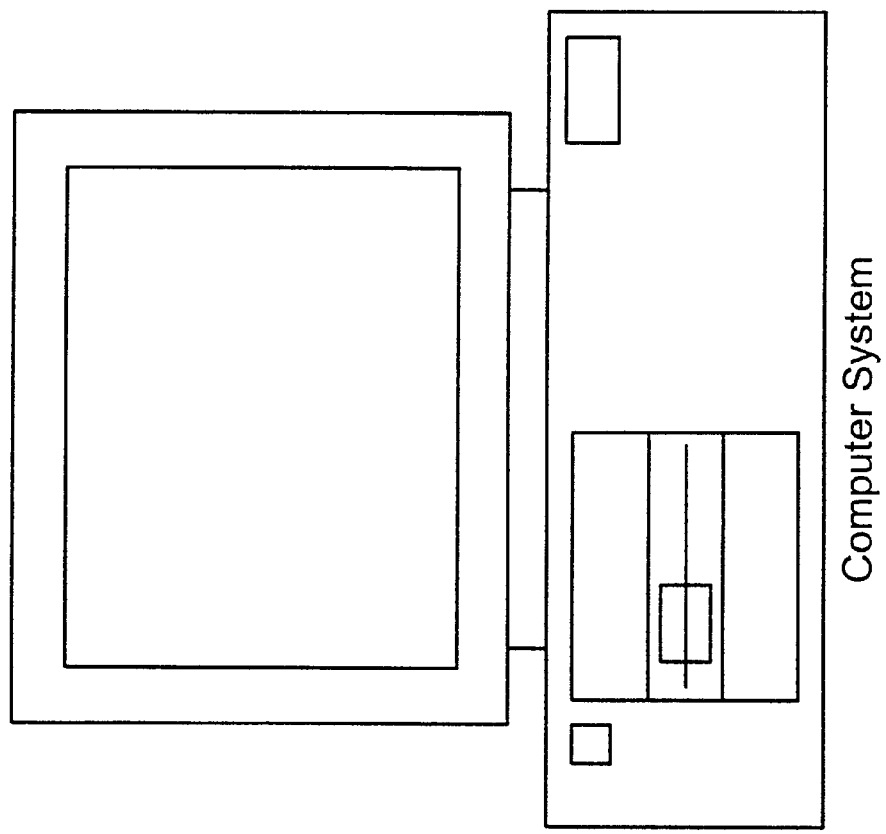
FIG. 1A illustrates a computer system which includes the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENT

The present invention comprises a graphic or video system and method which performs graphics/video functions with improved performance and/or more efficiency. The system and method of the present invention, referred to as the Interactive Media Controller or Integrated Memory Controller (IMC) may be used in any of various types of systems. In general, the present invention may be used in any type of system which includes a display device or display screen for displaying video images, such as analog or digital television, interactive television, computer systems which include video display monitors including computer systems which include LCD screens or flat panel screens, personal digital assistant devices (PDAs), consumer or Internet appliances, and other systems where video and/or graphics images or information are displayed to a user.

The assembly and execution of 2D VDRLs is discussed in U.S. Pat. No. 5,838,334. The description that follows concentrates on the 3D portion of draw and rasterization.

FIGS. 1A and 1B—Example System and Display Device Embodiments

FIG. 1A illustrates a computer system 40 which includes the present invention. As shown, the computer system 40 includes a system unit comprising various standard computer components including the IMC system and method of the present invention. The system unit couples to a display device, in this case a computer system video monitor. It is noted that the present invention may be used in other types of computer systems, including laptops, network computers, web PCs, Internet appliances, etc.

FIG. 1B illustrates a television system which includes the IMC system and method of the present invention. In FIG. 1B, the television system 53 includes a display screen 59. The television system also preferably includes a set top box 57 which couples through a cable, such as a fiber optic cable or coaxial cable, for receiving video images for display on the television screen 59. The IMC of the present invention may be comprised in the television system unit 53 and/or may be comprised in the set top box 57. In other words, the IMC may be comprised in the set top box 57, or the IMC of the present invention may be integrated into the television, wherein the set top box 57 is optionally not included.

The television system 53 is preferably a digital television. Alternatively, the television 53 is an analog television, wherein the set top box 57 operates to receive and/or store digital video data and provide analog video signals to the analog television. The television system 53 may also be adapted for interactive television or Internet applications, e.g., WebTV. In this case, the set top box includes a return path, such as a POTS telephone, ISDN, or DSL connection, for return data.

Therefore, the IMC of the present invention may be comprised in any of various types of systems. As used herein, the term "system" is intended to include any of various types of computer systems, including desk top computer systems, portable computer systems, network computers, web PCs, mainframes, dumb terminals, etc. The term "system" also includes any of various types of television systems, such as analog or digital television systems, set top boxes, interactive television systems, and combined computer/television systems. The term "system" further includes other types of systems which include a display screen or display device such as Internet appliances, consumer computing appliances, personal digital assistants (PDAs), and other devices which include a display screen. As used herein, the term "display device" is intended to include computer system video monitors, television screens, flat panel displays, liquid crystal displays, (LCDS) and other types of display systems or display technology for displaying 2D/3D graphics, video, textual or other types of images or information.

In one embodiment, the IMC of the present invention is comprised as a set top box controller chip which may operate to provide a digital signal to a digital television, or may operate to convert digital audio and video signals to an analog output for receipt by existing television sets. The digital audio and video signals are preferably received through the cable signal or through wireless communications. This set top box controller chip enables consumers to extend the life of current television sets, while enjoying the increased functionality of digital technology, including multiple picture-in-picture, 3-D video, 3-D positional audio, and high quality pictures. The IMC set top box of this embodiment is also capable of delivering non-digital signals to digital ready television sets, thus allowing buyers the opportunity to purchase digital capable television sets to prepare for future technology without jeopardizing the entertainment value of today's programming.

In an alternate embodiment, the IMC of the present invention is comprised as an embeddable controller for being integrated within a digital or analog television set. In other words, this controller is embedded directly within a digital or analog television set, thereby producing an "IMC-TV." This operates to supplant the set top box requirement. Alternatively, the IMC controller may be comprised in a digital set top box which is used in conjunction with a digital television set. In either case, the IMC digital set top box or IMC digital TV operates to provide full digital functionality including accommodations for a wide array of FCC mandated video formats. The IMC of the present invention allows a television set or a computer display to operate with a plurality of different input sources. For example, movies that were filmed at 24 frames per second in wide screen formats can be displayed simultaneously with live video at 60 frames per second on the same display device. This enables a digital TV to achieve the same display level as, or a greater display level than, current computer systems.

Figure 2A:
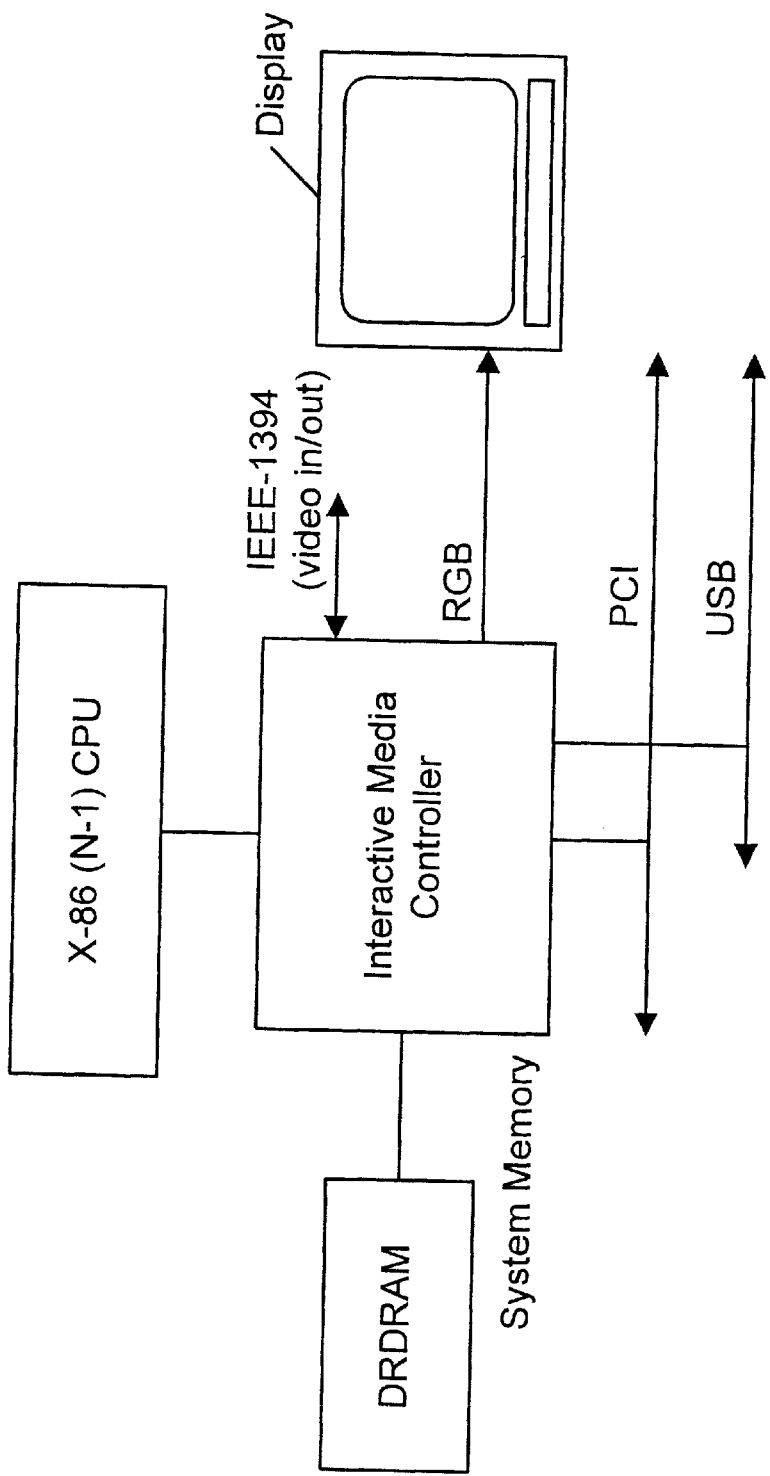
FIG. 2A is a simple block diagram of a computer system including an interactive media controller (IMC) according to the present invention.
Figure 2B:
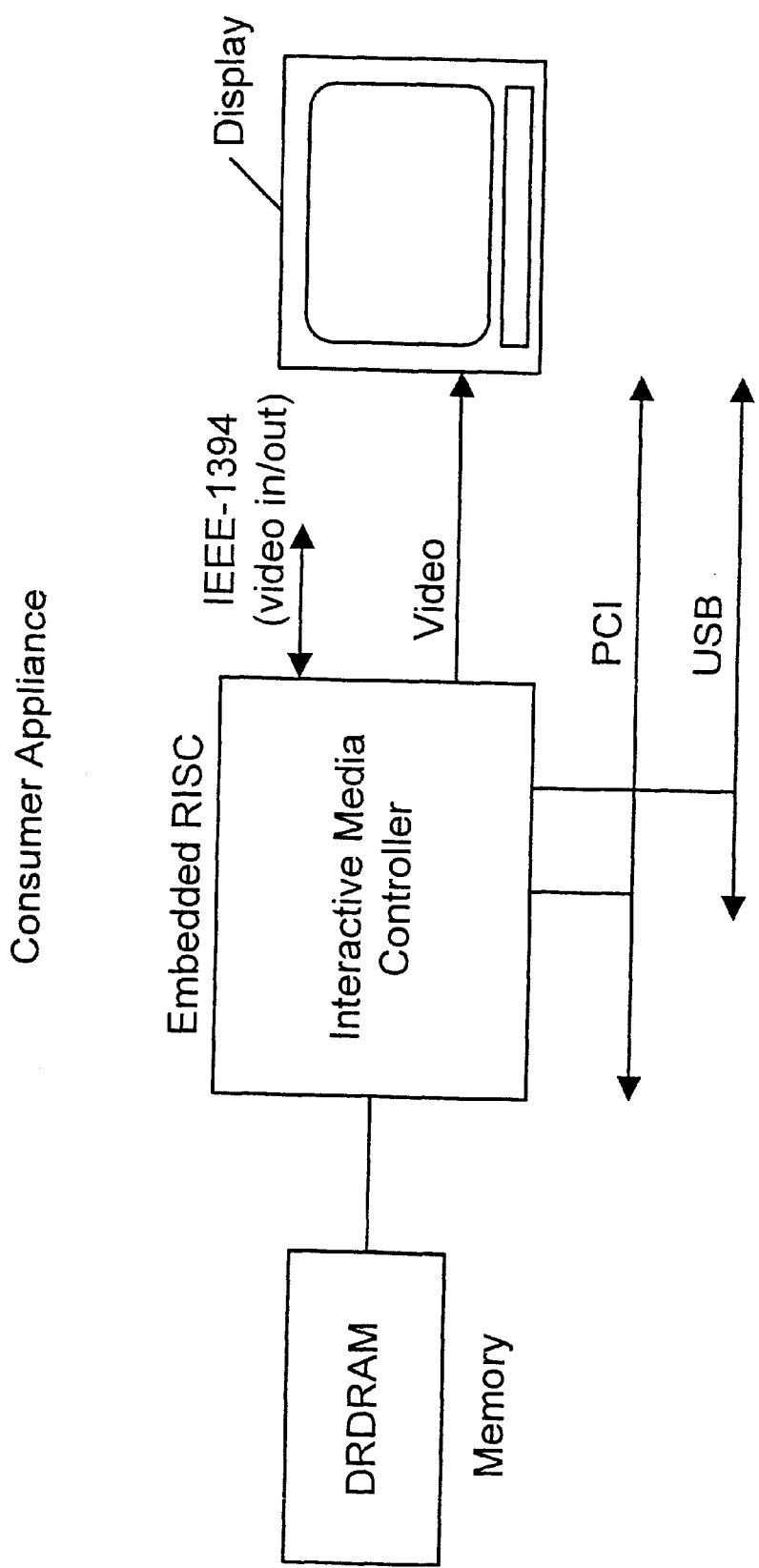
FIG. 2B is a simple block diagram of a consumer appliance including an interactive media controller (IMC) according to the present invention.

FIGS. 2A and 2B—Example IMC Block Diagrams

FIG. 2A is a block diagram illustrating a basic computer system architecture including the IMC of the present invention. FIG. 2A illustrates, for example, a low cost PC reference platform. As shown, the IMC of the present invention couples to a CPU 102, preferably an X86 CPU as shown. The CPU 102 may be any of various types, including X86, RISC, PowerPC, Sparc, or others. The CPU 102 may also comprise a microcontroller, FPGA, or other programmable logic.

In one embodiment, the IMC 140 includes an internal CPU core or RISC core, and thus external CPU 102 is not required. In this embodiment, the internal CPU core or RISC core within the IMC 140 operates to execute control code and/or system level software without the need for external CPU 102. Thus the term "CPU" is intended to encompass external CPU 102 as well as a CPU core or processing core comprised in the IMC 140.

The IMC 140 also couples directly to a memory 110. The memory 110 is preferably a system memory for storing applications and data used by the CPU 102. The memory 110 also preferably stores video/pixel data, and for 3-D graphics application stores various types of 3-D graphics data.

The IMC 140 further couples to a display 142 which is a computer video monitor or other type of display device. As shown, the IMC 140 is preferably operable to receive video input/output signals such as, for example, an IEEE-1394 connection for coupling through the IEEE-1394 serial bus to one or more video devices. The IMC 140 also preferably includes one or more other I/O bus interfaces including, for example, a Peripheral Component Interconnect (PCI) bus and a Universal Serial Bus (USB) among others.

FIG. 2B illustrates a simple block diagram of a consumer appliance utilizing the IMC of the present invention. Elements in FIG. 2B which are similar or identical to those in FIG. 2A have the same reference numerals for convenience. The consumer appliance may comprise a television, Internet appliance, set top box, or other device.

As shown, the IMC 140 couples to a memory 110, e.g., a DRDRAM. The IMC 140 also provides video to a display device 142 such as a television screen, computer video monitor, flat panel display, or other type of display device. The IMC 140 further includes a video input/output port as well as connections for coupling to a PCI bus and a USB as shown. In the embodiment of FIG. 2B, the IMC 140 optionally includes an internal CPU core or RISC core, and thus external CPU 102 is not required. In this embodiment, the internal CPU core or RISC core within the IMC 140 operates to execute control code and/or system level software without the need for external CPU 102.

Figure 3:
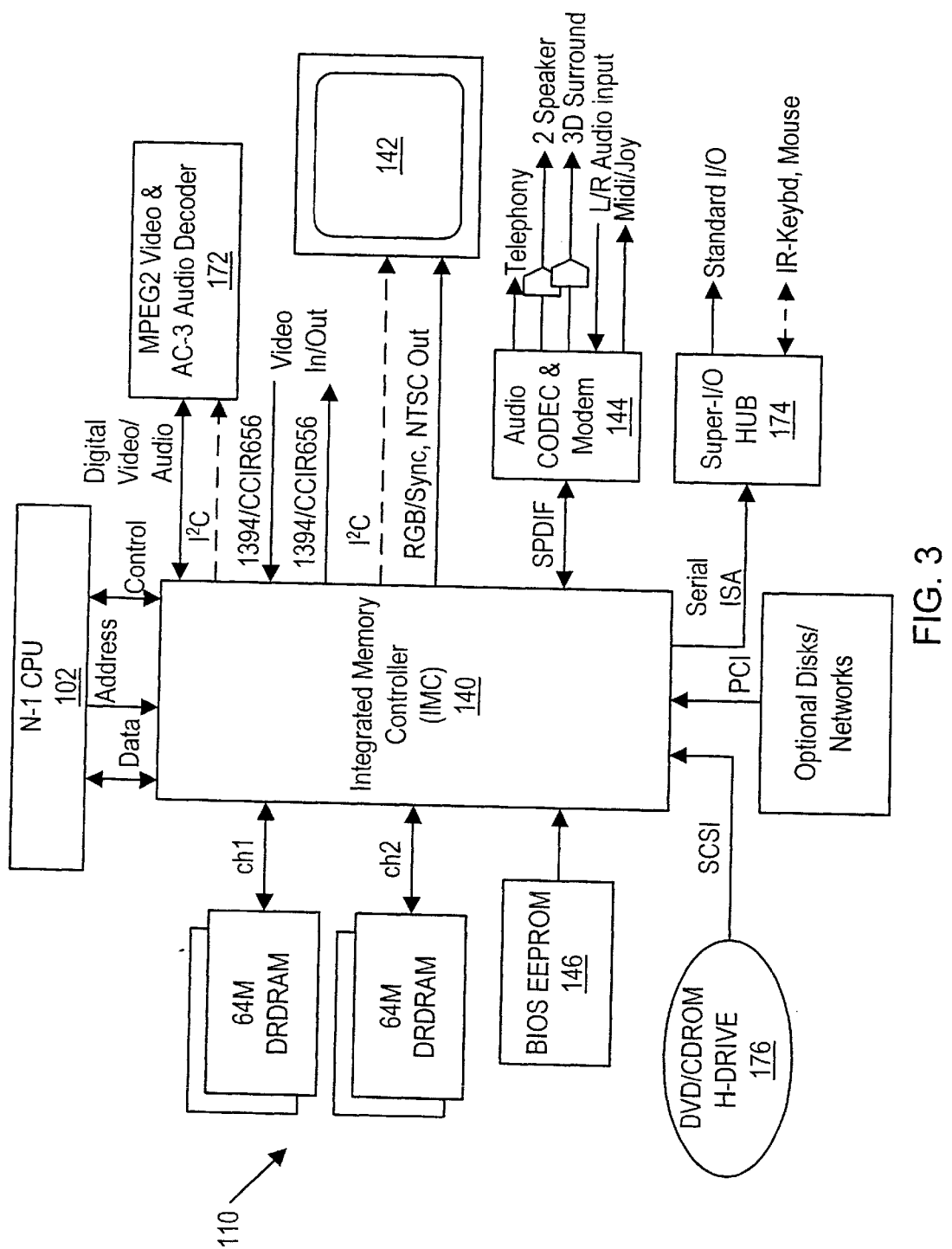
FIG. 3 is a block diagram of a system including an IMC according to the present invention.

FIG. 3—IMC System Architecture

FIG. 3 is a block diagram illustrating an IMC system architecture of the preferred embodiment, i.e., a system which includes the Integrated Memory Controller or Interactive Media Controller (IMC) of the present invention. FIG. 3 illustrates one embodiment of a system architecture, and other system architectures may be used, as desired. It is also noted that the IMC of the present invention may be used in various types of digital devices as described above.

As shown, the IMC 140 of the present invention preferably couples to a CPU 102. The CPU 102 is optionally coupled through a cache system (not shown) to the IMC 140. The CPU 102 may include a first level cache system and the system may also comprise a second level cache. The CPU 102 is preferably an X86 CPU, but may be any of various types of CPUs, DSPs, microcontrollers, or programmable logic, as desired. Also, as used herein, the term "CPU" is intended to include external CPU 102 as well as a CPU core or processing core, comprised in the IMC 140, that executes control code or system level software.

The IMC 140 couples to system memory 110, wherein the system memory 110 comprises one or more banks of memory. In the preferred embodiment, the system memory 110 comprises two banks of memory, and the IMC 140 preferably includes two symmetric memory ports, ch1 and ch2, for coupling to the two banks in system memory 110. In the preferred embodiment, the IMC 140 couples to the system memory 110 through a RAMBUS implementation. For more information on the RAMBUS memory architecture, please see documentation available from RAMBUS, Inc.

The IMC 140 of the present invention may couple to any of various types of memory, as desired. In the preferred embodiment, the system or main memory 110 comprises DRDRAM (Direct RAMBUS dynamic random access memory), SDRAM, DDR-SDRAM or EDO (extended data out) memory. In an alternate embodiment, the system memory 110 comprises SGRAM, VRAM, or other types of memory. As noted above, the IMC 140 of the present invention may couple to any of various types of memory, as desired.

The IMC 140 couples to a display device 142, such as a computer video monitor or television screen, among others. The IMC 140 generates appropriate video signals for driving display device 142. The IMC 140 preferably generates red, green, blue (RGB) signals, as well as vertical and horizontal synchronization signals for generating images on the display 142. The IMC 140 also generates NTSC video signals, PAL video signals, or video signals for other analog or digital television/video formats. The IMC 140 may generate any of various types of signals for controlling a display device or video monitor. As shown, the IMC 140 preferably uses a serial control bus, such as the I2C serial bus, for control of the display device 142.

Therefore, the integrated memory controller 140 of the present invention integrates memory controller and video and graphics controller capabilities into a single logical unit. This greatly reduces bus traffic and increases system performance.

In the embodiment shown, the IMC 140 couples to an audio codec and/or modem 144. In one form of embodiment, the IMC 140 generates appropriate data signals, preferably SPDIF, that are provided to the audio codec and/or modem 144 for audio presentation. As shown, the audio codec and/or modem 144 is operable to generate one or more of telephony voice, data and control signals, speaker output, 3D surround audio signals, and MIDI/joystick. Alternatively, the IMC 140 integrates audio processing capabilities and provides audio signal outputs that are provided directly to speakers.

A BIOS EEPROM or boot device 146 is also coupled to the IMC 140 to configure or boot the IMC 140, as described further below.

The IMC 140 of the present invention also preferably couples to a video and/or audio codec 172 and in one embodiment can perform one or more of MPEG video decode standards including AC-3 audio decoding. The IMC 140 communicates digital video/audio with the decoder 172. The IMC 140 also communicates control information with the codec 172 through an I2C serial bus. The IMC 140 also may include other types of video ports, such as one or more IEEE 1394/CCIR656 ports for video in/out.

The IMC 140 of the preferred embodiment may include other I/O interfaces. In the preferred embodiment, the IMC includes PCI interface or bridge logic for providing a PCI bus interface. The PCI bus may be used for coupling to various I/O devices, such as non-volatile storage, network interface devices, etc. The IMC 140 preferably operates as a PCI bus master on the PCI bus. The IMC 140 also may provide a serial ISA bus interface for coupling to a Super I/O hub 174 for interfacing to standard I/O devices such as a keyboard, mouse, and optionally IR devices, such as IR keyboards, mice and remote control devices. The IMC 140 also may include a SCSI (Small Computer Systems Interface) for coupling to other types of I/O devices, such as a DVD (digital video disk), CD-ROM, or non-volatile storage 176. Alternate embodiments may assume that devices are connected to other I/O interfaces to carry out the functions as indicated above.

The IMC of the present invention thus comprises a video, 2D and 3D graphics controller which includes a novel object based display refresh list system for display of 2D and 3D graphical data on a display device. The IMC 140 preferably uses the main system memory of the CPU 102 in a unified or shared memory architecture manner. The IMC graphics controller 140 minimizes data movement for 2D/3D and video data manipulation for video display updates and thus greatly increases system performance. The present invention is capable of manipulating 3D graphical data similar to streaming video sources. This makes the invention well suited for display and manipulation of environments where 2D graphics, 3D graphics and streaming video formats are mixed. The IMC 140 transfers data between the CPU local bus and system memory 110 and also transfers data between the system memory and the video display output. Therefore, the IMC 140 of the present invention may eliminate the need for a separate 2D/3D graphics, audio, video, and telephony and core logic subsystems. The IMC 140 uses techniques to improve overall system performance and user response time by use of the main system memory as a virtual graphical frame buffer and program/data storage. The IMC 140 provides a unique system level architecture that reduces data bandwidth requirements for general media input/output functions. Because the host CPU 102 is not required to move data between main memory and the graphics and audio and telephony subsystems as in conventional computers, data can reside virtually in the same subsystem as the main memory. Therefore, for media output data (audio, video, telephony) the host CPU or DMA master is not limited by external available proprietary bus bandwidth, thus improving overall system throughput.

The IMC 140 of the present invention preferably comprises an advanced memory controller, 2D/3D graphics, audio, video, and optionally telephony processing capabilities. The IMC 140 performs pointer-based display list video operations for manipulation of media objects on the display, as discussed below. The 3D graphics capabilities of the IMC 140 include numerous significant advances that provide greatly increased performance over prior art systems.

The IMC 140 of the present invention preferably couples to the CPU bus, a high-speed system peripheral bus such as the PCI, or other proprietary buses such as the Accelerated Graphics Peripheral bus (AGP). In alternate embodiments the IMC may embed any of the MPEG and audio decoder standards for a stand-alone MPEG display controller implementation.

The IMC 140 includes one or more symmetric memory ports for connecting to system memory 110. The IMC 140 also includes video outputs, preferably RGB (red, green, blue) outputs as well as NTSC or HDTV video, plus horizontal and vertical synchronization signal outputs. These signals directly drive the display device 142. The IMC 140 also may include an SPDIF digital interface for control and delivery of audio and telephony. The IMC 140 also may contain a video manipulation interface to standard video components that control equipment such as VCR's and Digital videodisks. Internal IMC circuitry may also include video and audio decompression logic for manipulation of MPEG2 (video) and AC-3 (audio) standards for the DVD and HDTV specifications. The IMC 140 also may include a telephony interface via the SPDIF digital interface for local or wide area networking. This telephony interface provides connection to other systems such as the Internet or World Wide Web. In addition the IMC 140 also may include a "local" bus interface to the CPU, peripheral bus interfaces such as PCI and ISA buses, and SCSI interface for disk drives all connected to the I/O subsystem.

The IMC 140 includes a novel system architecture which helps to eliminate system bandwidth bottlenecks and removes extra operations required by the CPU 102 to move and manipulate application data. The IMC 140 includes a high level protocol for the manipulation of graphical data or video data which greatly reduces the amount of bus traffic required for video operations and thus greatly increases system performance. This high level protocol includes a display list based video refresh system and method whereby the movement of objects on the video display screen 142 does not require movement of pixel data in the system memory 110, but rather only requires the manipulation of display address pointers in a display refresh list, thus greatly increasing the performance of pixel bit block transfers, animation, and manipulation of 2D and 3D objects.

It is noted that the term "graphical data" is commonly used to refer to data written to the parallel side of VRAM or the data stored to/from the frame buffer. The term graphical data is also used to refer to graphical objects or pixel data rendered to memory. The term video data is typically used to refer to data that is provided to the RAMDAC during refresh for monitor output or to live action video data. In the present disclosure, the term video data is used to include both graphical data and video data (or pixel data). In the present disclosure, the terms video data and pixel data are often used interchangeably.

IMC System Operation

Typical operations within a system including the IMC 140 are as follows. It is assumed that the program code and data is initially stored on a non-volatile media. Program code and data may also be received from a transmission, e.g., an interactive application transmitted with a television signal. First, the IMC 140 reads program code and data stored on the non-volatile media, or received from a transmission, using a direct memory access (DMA) and/or burst control methods, where the IMC 140 preferably acts as a master on the system bus 106. The program code and data are read by the IMC 140 and stored in the system memory 110. In an alternative embodiment, the program code and data are transferred to the IMC 140 under CPU control. The data is transferred from the non-volatile media to the system memory 110 preferably in a compressed format, and thus the data requires less disk storage and reduced system bus bandwidth. As the data is transferred from the disk 120 to the IMC 140, the data is preferably decompressed by a decompression engine within the IMC 140 and stored in the system memory bank 110.

The CPU 102 begins program execution by reading the recently decompressed program code from the system memory 110. Portions of the program code contain information necessary to write data and/or instructions back to the IMC 140 using a special graphical protocol to direct the IMC 140 to control the display output on the video display 142. In many cases, the graphical data is not required to leave the system memory 110 and is not required to move to another location in system memory 110, but rather the display list-based operation and high level graphical protocol of the IMC 140 enables the CPU 102 to instruct the IMC 104 how window and other graphical data is presented on the screen. This provides a tremendous improvement over prior art systems.

The high level graphical protocol used by the IMC 140 of the present invention eliminates many of the CPU reads and writes of graphical information that are required in prior art systems. Instead, a system incorporating an IMC 140 includes a high level graphical protocol whereby the CPU 102 instructs the IMC 140 to manipulate the data stored in the system memory 110. For example, when text which appears in a window on the display screen is manipulated, the text is not required to leave the system memory 10 for processing by the CPU 102. Rather, the IMC 140 reads the text data into the system memory 110, preferably in ASCII format, and the IMC 140 processes the text data for display output. This operation is performed under the direction of the CPU 102 through the high level graphical protocol used by the IMC 140, as described further below. Another example is a back store of window information when windows are occluded or moved to the background of the display screen. In current prior art systems, this operation requires either extra cost for memory in the graphical subsystem, i.e., additional video memory or VRAM, or the CPU 102 is required to move the occluded information from the graphical subsystem back into the system memory for temporary storage. In the IMC architecture of the present invention, the data remains in the same location in system memory 110 and is easily recalled when required. No data movement or backstore of data within system memory 110 is required, but rather the only change required is an update of window assembly pointers in system memory. As another example, the movement of windows on the screen does not require any movement of video data in system memory, but rather only requires change to X and Y position pointers for the respective window.

The IMC 140 of the present invention includes a novel Window Assembler or Virtual display refresh list (VDRL) system and method which performs pointer-based window assembly for the display output during screen refresh with greater efficiency. This allows for windows and/or objects to remain in their original form and location without modification during many types of video manipulation. Note, to avoid confusion between this disclosure and related applications, "virtual display refresh list" and "video display refresh list" have the same meaning.

Therefore, pointer-based VDRL system and method of the present invention reduces the amount of data required to be moved within the system for processing, thus reducing the overall cost while improving the performance of the computer system. The high level graphical communication protocol between the CPU 102 and the IMC 140 reduces bus traffic and increases performance since the CPU 102 spends much less time moving data between the various subsystems. This frees up the CPU 102 and allows the CPU 102 greater time to work on the application program rather than moving data around the system.

Figure 4:
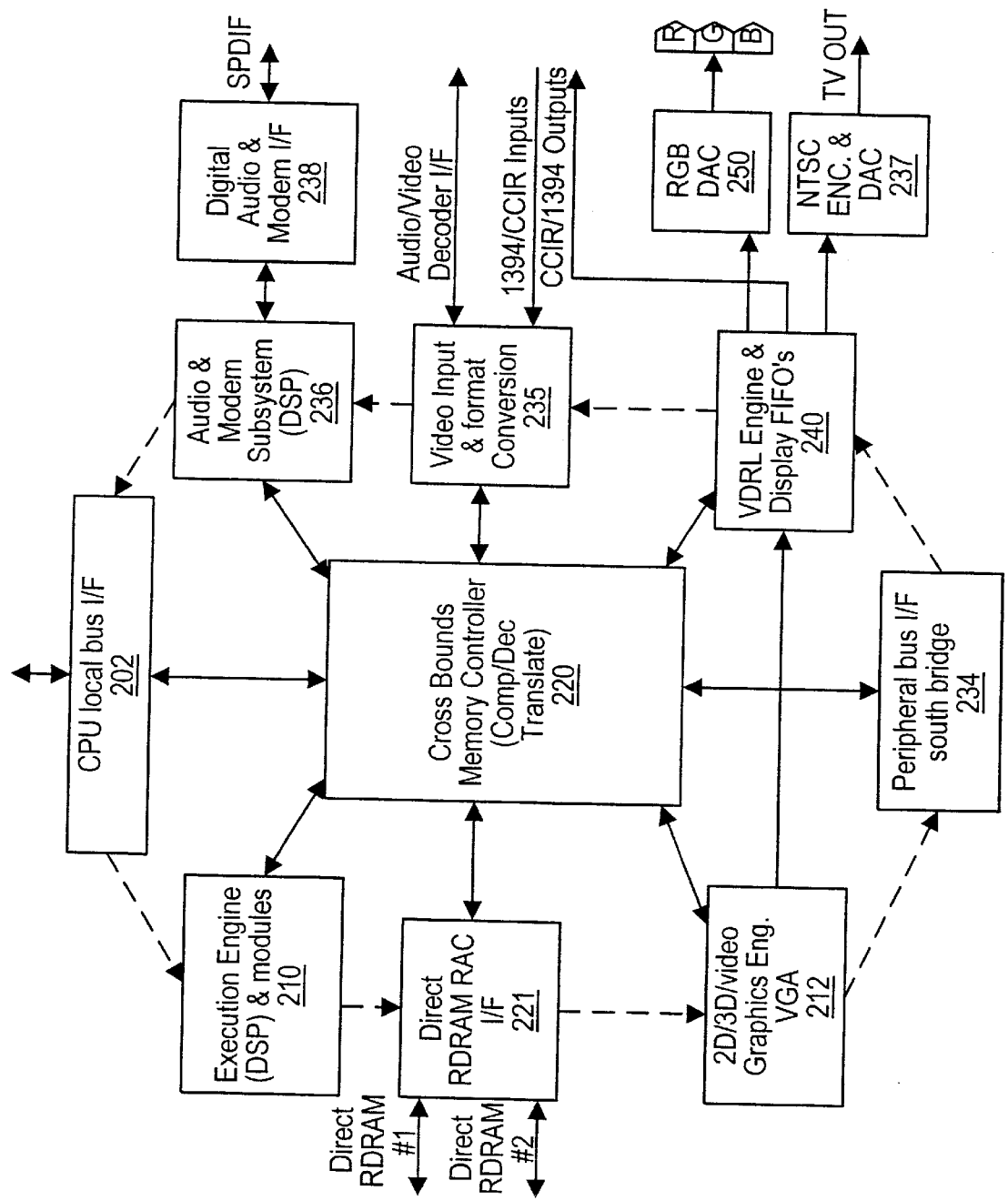
FIG. 4 is a block diagram illustrating the IMC internal architecture of the present invention.

The elements of FIG. 4 may be implemented in any of various ways, including an ASIC, FPGA, programmable processing (including a CPU, DSP, etc.), discrete logic, etc., or combinations thereof. As used herein, the term "engine" or "processor" is a generic term for the elements 210, 212, 220 and 240 of FIG. 4, and the term "engine" or "processor" is intended to encompass each of the above possible implementations as well as others.

FIG. 4—IMC Block Diagram

FIG. 4 is a block diagram of the IMC 140 of the preferred embodiment. As shown, the IMC 140 includes a memory controller, referred to as a cross bounds memory control unit 220. The cross bounds memory control unit 220 couples to a CPU local bus interface 202, an Execution Engine 210, an RDRAM interface 221, a 2D/3D/video graphics engine 212, a peripheral bus interface 234, an audio/modem/telephony engine 236, a video input and format conversion block 235 and a virtual display refresh list (VDRL) engine 240 and associated display FIFOs. As shown, the IMC 140 includes a control path for enabling programming of registers, wherein this control path couples the CPU local bus interface 202, the Execution Engine 210, the DRDRAM interface 221, the 2D/3D video graphics engine 212, the peripheral bus interface bridge 234, the VDRL engine 240, the video input and format conversion block 235, and the audio and modem subsystem block 236, which couples back to the CPU local bus interface 202.

As shown, the audio and modem subsystem block 236 couples to digital audio and modem interface block 238, which then provides SPDIF signals to the audio CODEC and modem 144 (FIG. 3). As shown, the video input and format conversion block 235 provides an audio/video decoder interface and also provides an IEEE-1394 and CCIR inputs. As also shown, the VDRL engine 240 couples to an RGB DAC block 250 which in turn provides RGB signals and respective synchronization signals for driving the display device 142. The VDRL engine and display FIFOs block 240 is also operable to provide a video output to an NTSC encoding and DAC block 237, which then provides NTSC television signals for provision to a television screen. As noted above, the IMC 140 is also operable to provide video signals in other formats, such as digital television signals, e.g., HDTV, among others.

In the preferred embodiment, the Execution Engine unit 210 comprises a VLIW instruction set RISC core. Alternate embodiments may use other types of CPU or DSP cores internal to the IMC or External to accomplish the execution unit function. The Execution Engine unit 210 is responsible for the assembly of 2D and 3D Virtual display refresh lists (VDRLs). The fast sort sub-core and the Z-Rules sub-core assist building of the VDRL. The IMC 140 preferably performs memory compression and decompression operations, video data manipulation, as well as three dimensional graphical object manipulations and the assembly of 2D and 3D virtual display refresh lists. The Execution Engine 210 in combination with the fast data sorting, Z-rule and 2D/3D display list cores control and manipulate graphics objects for display position within three dimensions, X, Y, and Z. Although not limited to run without a Z-buffer, for 3D graphical object manipulation no conventional Z buffer is required.

In one embodiment, the Execution Engine 210 includes a CPU core, RISC core, or other processing core for executing control code and/or system level software. In this embodiment, external CPU 102 is optionally not required.

Preferably, the media DSP core 236 comprises at least one digital signal processor (DSP) which controls audio, modem, and telephony data, as well as other communication standards, such as Digital Subscriber Line (DSL).

The Execution Engine 210 in turn couples to a graphics engine 212 for control of 2D/3D and video data. The graphics engine 212 connects to the display refresh block 240 which synchronizes and serializes display data into the internal video DAC 250. The above internal units couple through FIFO buffers to the Cross-bounds memory control unit 220 responsible for the compression and decompression of system memory data.

For 3D graphics the compression and decompression operation is very desirable. In alternate embodiments, the compression and decompression can be enabled or disabled for of certain 3D data types, and/or during various stages of the process. For a retained mode of operation, the 3-D VDRL and the static triangle data may be compressed with a fast parallel lossless compression technique. Textures and video input source information may be compressed with a lossy compression technique. In addition, the output data that is held as off-screen data (3DDL and rendered surfaces) may also be compressed with either the lossy or lossless compression engine. For 3D applications that require immediate mode of operation, the Z data may also be compressed in lossless format by the compression engines. As indicated, all compressed memory and addressing formats assume that compressed data is stored in the external system or attached memory. Data that is read in compressed format is decompressed by the IMC's internal decompression engines prior to usage as described in the present disclosure.

The cross-bounds memory controller unit 220 contains a non-conventional cross-bar switch and memory translation logic for virtualization of the system memory into the various IMC cores. The Graphics Engine 212 includes point, line, quadrilateral and triangle rasterization operations as well as all API-required raster operations for 3D data manipulation. The IMC graphics engine 212 differs from conventional devices in that it also manipulates video and graphical data under control and direction of the 2D and 3D virtual display refresh list engines 240.

The output of the graphics engine can compress the final 3D image or scene data during a write operation. When the 2-D VDRL subsequently reads the 3D image(s) for refresh, a decompression process is used to restore the original format of the data. During the Refresh to the display, under control of the 2-D VDRL, the 3D data can be written back to off-screen memory as span-line compressed. The data can also be written back as compressed 3D windows or objects in a span line compressed format. Compressed 3D windows or objects are defined as areas where the 3-D VDRL has previously written image data. Once compressed in window or object span lines, the refresh operation to the display decompresses the data prior to refresh of such data via the graphics engine. It should also be noted that in the preferred embodiment, the same engine that operates on the 2D, Video, and 3D data is also operating the refresh of data to the display.

Figure 5A:
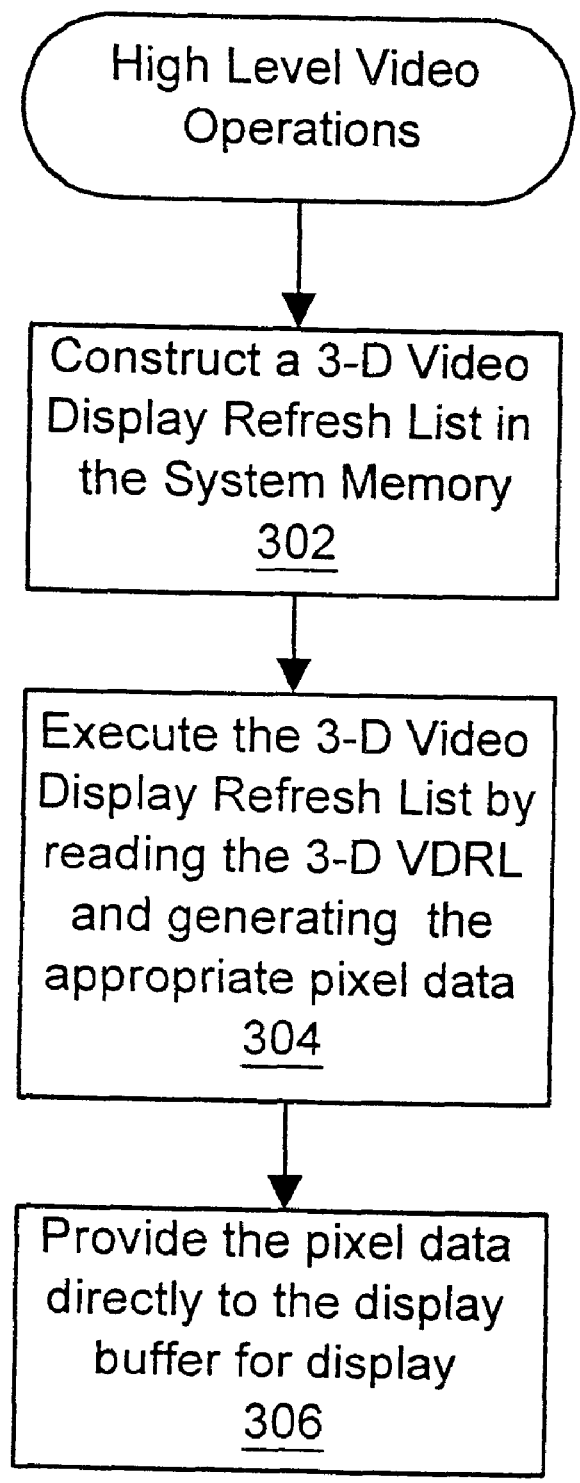
FIG. 5A is a flowchart diagram illustrating operation of the IMC to construct and execute a 3-D virtual display refresh list and display the resulting pixel data.
Figure 5B:
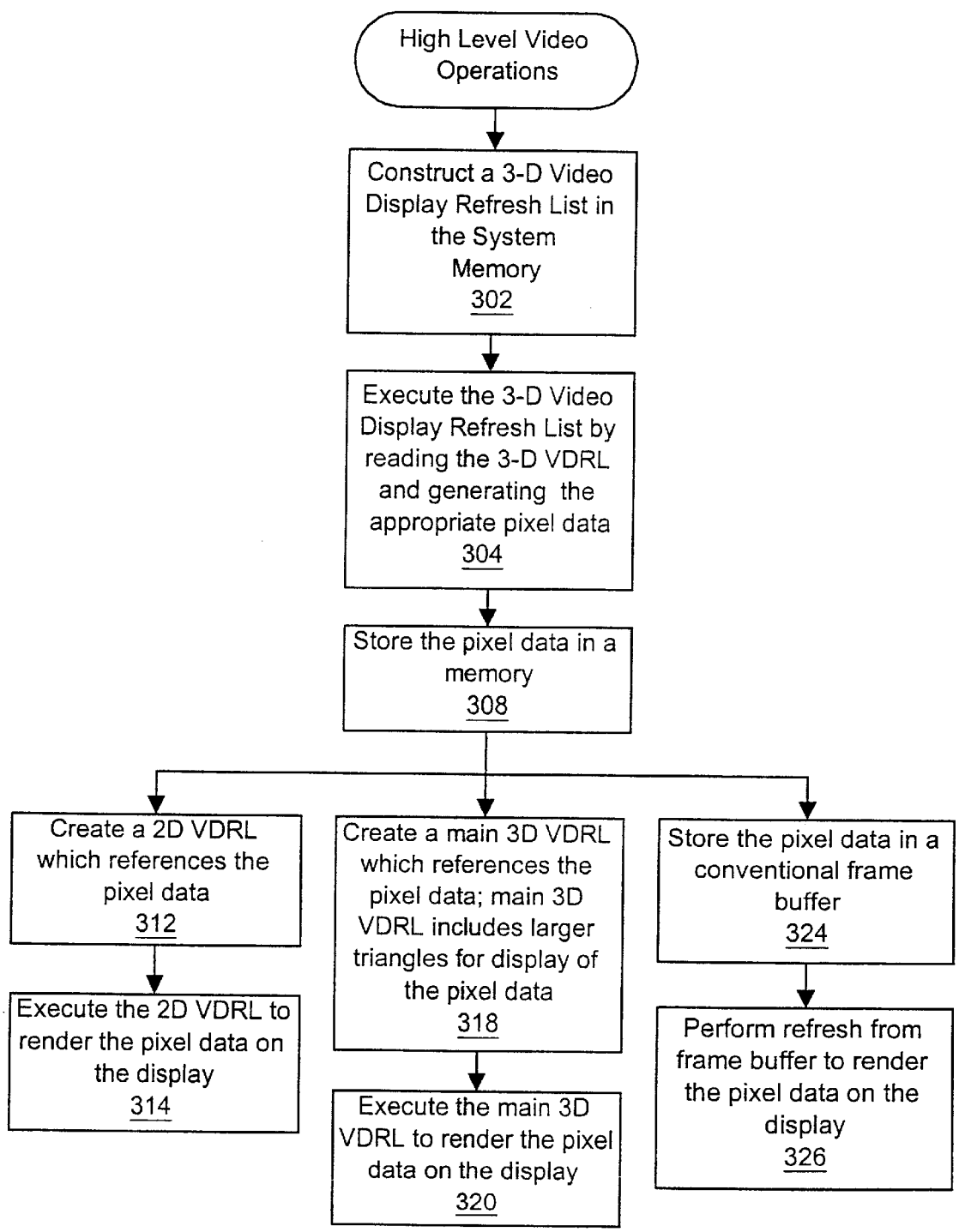
FIG. 5B is a flowchart diagram illustrating operation of the IMC to construct and execute a 3-D virtual display refresh list and store the resulting pixel data in memory for later display.
Figure 5C:
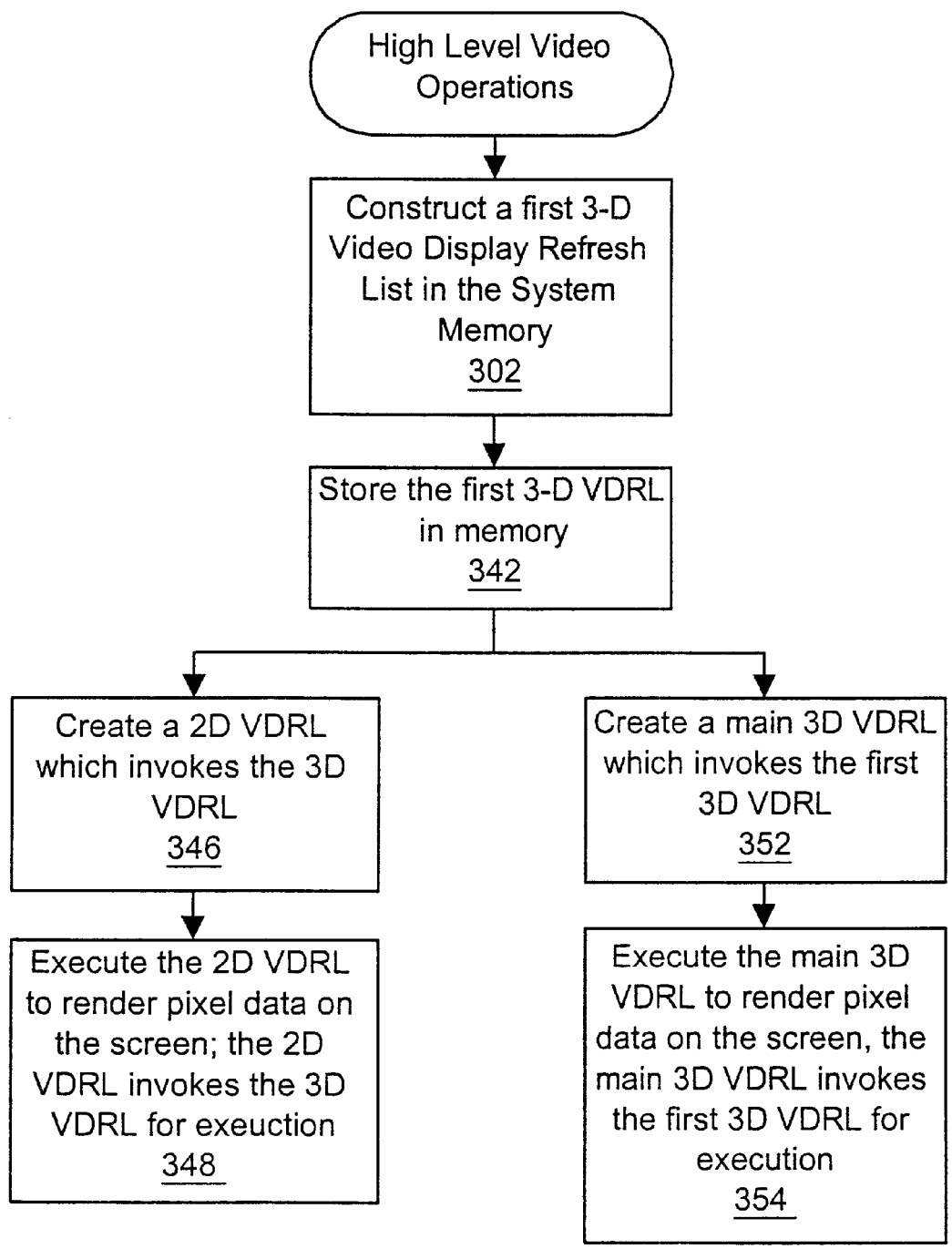
FIG. 5C is a flowchart diagram illustrating operation of the IMC to construct a 3-D virtual display refresh list and store the 3-D VDRL for later execution and display.

IMC Operation—FIGS. 5A–5C

FIGS. 5A–5C are flowchart diagrams illustrating examples of the operation of the IMC. As shown, the IMC includes a novel system and method for manipulating and rendering 3D graphics. Steps in FIGS. 5A–5C may be executed concurrently or in different orders.

FIG. 5A—Execution of the 3D VDRL in Real Time for Display

As shown in FIG. 5A, in step 302 the IMC first operates to construct a 3-D Virtual display refresh list (VDRL) in system memory. The IMC constructs the 3-D VDRL in response to received geometry data. The 3-D VDRL comprises a list of commands which are executable to render pixel data comprising one or more 3-D objects. The 3-D VDRL may be constructed on a per object basis, or for the entire display. Further, the 3-D VDRL may be constructed for objects which are currently desired to be displayed as well as objects which are not currently desired to be displayed, e.g., off-screen objects. Thus, synchronization and manipulation of such objects is possible under control of a set of object or window display rules by execution of constructed 3-D VDRLs. Construction of the 3-D VDRL is discussed in detail with reference to the flowchart of FIG. 6 and FIG. 7 onward.

In step 304 the IMC then executes the 3-D VDRL by reading the VDRL and generating the appropriate pixel data to construct an image. Execution of the 3-D VDRL operates to generate or render pixel data in response to, or based on, received geometry data. Execution of the 3-D VDRL may involve accessing texture maps from a memory in creating the pixel data. Execution of the 3-D VDRL operates to generate or render pixel data, which then may be stored in system memory for later use or may be rendered to the display in real time.

In step 306 the IMC provides the pixel data generated in step 304 directly to the display device for display. For example, the pixel data generated in step 304 may be directly provided to a display buffer for immediate output to the display.

In FIG. 5A, the construction of the 3-D VDRL in step 302 preferably occurs prior to the display refresh where the pixel data is displayed. However, the embodiment of FIG. 5A also contemplates construction and execution of the 3-D VDRL in real time during display refresh.

In the embodiment of FIG. 5A, the 3-D VDRL is executed during display refresh, wherein the pixel data generated in step 304 is provided in real time to the display during display refresh. Thus the embodiment of FIG. 5A presumes a large amount of processing power to enable execution of the 3-D VDRL in real time during display refresh.

Thus FIG. 5A illustrates an embodiment where execution of the 3-D VDRL operates to generate or render pixel data which is provided directly and immediately for display on the display device. In other words, the pixel data generated in step 304 is not temporarily stored in the system memory for later display, but rather the pixel data is immediately provided to the display buffer for display in step 306. Thus, in this embodiment the IMC provides the pixel data directly for display in response to executing the 3-D VDRL. This embodiment generally requires more processing power than the embodiments of FIGS. 5B and 5C.

FIG. 5B—Execution of the 3D VDRL and Storage of the Pixel Data for Later Display FIG. 5B illustrates an alternate embodiment of the operation of the IMC. In FIG. 5B, it is presumed that there is not sufficient processing power to enable execution of the 3-D VDRL in real time during display refresh. Note that this method may also be used even when sufficient processing power is present. Steps in FIG. 5B which are similar or identical to those in FIG. 5A have the same reference numerals for convenience.

As shown in FIG. 5B, in step 302 the IMC first operates to construct a 3-D Virtual display refresh list (VDRL) in system memory.

In step 304 the IMC then executes the 3-D VDRL by reading the VDRL and generating the appropriate pixel data to construct an image, i.e., to generate pixel data corresponding to the image.

In step 308 the IMC stores the pixel data in a memory in response to execution of the 3-D VDRL in step 304.

Here the IMC executes the 3-D VDRL in step 304 and stores the resultant pixel data in a memory in step 308, rather than providing the resultant pixel data directly to the display in FIG. 5A. This occurs, for example, because the IMC lacks sufficient processing power to execute the 3-D VDRL in real time during display refresh. The rendered pixel data stored in the memory in step 308 is displayed at a later time using either a 2-D VDRL, a 3-D VDRL, or a conventional frame buffer.

In one embodiment where the IMC utilizes a 2D VDRL to display the pixel data, in step 312 the IMC preferably creates a 2-D VDRL which references the pixel data. The 2-D VDRL comprises pointers and commands which reference pixel data stored in the memory for display, including at least a portion of the pixel data rendered in the system memory in response to execution of the 3-D VDRL. In step 314 the IMC then executes the 2-D VDRL to render the pixel data on the screen. Creation and execution of a 2-D VDRL is described in U.S. Pat. No. 5,838,334, incorporated by reference above.

In another embodiment where the IMC utilizes a 3D VDRL to display the pixel data, in step 318 the IMC preferably creates a second different 3-D VDRL, referred to as the main 3-D VDRL, which references the pixel data for display. The main 3-D VDRL comprises pointers and commands which reference triangles generated in response to other geometry data, as well as the pixel data rendered into the system memory due to execution of the 3-D VDRL in step 304 and storage of the pixel data in step 308. The main 3-D VDRL comprises pointers and commands which reference viewed triangle spans, e.g., information describing the start and end of triangles on respective scan lines. These viewed triangle spans possibly include triangle spans rendered from other geometry data, as well as triangle spans comprising the pixel data generated in step 304.

In the preferred embodiment, the main 3-D VDRL is preferably constructed to include one or more large triangles (3DDL) which reference the pixel data rendered into the system memory due to steps 304 and 308. In this case, the pixel data rendered into the system memory in steps 304 and 308 is treated much like a texture map. Since the 3D VDRL preferably only references triangle spans, the pixel data rendered in step 304 is preferably referenced using one or more larger triangles (Note that, instead of a triangle span, the fundamental primitive for a 3D-VDRL that is in a hierarchical form (3DDL) alternatively may be a trapezoid or other polygon with horizontal top and bottom. Although triangles are much more commonly used, the main 3DDL may be a single trapezoid or rectangle type, referred to as a Triangle primitive type in this disclosure).

In step 320 the IMC then executes the main 3-D VDRL to render the pixel data on the display. Execution of the main 3-D VDRL includes accessing the pixel data from the memory during rendering of the triangle spans corresponding to the one or more large triangles which reference the pixel data. In this case, the pixel data is accessed much like a texture map. Creation and execution of a 3-D VDRL is described below.

The use of larger triangles to represent pixel data rendered from another 3-D VDRL allows a combination of a plurality of 3D objects into a single object, e.g., a texture map, for reduced bandwidth requirements. Stated another way, this method operates to combine or condense a large plurality of triangles from a first 3D VDRL into a few (one or more) much larger triangles in a main 3D VDRL, thereby enabling more efficient execution of the main 3D VDRL.

Alternatively, in step 324 the IMC stores the rendered pixel data in a conventional frame buffer. In step 326 the IMC performs a refresh of the frame buffer to render the pixel data on the screen. In the embodiment of steps 324 and 326, construction and execution of one or more 3-D VDRLs is required to be performed for the entire display area, since a conventional frame buffer is used. The term "frame buffer" is used to indicate an off-screen storage location. Execution of the 3-D VDRL may result in a plurality of objects stored in virtual memory areas for assembly to the display surface by the main 2-D VDRL. Thus, the frame buffer nomenclature in this disclosure may not be the area from which the display data is refreshed, but a memory area for 3D object or window storage.

FIG. 5C—Store 3D VDRL in Memory for Later Execution

FIG. 5C illustrates an alternate embodiment, where the IMC stores the 3-D VDRL in memory for later execution. Note that the 3-D VDRL may be stored in compressed format to save memory bandwidth and memory space. In this embodiment, in step 302 the IMC first constructs the 3-D VDRL in system memory. In step 342 the IMC stores the 3-D VDRL in memory in response to construction of the 3-D VDRL in step 302.

Steps 346–348 illustrate an embodiment where a 2D VDRL is used to invoke the 3D VDRL created and stored in steps 302 and 342. Steps 352–354 illustrate an embodiment where a main 3D VDRL is used to invoke the 3D VDRL created and stored in steps 302 and 342.

As shown in the embodiment of FIGS. 346–348, in step 346 the IMC preferably creates a 2-D VDRL which calls or invokes the stored 3-D VDRL for execution during execution of the 2-D VDRL. The 2-D VDRL comprises pointers and commands which reference pixel data stored in the memory for display, as well as commands which invoke one or more 3-D VDRLs for execution. The 2-D VDRL references pixel data which may have been previously created or rendered by the graphics engine, or by prior execution of a 3-D VDRL as described in FIG. 5B.

In step 348 the IMC then executes the 2-D VDRL to render the pixel data on the screen. During execution of the 2-D VDRL, the 2-D VDRL operates to invoke the 3-D VDRL, which is then executed. Thus the 3-D VDRL is called and executed during execution of the 2-D VDRL. Creation and execution of a 2-D VDRL is described in U.S. Pat. No. 5,838,334, incorporated by reference above.

As shown in the embodiment of FIGS. 352–354, in step 352 the IMC preferably creates a main 3-D VDRL which calls or invokes the stored 3-D VDRL for execution during execution of the main 3-D VDRL. The main 3-D VDRL comprises pointers and commands which are read by the IMC and interpreted for output to the memory for display, as well as commands which invoke one or more 3-D VDRLs for execution. The main 3-D VDRL may also reference pixel data which may have been previously created or rendered by the graphics engine, or by prior execution of a 3-D VDRL as described in step 318 of FIG. 5B.

In step 354 the IMC then executes the main 3-D VDRL to render the pixel data on the screen. During execution of the main 3-D VDRL, the main 3-D VDRL operates to invoke the stored 3-D VDRL, which is then executed. Thus the stored 3-D VDRL is called and executed during execution of the main 3-D VDRL.

Figure 6:
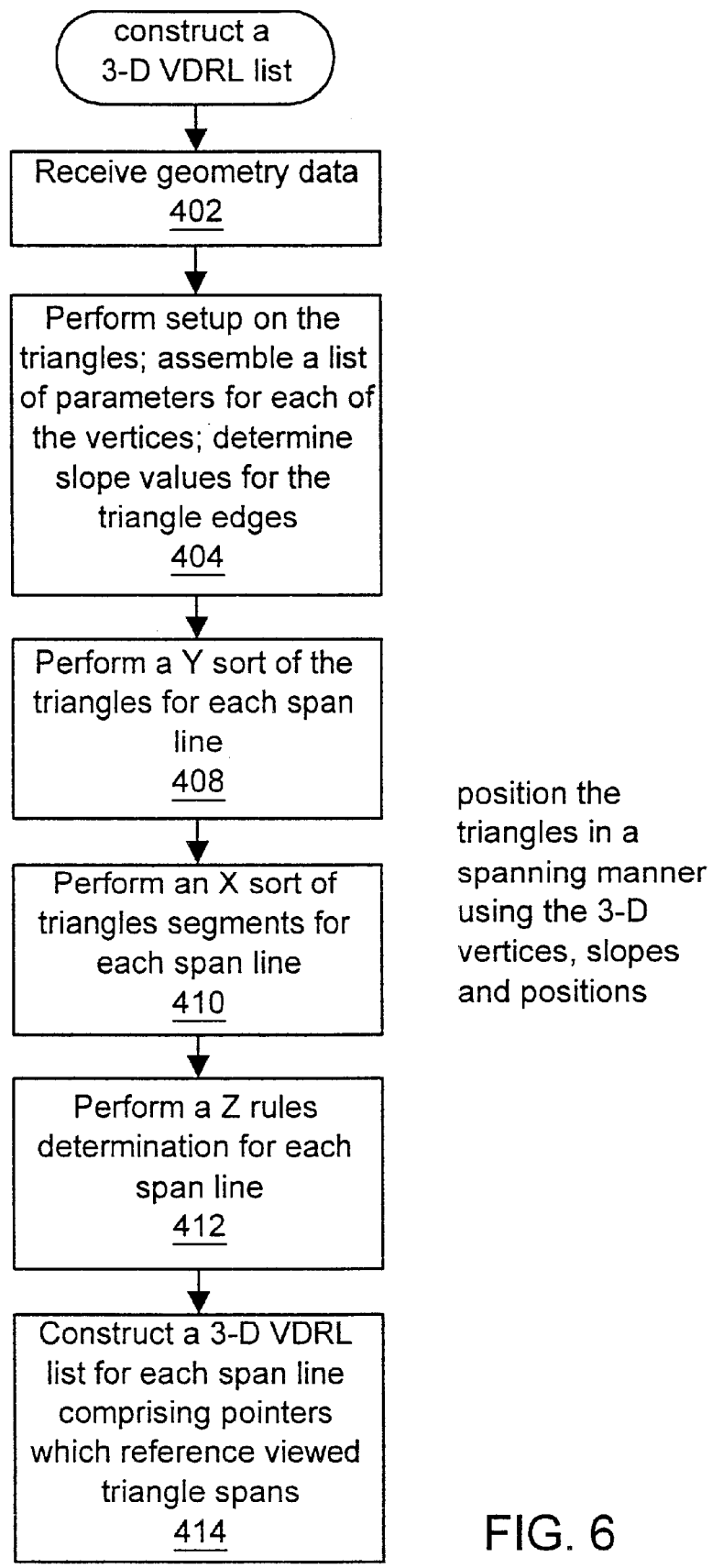
FIG. 6 is a flowchart diagram illustrating operation of the IMC in constructing a 3-D VDRL.

FIG. 6—Construction of the 3-D VDRL

FIG. 6 is a flowchart diagram illustrating operation of the IMC in constructing a 3-D VDRL. Various of the steps in FIG. 6 may occur concurrently or in different orders. The preferred embodiment of the IMC uses a VLIW RISC based execution engine, or alternatively a custom hard-wired engine to parameterize the vertex data into triangles with main edge slopes and orthogonal slopes used for scan conversion to the display surface.

In step 402 the IMC receives geometry data. The geometry data preferably comprises vertex information specifying information regarding a plurality of vertices. The plurality of vertices are useable to form a plurality of polygons, also called polygon primitives. The vertex information comprises, for each vertex, information such as position, diffuse color, and/or normal information, as well as specular color, lighting, and/or shading information, and optionally texture coordinate, transparency, fog factor and perspective scaling, among others. The geometry data thus comprises data representing or identifying polygons, wherein the polygons are useable to form more complex shapes or objects, including 2-D and 3-D objects. The geometry data or polygons are preferably triangles, but may also comprise points, lines, triangles, trapezoids; quad meshes, strip meshes, fan meshes, star meshes, quadrilaterals, splines, or other types of polygons, or combinations thereof. In the preferred embodiment, the polygons comprise triangles or triangle meshes, and the description below is described presuming the polygons comprise triangles. In one embodiment, the geometry data is received in a compressed format, and is decompressed upon receipt by the IMC.

In the preferred embodiment, an alternate method is used for rasterization of very small triangles. This method establishes a procedure for determination of the approximate number of pixels per triangle or other primitive during the triangle set-up calculations. If the number of pixels per triangle or primitive is less than a threshold value, the triangle is rasterized differently than indicated in this disclosure. First, because the vertex information in a small triangle does not span a large delta (change in attribute values per change of X, Y or Z), a simple bi-linear average of the main edge and opposite edge values is determined. In addition, the orthogonal (ortho) values use a simple interpolation as well to determine points that fill in the center of the small triangle or primitive object. Secondly, the point values are assembled into the standard 3-D VDRL list as point and/or line primitives with all the necessary attributes and source address required for full rasterization by the 3D engine. Thus, when the 3D-VDRL list is parsed by the VDRL refresh engine, the point and line primitives fill and render the triangle in a equivalent manner to the preferred embodiment indicated by this disclosure.

According to the present invention, the IMC operates to render 3-D objects in response to the received geometry data using a span line (scan line) based method. More specifically, the present invention operates to assemble or order the polygons in a spanning manner, i.e., in the manner in which the pixels are ultimately drawn on the display. In a conventional display which operates to display pixels in a left to right and top to bottom manner, the IMC operates to assemble or order the polygons in a left to right and top to bottom manner. Thus, the rasterization of pixels to the display is the same as the scanning sequence of video used for combination of input sources into a common format. This process is key to the operation of blending and mixing objects of different data types such as video, 3D and 2D graphics and text. It is also a key component for the timing synchronization of multiple objects during animation and object sequencing. Objects are time synchronized to the main display output rate, scanning rate, as a base source for object animation and synchronization. This key feature also provides a seamless method to avoid object or window tearing due to the draw and refresh synchronization problems found in prior art systems.

After receipt of the geometry data in step 402, the IMC operates to construct the 3-D VDRL as follows:

In step 404 the IMC first parses the vertex pointer lists to generate independent geometric primitives and performs setup on the geometric primitives or triangles. The setup operation receives three vertices representing a triangle. The setup operation includes assembling a list of parameters by fetching and optionally decompressing vertex data for each of the triangle vertices and determining slope values for the triangle. The setup operation may determine the edge and orthogonal slopes, as well as determine color, depth, diffuse lighting, transparency, fog, and one or more texture coordinate slopes and texture information for each respective triangle.

In steps 408 and 410 the method operates to position the triangles in a spanning manner using the 3-D vertices, slopes and other attributes.

In step 408 the IMC then performs a Y sort of the triangles for each span line. During the setup step 404 the top most vertex (V-Sort) of each triangle was determined. This information is used to Y-sort each triangle to a particular span line per draw frame of the 3-D VDRL. Thus, the IMC operates to sort the determined minimum Y coordinates for all of the triangles, thereby ordering the triangles from minimum Y coordinates to maximum Y coordinates, i.e., from top to bottom. Thus, during the process of parameterization, the IMC operates to sort vertexes from minimum Y to maximum Y screen coordinates for each of three vertexes per triangle and then again for each triangle within the vertex list. Thus, the parameterization produces an ordered list of static pointers that point to static data for each independent geometric primitive. Stated another way, each triangle is now represented by a triangle pointer pointing to a list of static data which allows the IMC's 3-D engine to draw the triangle for display output. This associated static data (parameter data) defines the rasterization process for the triangle. The triangle pointers are ordered from minimum Y to maximum Y screen coordinates, and thus the triangles are ordered from minimum Y to maximum Y screen coordinates.

The execution engine 210 then assembles this list of pointers into the main system memory in an order dependent fashion with respect to the line number that each triangle starts on. In effect, the execution engine re-orders the top vertex of each triangle such that all triangles will be in Y coordinate ascending order for the entire triangle display list. Thus, the IMC creates a "Y" coordinate ordered list of triangle pointers pointing to static data arrays in the memory. Both the static data and the ordered list of triangle pointers may optionally be in compressed data format. Further, each pointer points to parameters which completely define the rasterization process for the entire triangle. In the preferred embodiment, all static data is calculated in step 404. In subsequent steps, sorting occurs on pointers to the static data array. Also, step 404 rejects some triangles for degeneracy or back-face culling. Also, a distinction is made between "geometric" (XYZ) static data and "attribute" (color, alpha, texture) static data. Setup of attribute data can wait until later steps of the rasterization process.

In one method of preferred embodiment, during triangle parameterization, the execution engine may divide the display surface horizontally to form a block of "n" span lines. Under these conditions the execution engine 210 also cuts any triangles that cross a block boundary and re-assigns vertex data at the division points to subsequent triangles that are formed due to this process.

In step 410 the IMC performs an X sort of triangle segments for each span line. This involves, for each span line, sorting the triangle segments in an X order from minimum X to maximum X. The Y and X sorts thus operate to sort the triangle span segments in a spanning order as the segments are to be drawn on the display.

After the Y and X sorts, in step 412 the IMC performs a Z rules determination for each span line. The Z-rules based sorting operation rejects pixels that are not visible due to other span segments that lie on-top or in front on the final display span output. The execution engine firmware, or alternatively other CPU or hard logic implementation, executes a rules based algorithm for determination of triangle spans that are rejected or behind other triangle spans. This operates to separate spans for hidden surface removal, i.e. operates to separate viewable spans from non-viewable spans. The viewable spans are kept, while the non-viewable spans are discarded. In effect, the Z-rules based sorting operation operates to create an order of rasterization of spans which makes up the final 3D-VRDL.

Therefore, once the triangles are set-up (main and orthogonal slope values calculated) and the ordered list of triangle pointers is assembled into memory, the execution engine engages the fast sorting sub-core to determine span position (Xstart, Xstop) and span depth (Zstart, Zslope) position for each pixel along the main and opposite edges on each triangle.

The IMC of the present invention thus operates to sort three dimensional vertex data pointers into ordered lists of pointers within the X, Y and Z dimensions. The vertex pointer sort is preferably accomplished by an internal hardware fast-sort engine. The primary responsibility of the hardware fast-sort engine is to manipulate order of the triangles in a spanning manner in the Y and X directions, which operates to manipulate order for object and window positions. The hardware fast-sort engine also sorts in the Z direction to perform hidden surface removal. Thus, during construction of the 3D-Virtual display refresh list, The IMC of the present invention operates to manipulate non-ordered triangle pointers into a sorted order for preparation of triangle parameterization.

In the present invention, for rasterization of 3D objects, the basic element of 3D construction is display span segments located between triangle edges. More specifically, rasterization of 3D objects is accomplished using display span segments located between triangle edges, wherein the display span segments are organized in a spanning manner in the Y and X directions in the manner in which the pixel data is provided to the display.

After the Y and X sorts, and the Z rules determination, in step 414 the IMC constructs a 3-D VDRL list for each span line comprising pointers which reference viewed triangle segments. Thus, once the partial scan lines are processed for depth order dependency, i.e., the Z-rules based sorting operation is performed in step 412, the execution engine, or alternatively external CPU, builds a 3D-virtual display refresh list (VDRL) for execution by the 3D video refresh engine. Thus, a 3D-virtual display refresh list is built indicating the start address of individual or partial spans that make up a plurality of triangles. In general, a 3D VDRL list comprises an ordered list of span line pointers. Each span line pointer points to an ordered list of visible span segments. Each span segment includes an X start, a count of pixels to draw, and a pointer to the triangle's static data used for final rasterization.

Execution of the 3D VDRL

During execution of the 3D VDRL, such as in step 304, triangle attributes are preferably read from system memory under address control of the 3D-VDRL engine (controlled by the 3D-VDRL protocol) into the 2D/3D/Video graphics engine. (Note that in retained mode triangle attributes, such as diffuse color, specular lighting, alpha, and fog are generated inside the graphics engine from slopes obtained from the triangle's static data. The only time color and alpha image data are read from system memory is when transparent segments are written to a frame buffer in immediate mode. Also note that 3-D image data, drawn earlier, is retrieved like texture data).

Due to the nature of 3D applications, the preferred method for context switching between triangles or primitive objects with different attributes is disclosed. Triangle or primitive meshes often will contain the same render state information. Information such as the base texture, alpha or transparency settings, color formats, anti-aliasing mode, and/or diffuse or specular lighting typically remain the same during rasterization of a common 3D object. In the preferred embodiment, the IMC may decode a rasterization state from an embedded operation field stored within the 3-D VDRL instruction stream. During prefetch of such 3-D VDRL stream a determination is made that a change of attributes or rendering state will happen. The decode of such transition maybe stored such that the 3D graphics engine can dynamically change rasterization state synchronized with the flow of 3D data through the pipeline of the engine. Thus, a table of state values is used to quickly transition the rasterization state to multiple configurations by the decode of the state field located within the 3-D VDRL instruction stream.

Execution of the 3D VDRL involves rendering pixels, either into memory or onto the display, in response to the commands and data comprised in the 3D VDRL. The graphics engine then performs span iterations and processing for final color, alpha blending, including lighting, fogging and perspective texture mapping. Thus, during execution of the 3D-VDRL, these triangles in-turn are interpreted by the 3D-VDRL engine and rendered by the graphics engine to produce corresponding pixel data.

Execution of the 3D VDRL comprises a rasterization process that may involve the execution of an existing 2D VDRL invoking or pulling together multiple 3D-VDRL's which have been assembled prior to the refresh operation. The execution engine continually builds new VDRL data for interpretation and control by the video refresh engine(s). Each 3D-VDRL need not be completely built in time for the video refresh operation. However, if the 3D-VDRL is completely built in time for the video refresh operation, this ensures that the draw rate and frame rate keep up with each other. During movement, scaling or object transformation, the 3D-VDRL is assembled into memory and is called for execution by the main VDRL which does run synchronous to the screen refresh. Once an object is complete and represented by a 3D-VDRL in main memory, a "build refresh list" command inserts the new 3D-VDRL into the video refresh list for execution on the next frame. The natural overlay mechanism of the VDRL system allows for 3D objects to be blended into other existing objects drawn multiple frames before. Thus, separate 3D-VDRL's can be built independent of one another, and executed within the main VDRL as independent, time variant, object overlays. In addition, a previously drawn 3DDL that is referenced as a 3D image by the current 3DDL could: 1) be assigned (or assume) a constant Z value, 2) be assigned a Z value at each of the 3D objects vertices, or 3) reference Z data that was written back to memory when it was drawn (virtual Z buffer). The Z-rule engine (or the graphics engine) is designed to support one or more of these methods.

The Graphics Engine in the IMC preferably performs multiple tasks during the processing of video and 2D/3D information. The Graphics Engine converts color formats, pixel depths, and frame formats (resolution and synchronization) to a common format. This format is the result of an expansion phase during the first stage of the Graphics Engine processing. Once all data is in a common format, preferably 8-bit for each RGBA, the Graphics Engine processes the data for 2D, 3D video and refresh operations, with respect to scaling, blending, filtering, and other operations. This stage preferably mixes the color and texture data from multiple sources and, if needed, prepares the data for conversion back to the original source format. Data is written to an output FIFO that is coupled to system memory, and/or is written to an output FIFO that is coupled to one or more video output interfaces. The graphics engine block couples with the video refresh engine for assembly of data as indicated by either the 2D or 3D video display list. Thus, display data, 2D/3D/Video data, or display output data, under direction from the VDRL engines traverse through the same graphics engine data path.

The Video Refresh Engine(s) preferably read the pre-assembled virtual display refresh list from the system memory. Depending on the operation required, the Video Refresh Engine can write data back into memory and/or to the video display output FIFO for display on the display device. (Note, the display device can be a video monitor, television CRT, stereo goggles, or even a direct retina scanning device). When data is written to the output FIFO, it is destined for output to the display device. Prior to transfer of video data to the display output FIFO, some video data processing is required. To accomplish this processing there exist two line buffer storage devices between the graphics engine output FIFO (Note: Alternate embodiments may use SRAM buffers or embedded DRAM instead of FIFO structures) and the display refresh FIFO. In combination, the dual pixel line buffers and associated sub-core logic are preferably used for alpha blending and anti-aliasing, scaling and filtering of the final video data before output to either, 1) Simultaneously write pixel data back to memory and to one or more of the display devices 2) To write data back into system memory for later usage 3) To write data to the final video output for display. The alpha blending operation is accomplished by a mathematical blend of sources from two line buffers, which have been previously loaded by the graphics engine. In one embodiment, the graphics engine writes back edge data (presumably to a virtual edge buffer) to system memory. During refresh, pixel data, along with the edge data, is read from system memory and used by the pixel line buffers to anti-alias the image. The pixel line buffers contain enough storage to hold 2 lines plus 3 pixels. The pixel line buffers provides the storage needed to implement a rolling 3-tap filter. For each pixel being filtered (or anti-aliased), a neighborhood of 8 surrounding pixels (and corresponding edge data) is read from the pixel line buffer. In and alternate embodiment the anti-alias portion of this sub-block uses information that has been embedded into the frame memory for further filtering of each pixel group along pairs of horizontal span lines. The span lines contain area information that is used by the IMC along with the frame-memory embedded anti-alias information to determine the blending requirements for triangle edges.

In the preferred embodiment, alpha blending is done in a two stage operation. First the execution engine builds a separate 3-D VDRL list for triangles that require alpha blending and second the graphics engine is instructed to read both the normal 3-D VDRL (without alpha blending) and the 3-D VDRL with alpha blending enabled. Thus, both non-blended output and blended output are read as source information from two lists and the blending operation is done in real time as the output is rasterized to either the Display or to off-screen memory. If more levels of blending are necessary, the IMC uses a process of reading the span-line back to the graphics engine as source as an additional 3-D VDRL is being input for process.

The final process is to convert from digital to analog by the DAC unit for output onto the display device. When the video refresh list directs the graphics engine to output data back into the memory, data is preferably written back to system memory through the output conversion sub-core within the graphics engine. In such fashion, data, which is stored for re-use in off-screen external system memory is returned to the original source or an alternate destination format.

The IMC performs video refresh operations within the graphics engine 212. The video refresh operations operate to combine multiple video and graphical formats during display output to the display device. Within the graphics core, the 3D virtual display refresh list (VDRL) engine 240 is coupled to the graphics engine 212 and to the cross bounds memory control units 220. The VDRL engine 240 controls operation of a display storage buffer which is coupled to a display memory shifter. The display memory shifter couples to separate digital to analog converters 250 which provide the RGB signals and the synchronization signal outputs to the video monitor.

The 2D and 3D display refresh list engines include a novel display list-based method of transferring video data or pixel data from the memory to the display during display refresh operation, thereby improving system performance.

The IMC operates to assemble and transfer 3D or streaming video refresh lists to off-screen memory for temporary storage. The 3-D virtual display refresh lists can be called in-line to the 2D virtual display refresh lists. This allows for 3D or video operation within a 2D window or surface as display data is refreshed to the internal DAC for display output.

The IMC can utilize a combination of different virtual display refresh list (VDRL) formats in a single display refresh, i.e., in providing an output to the display. Examples of VDRL formats include 2D graphics, 3D graphics, broadcast television (including HDTV), video games, Internet video/graphics, and graphics/video feeds from other sources, such as video recorders, video cameras, and digital cameras, among others.

A combination of virtual display refresh list formats allow for a mixture of 2D and 3D graphics, as well as streaming video, on a single display within a single surface. The present invention includes an object linking algorithm which can link a plurality of various VDRL algorithms during video refresh, thus allowing objects to be linked and hence displayed together during video refresh. Stated another way, different VDRLs which each correspond to an object can be linked, e.g., a master VDRL which calls one or more other VDRLs, possibly of different VDRL formats. The linked VDRLs cause the respective objects to be displayed together on the display.

The combination of multiple data formats of this invention naturally combines television video formats with 3D games, Internet and GUI acceleration with conventional PC formats. Thus the non-streaming nature of 3D and 2D graphical data is transformed into a format that allows display on a streaming system, such as broadcast television or standard video equipment.

The IMC can assemble 2D or 3D objects independent to each other, allowing an object independent draw rate. Thus, objects that animate at a slower frame rate do not require re-draw on a per frame basis. Systems with conventional prior art 3D architectures require that all objects are drawn for each frame of display, and do not allow different refresh rates for objects. Unlike current 3D animation systems of the prior art, the IMC may draw 3D objects at an independent rate with respect to each other. Thus, 3D objects can be defined and animated at a different display update rates. For example, some objects may require updates of 30 frames per second while other objects may only require update rates of 5 frames per second. Thus, objects that do not move as quickly as other objects need less updates during an animation sequence.

In addition, the present invention using 2-D and 3-D VDRLs has a natural synchronization mechanism built into the architecture. All VDRL objects are always naturally synchronized with the display refresh. This is a result of the IMC's ability to point to alternate video display lists which contain 3D objects, instead of pointing to alternating data buffers (double buffering) as in conventional graphics systems. Thus, the VDRL algorithm has added benefit when synchronizing multiple different format sources to the display output.

In an additional embodiment of the invention, simple flicker free 3D "icons" can be generated by use of the 3D-VDRL algorithm. In this fashion, graphical objects can be blended with other data streams (2D or video) and then displayed in real time on the display. Thus, combinations of 3D icons can be blended and displayed with video or other 2D/3D objects for display on the display surface. In such cases only the actual 3D VDRL code and internal control registers must be double buffered, not the associated frame buffer data as in conventional graphics architectures.

For cases where the building of the 3D VDRL is a formidable or time-consuming task and requires multiple refresh frames for completion, off-screen memory can used to build complete windows or objects which are then displayed or overlaid to existing backgrounds in their entirety. For example, the 3D VDRL may be built and then executed to create pixel data in memory, similar to a texture map. The 3-D VDRL may also be built over multiple refresh frames, but still called in and executed in real time.

As the number of object elements on a horizontal span line is increased, the bandwidth requirements also increase. The IMC of the present invention includes a method for compensating for the resulting increased bandwidth requirements. The present invention includes a novel architecture which operates to combine a plurality of singular objects into a single object, wherein the resulting single object contains the plurality of singular objects. Once combined in such form, the virtual display refresh list engine 240 of the present invention can execute the plurality of singular objects as a singular object, thus minimizing the additional required bandwidth. Thus, multiple VDRL objects or windows can be assembled into a smaller set of objects to be executed by the display refresh engine, breaking the "n-limit" barrier of multiple objects assembled by the VDRL on a single horizontal span line.

Construction of the 3-D VDRL—Parameterization of 3D Primitives into the 3-D VDRL Construction of the 3D-VDRL was discussed above with reference to FIGS. 5A–5C and 6. The following comprises greater detail of construction of the 3D-VDRL. During construction of the 3D-VDRL, as discussed with reference to FIG. 6, the IMC parameterizes polygon vertex information into values used by the execution engine 210 and/or graphics engine 212 and 3D video refresh engine 240 to rasterize polygonal information to the display.

In conventional prior art 3D technology, coplanar polygon lists are tessellated into triangular geometric shapes that together represent 3D objects. The triangular representation is based on vertex coordinates. Such vertex coordinates comprise 3D position, shade color, specular color, and texture addresses of associated texture map information. Each of such components must be mathematically converted to parameters used to "scan-convert" or "rasterize" each triangle or quadrilateral. The rasterization process fills the space between the vertex points with details of color and texture. Also, a conventional Z-buffer is used to determine if portions of the surface are occluded by other triangles or objects.

In the preferred embodiment of the invention, parameterization is accomplished in a different manner than that of conventional technology. The result is a data set that can represent how the triangle is to be filled with color and texture on a spanning basis, i.e., in a unified direction from left to right (screen span line) and top to bottom. Thus the IMC of the present invention operates to parameterize polygons or triangles in a spanning manner corresponding to how the display is refreshed. This forms the basis of scan line render and hidden surface removal without the need for a Z-buffer. This novel method also eliminates reading of source data such as texture, and destination alpha, and anti-alias mask fragments for non-visible pixels.

The process of parameterization for the IMC preferably utilizes a separate hard-wired triangle set-up engine under control of the execution engine. In the preferred embodiment, an amount of triangle "static data" is cached on-chip and an amount of "static data" is stored off-chip in either compressed or non-compressed formats. An alternate method of storing and retrieving static data from memory and internal cache memory may also be used. It is desirable to have static data per triangle or primitive that only represents the necessary information to complete the rasterization process. For example, during the triangle set-up operation and building of the 3D-VDRL only the information for positions (X, Y, Z) and depth slope information is needed from the static array. Thus, only information stored and pointed to by the static data pointer during the execution engine set-up and sort operations is required during the build of the initial 3DVDRL. Included within this minimum set is the pointer to the remaining attributes required during the 3D-rasterization process carried out later by the 3D graphics engine. In some cases the remaining 3D attributes may only comprise a minimum set of information. The present invention uses a static pointer element to determine the size of the static data prior to output of the static data in compressed format. When the static pointer is used to access the data, only the necessary attributes and values are read to complete the triangle or object rasterization process.

Triangles that fit in cache on-chip are considered to be "in-scope," indicating that all the information and attributes for the rasterization of that triangle are stored on-chip for a particular portion of the 3-D VDRL process. The IMC invention uses the concept of "scope" which relates to the algorithm for loading and storing as well as de-allocation and flushing static data values that relate to triangles or objects pointed to by the static data pointers. The "scope" of operation relates to the number of triangles or objects with static data values held in internal on chip memory. The present invention uses a static data management method to allocate most recently used static data values on the IMC. The management of static pointer data and it's respective on-chip cache is separated into two main cache areas, the execution engine 3-D VDRL development, and the 3D engines rasterization process for output of final data. Although each section utilizes a separate manager operation for triangles in scope, the sections work together to insure that all data required for the entire set-up, 3-D VDRL, and rasterization process for each triangle or object primitive stays in scope for the entire process In an alternate embodiment, for lower cost implementations, the parameterization algorithm can also run within the firmware of the execution engine of the IMC, or may be implemented by a programmable CPU or DSP, or in an FPGA, comprised within or external to the IMC.

In an alternate embodiment, only a portion or block of the triangles corresponding to a subset of y scan lines are parameterized at a time. In such an embodiment, and for the "region based" mode of operation of the IMC system, during the execution engine's visible span line set-up process, all triangles for a given number of scan lines must be present prior to triangle set-up (step 404) for a particular object or portion of the output display. The number of scan lines used for each block, the "to-be" rasterized triangles, is a function of the speed and the amount of on-chip cache memory allocated to the IMC architecture. Preferably the IMC parameterization engine dynamically allocates the number of y scan lines for each block (screen section of n-span lines) to be processed based on the number of vertex points within the given block region.

In constructing the 3D-VDRL, in one embodiment the triangles are presented to the IMC in a spanning order by the graphics driver API. Thus, in this embodiment, the graphics driver, executing on the host CPU 102, may perform the set-up as well as the Y sort and/or X sort in software and present the triangles to the IMC ordered in a spanning manner.

If the triangles are not presented to the IMC in a spanning order, then the execution engine performs set up operations and programs the fast-sort engine within the IMC device. The Fast-sort engines preferably are composed of the X-sort, Y-sort and V-sort engines. The V-sort engine sorts the vertex pointers to the vertex data for each independent geometric primitive. The V-sort engine operates to determine the top-most vertex in each triangle primitive.

Triangles or quadrilaterals composed of independent, strip or fan vertex configurations are decomposed into vertex start positions and slopes used for interpolation of main and orthogonal slope data as in conventional 3D-polygon parameterization.

One aspect of the IMC 3D architecture is the solution of slopes into a representation that always scans from the left edge to the right edge of a triangle or quadrilateral. In the preferred embodiment triangle types supported are flat-top, flat-bottom, one main slope, 2-main slopes, and others. In order to accomplish this, triangles in which the apex (midpoint) is to the left of the main slope require a horizontal split at the apex. In an alternate embodiment the parameterization engine splits the triangle in two at the apex point and redefines new main-slope edges for the newly created triangle. The process of creating a flat-bottom (or flat-top) triangle is flagged in order to reduce the parameters required for later rasterization. Thus, a special process is used to initialize the graphics engine interpolation units for a left to right scan regardless of triangle orientation.

The retained mode of operation assumes that all of the vertex points within a block or full frame of display are present for the IMC to engage the sort engine during X and Z position and depth sort calculations. This mode "retains" the complete scene or scene block on a per frame basis. For conventional applications "immediate mode" rendering may also include storage of the depth information for the viewable spans. For "immediate" mode of operation the 3D-VDRL information is stored in temporary off-screen memory. The process then reads such spans from the off-screen memory and again compares off-screen image depth values to the source spans being calculated.

Before the X-sort process for each partial span segment starts, it is assumed that the X-sort process does not begin until the entire 3D object has been setup and the Y-sort is complete. After set-up and Y-sort, the X-sort engine then performs an X-sort (under control of the execution engine) on all start values along the main and opposite slopes of each span segment for each triangle located within the designated block. In the preferred embodiment of the IMC technology, a cache architecture is used to hold the most recent slope values of the polygons currently under the X sort process and the Z rules determination. Thus, for triangle parameters either a most recently used algorithm or alternatively a list of active "in-Scope" triangles are used, and the values of the X and Z main and ortho slopes required for the sort operation are accessed out of an internal cache memory. Thus, for performance, the internal cache blocks are sized for best speed of operation during the fast-sort process.

Only a minimum of cached values are required for each triangle to set up for the X,Y, sort, and Z rules operation. These parameters are the top vertex position of X,Y,Z, and the main and opposite slopes for the relative changes in X and Z per Y-step. Each triangle additionally has a memory reference pointer to the parameters for triangle edge slopes. Color, light, texture, and alpha coordinates are stored in external or internal cached arrays. The data values pointed to by the triangle reference pointer also point to the co-planer ortho values for each polygon. These ortho slope parameters and attributes are also cached within the device for triangles that remain "in-scope" for a quick calculation of the final output results.

Thus, the creation of the 3-D VDRL is broken into three parts; 1) The creation of a list of Y-ordered triangles with left to right set-up parameterization for some number of triangles within a specified block of span lines. 2) A fast X/Z sort and rules based depth algorithm for elimination of span segments that are hidden from view. 3) The building of a 3D-VDRL list which points to the respective source data for filling in areas between segments. Of course, an additional operation preformed by the 3DVDRL refresh and graphics engine executes the 3-D VDRL to assemble the data into the on-chip RamDAC or off screen memory for eventual output to the display device. Each of these three steps, including the process of adding alpha blending, anti-aliasing and other special effects are included in this disclosure. In the preferred embodiment, the refresh data and the VDRL execution are both accomplished by the same graphics engine data path. During a context switch of the parameters used for refresh to the DAC or off-screen memory and the object draw the same logical data path is preferably used. Thus, the same data path is traversed for both the refresh data and the execution data based on the output of the execution of a 3-D VDRL.

Alpha blending is accomplished by creation of a separate stream of 3-D VDRL for mixing and blending of triangles from one source with another. The 3D-VDRL calls multiple source streams and defines the percent blend between such sources by the values of the alpha stream. In alternate modes, the alpha stream may be replaced by constant register values or an iterated ramp of values for smooth blend from transparent to opaque.

Anti-aliasing is accomplished by adding fractional source flags into the 3-D VDRL as built by the execution engine. These flags are used during the rasterization process to determine how much of the span start is to be blended to avoid ragged edges in the output display stream.

Triangle Set Up and Parameterization

Figure 7:
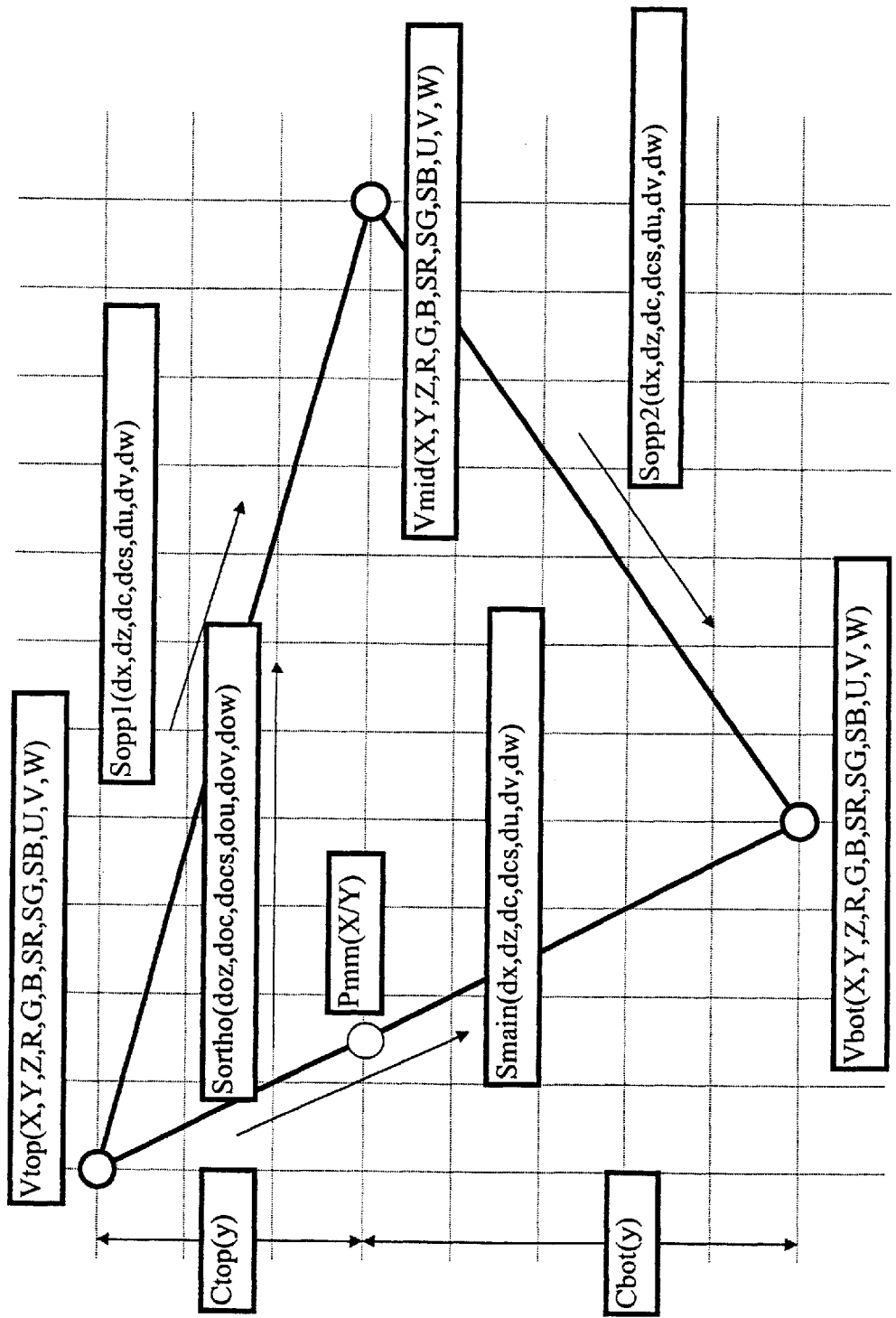
FIG. 7 is a pictorial representation of a triangle parameterization process for an example triangle.

FIG. 7 is a pictorial representation of a the triangle parameterization, alpha-blend, lighting and fog process for an example triangle. The example triangle includes three vertices referred to as Vtop, Vmid, and Vbot, which represent the vertex values read from a vertex list. The vertex list is normally created by the host CPU as part of the geometry and lighting phase of the 3D pipeline. This list may also be created from an internal transformation and lighting engine. The vertex list attributes, including alpha-blend and fog attributes, indicates the current fractional position of the vertex, the integer value for the shade and specular color content of the vertex, the texture coordinates for texture mapping and the perspective ratio for perspective error correction. The IMC preferably calculates the main slopes (edges) of the triangle or quadrilateral used for prediction of the next span line starting address, color, depth, and texture map coordinates.

Multiple cases exist for triangle parameterization. One case is when the main slope is left of the apex (mid point) vertex of the triangle, and a second is when the main slope is to the right of the apex point. Also, during the triangle parameterization flat top and flat bottom, single-scan line, and single-point cases are also detected for additional efficiency. In the preferred embodiment, it is desirable to only carry the minimum number of parameters to complete the entire polygon parameterization as required by the rasterization process.. In order to start the parameterization process, the execution engine first performs a quick position sort of the triangle to find the top and mid vertex. This conventional operation finds the minimum X and Y coordinate positions. From this information each of the two cases mentioned above can be identified. The easy case, for example, is when the main slope of a triangle is on the left of the mid vertex position. In this case the slope increment values for the positions and depths for the main and opposite edges are calculated and stored in a vertex array along with pointers to the remaining parameters required for completion of the set-up process.

Two factors determine how the parameters are derived before the sort operation. First, the Direction term, DIR. (Sign bit of the dXmain term) indicates the sign of the long side slope. If the Vmid (apex) is to the right of the main slope the direction term "DIR" is said to be positive, and has a binary value of zero. If the Vmid vertex point is to the left of the long edge then the DIR term is negative and represented by the value "one". The DIR term is used to determine the sign of the main slope. In the IMC technology, rasterization of triangles corresponds to how the display is rendered, e.g., is always from left to right. This implies that for Vmid vertex points to the left of the long edge (DIR=1) the triangle must be scanned with one opposite and two main slopes. In this case the parameterization must take into account these differences, as shown in FIG. 7.

The main slopes Smain(dx, dz, dc, dsc, du, dv, dw, da, db) are calculated according to the following equations:

For Triangles with DIR=1 the opposite slope incrementer Sopp(dx) is given by:

$Sopp(dx)=(Vbot(x)-Vtop(x))/(Vbot(y)-Vtop(y))$

The main slope incrementers Smain1(dx) and Smain2(dx) are given by:

$Smain1(dx)=(Vmid(x)-Vtop(x))/(Vmid(y)-Vtop(y))$ $Smain2(dx)=(Vbot(x)-Vmid(x))/(Vbot(y)-Vmid(y))$ These calculations are similar for S(dz,dc, dcs, du, dv, dw, da, db). Note that the dx term is positive if Vtop(x) is greater then Vbot(x), negative if Vtop(x) is less than Vbot(x) and when Vtop(x)=Vbot(x) a vertical slope is indicated.

Orthogonal (ortho) Slope starts are derived from the accumulated value(s) of the main and opposite slopes. Two cases are used to calculate the value of the orthogonal slopes.

1) For DIR=1, the main slope is always to the right of the triangle mid point.

2) For DIR=0, the main slope is always to the left of the triangle midpoint.

If the left hand rule is used, (Z increases to back of scene), for case #2(DIR=0) orthogonal slopes are calculated by the following algorithm:

$Smain(z)=Sortho(doz)+$(error term); assumption of assignment for ortho start.

$Sortho(doz)=(Vmid(z)-Vtop(z))/(Vtop(x)-Vmid(x))$

These calculations are similar for Sortho(doc, docs, dou, dov, dow, doa, dob)

As each main increment occurs, a new main value is calculated:

$X'=X+Smain(dx)$

Again, these calculations are used for each new starting position for the respective ortho spans. Z', U', V', C', CS', W' are all calculated in a similar manor.

In case #2(DIR=0) two additional terms are needed to "piece together" both the opposite1 (Sopp1) and opposite2 (Sopp2) edges. Once the opp#1 edge is complete, then opp#2 is used for a new X-slope calculation. Only the X position must be calculated for width of the triangles. Calculations are similar to case #1 except for the following;

For (Vmid(y)−Vtop(y)), Calculate Sopp1(dx)

For (Vbot(y)−Vmid(y)), Calculate Sopp2(dx)

The Ortho values are calculated as before from the main slope. Multiple embodiments exist for the fast sort operation. Some of which are more effective under certain conditions. Indicated below is one of the possible implementations to sort the values to obtain the input for the Z-rules engine.

Triangle Fast Y-sort and X-sort Algorithm

The Execution Engine (or alternatively an external CPU, DSP, or FPGA) of the present invention controls the loading of the fast sort engine. One function of the fast sort engine is for a sort of static data pointers in Y (incrementing Y-axis) based on the triangles Y-top value. With the top static data pointers for each triangle in an ordered list, the execution engine reads the parameters referenced by this list from Span line at Y(0) to the end of block Y(N). A cache memory holds the parameters for each triangle as read by the reference pointers. When the cache memory is full, an LRU/MRU algorithm may be used to hold triangle parameters for the most current triangle which is being processed by the execution engine. In alternate embodiments other cache or data buffer methods can be implemented to store local values for "in-scope" triangles. Each static data pointer references triangle static data which contains all the attributes and source pointers for each triangle. Each of the separate triangle information is referenced by its top vertex position within a given span line. When a new static data pointer value is associated with a new span line it is then assumed to be the start of a new primitive (triangle or polygon).

One particular embodiment calls for the execution engine to process the Y sort with use of main memory by writing the triangle pointer index in Y order while the primitives are processed into parameters by the hardwired triangle set-up engine. This bucket sort operation has one difficulty, i.e. when duplication of multiple triangles (primitives) are present on the same scan line with the same start or top vertex X and Y address. This can be resolved by a special flag within the vertex pointer, or by an alternate method to ensure that drawing order is preserved. Thus a method for indicating an address for the list of triangles that reside and start on the same position as other triangles is assumed. In this fashion, duplicate values have a pointer to an additional region where the first of duplicate pointers is located and additionally another duplicate flag can be set to indicate that even more primitive start vertexes reside in the same position on the same span.

The above process continues until all triangles have had the start vertex processed for Y order. Preferably, the IMC invention contains an on-chip vertex pointer cache, wherein the newly formed start vertex pointers are assembled into the cache.

In one embodiment, the execution engine 210 performs triangle set-up to process the triangles for parameter values in parallel with the Y sort to system memory as described above. In this embodiment, the fast sort engine operates under control of the execution engine to sort the Y vertex start values during the triangle set-up procedures. After the setup and Y sort operations have completed, the complete list of vertex information has Y-ordered pointers within memory, and all triangle slope data has been "set-up" for edge and orthogonal rasterization.

Flat top triangle primitives are a special case for the parameterization process. Typically the V-sort operation of the fast sort engine is able to identify V-Top. For simplified documentation of this disclosure, only the general case is described. Assume that the top vertexes of a plurality of triangles, all contained within the same span line (having the same Y-axis coordinate) all have static data pointers to a field of triangle static data values. Such parameter or static data values are eventually used to rasterize each triangle including texture, lighting, color, fog and blending for display output. In the preferred embodiment, the list of pointers for a single span line is contained "on-chip" and is stored within a cache type memory structure. Positional parameter values Vtop(x,z), Smain(dx,dz), Sopposite(dx) and Sortho(doz) are referenced by this Y-span position pointer and preferably are the first entries into the parameter array. A sorted list of Y-span pointers are preferably also cached along with a sorting initialization seed which is typically set to the last sort results (based on the previous span lines X-sort results). For the preferred embodiment all the positional parameters including the rasterization parameters (texture, Lights, colors, fog, alpha) are held within the on-chip memory structures. One embodiment of the operation of on-chip cache memory is such as described by conventional MRU/LRU caching architectures as described in prior art techniques. In addition, to conserve on chip cache memory, the rasterization parameters or "static data" can optionally be stored in a compressed data format either in an on-chip cache or in the main system or off-screen frame buffer memory.

Within the current embodiment, internal interpolation units for the main slope and opposite slope edges maintain the next span line values for the fast sort engine. After completion of calculation of the main slope values for a particular triangle segment on the current span line the execution engine retires the incremented values in preparation for the same process on the following span line. Thus, the DDA process of V(new)=V(old)+dV(edge) has been precompiled and is written back to memory or cache array for the next span line "Current Y+1" for all triangle parameters in preparation of the next 3-DVDRL span building operation.

The execution engine next reads necessary X and Z parameter information pointed to by the Y-axis sorted list. These values preferably include:

For DIR=0, Vtop(x, z), Smain(x, z), Sopp1(x) or Sopp2(x), Sortho(z), (Vbot(y)–Vtop(y))

For DIR=1, Vtop(x, z), Smain1(x, z) or Smain2(x,z), Sopp(x), Sortho(z), (Vmid(y)–Vtop(y)) or (Vbot(y)–Vtop(y))

This information is preferably located at the top of the triangle parameter list. In an alternate embodiment, only the X and Z parameter information is read for examination and removal of hidden surfaces. In this case temporary registers defined as the "slope cache" hold the intermediate iteration terms for each span line. The other parameters are called during the rasterization process. In the currently preferred embodiment during actual span segment fill (3-D VDRL execution), all of the triangle parameters including the color, depth, texture address, fog and alpha values are read and maintained on-chip for future processing.

Figure 8:
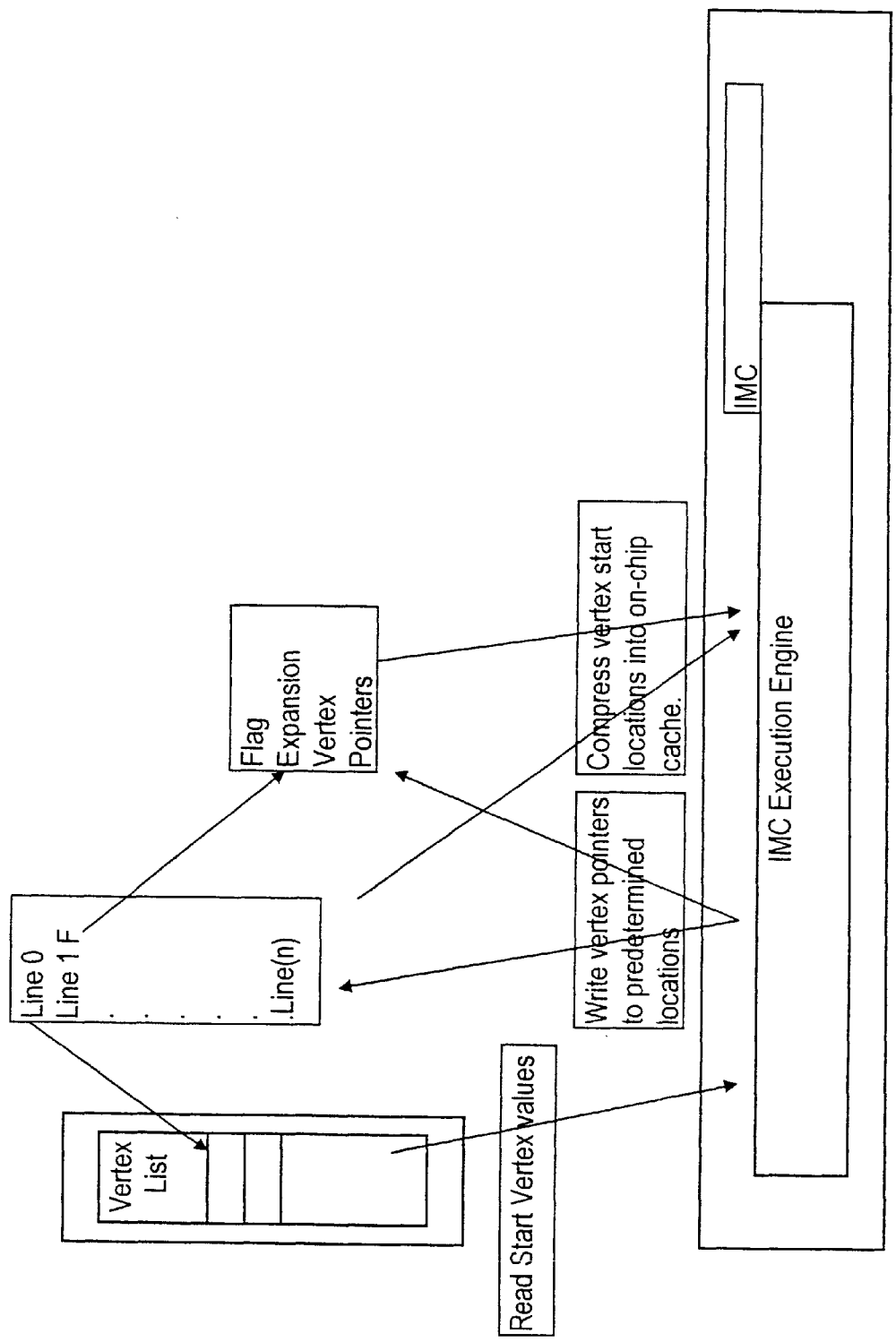
FIG. 8 illustrates an example case of span line bucket sort process.

FIG. 8 illustrates an example case of span line bucket sort process as described in the main embodiment above.

Once the Static pointer array is built with all the V top information and the triangle parameters are calculated, the IMC can begin the x-sort and depth rules processing for each span line. In the preferred embodiment, all span values for the first (top) scan line are stored and pointed to by on-chip reference pointers. As the execution engine, or alternatively an iteration engine, steps the main and opposite slope iterations, it loads the span segment x start values and triangle span segment identifier into the fast-sort engine. The goal of the fast x-sort process is to obtain an x-ordered representation of all triangle span segments for the entire span line. In this process, preferably a sort of triangle main edges gives the start and stop locations of triangle main and opposite edge locations. The process calculates the main and opposite edge values (including fractional precision) in preparation for the fast X-sort operation. Before retirement of the triangle main and opposite edge parameters within the execution engine, all information related to the interpolation of the main edges of each primitive is assembled into the IMC for determination of hidden surface removal on a per scan line bases. Thus this process sorts minimum x-axis starting values for each triangle for each displayable span line.

X-fast Sort Algorithm

The following describes the preferred design and algorithm for the fast X-sort engine. Various methods may be used to sort data for order dependency. One novelty of the IMC is how the sort is completed and how each sorted data element retains pointer information to address back into the original data array. The fast-sort engine task is to sort "N" data points such that each successive point is equal or larger to the previous. In addition each point has a reference pointer associated with it that does not change during the operation. Thus, the fast-sort engine builds a list of pointers which reference triangle span segments that indicate x position in incrementing order.

In an alternate embodiment, a 2-stage (course and fine) X-sort with overflow support may be performed by the execution engine to segment the incrementing span segments at a gross level. This may be accomplished during the load of the fast-sort engine array. In this embodiment, if the execution engine looks at the most significant bits of the x-span position, the fast-sort array could be divided into segments which get loaded based on a binary decode of the x-span most significant address bits. For this embodiment of the invention we will preferably assume that the fast-sort engine array is loaded by a previous seed array. The seed array is cleared on initialization of the 3D-VDRL build process, and thus will force random loads on initialization. For each span sort following the first, the seed array, which is the result of the last sort, is used by the execution engine to write span segments into the fast-sort array. Thus, with the use of the seed array, the time to converge the fast-sort process is reduced.

In the preferred embodiment, the fast-sort algorithm is based on comparison of the sign term after a difference operation and a swap of positions based on such sign term. Given a random array of unsorted data values, the fast sort engine subtracts the second term from the first term, the fourth from the third, the sixth from the fifth . . . etc. up to the last term of the array. The fast sort engine then uses the sign bit (+/–) from the result of the difference operation to swap terms if needed. If for example the sign bit of the difference of the first and second terms was negative, then those two terms would be swapped in position within the array. For positive signs, no swap occurs. The procedure is repeated for the entire array and can be accomplished in parallel (single cycle) for improved speed of operation. The next step is to follow the same procedure but now starting by subtraction of the third term from the second, the fifth from the fourth . . . etc. up to the last term of the array. Again, the sign bit, if negative, will result in a swap of the terms. The entire procedure repeats again with subtraction of the second term from the first term as before. Completion of the sort is determined when no more negative results are shown for two consecutive cycles. This operation is preferably performed in parallel for all terms within the sort array, and preferably is implemented in a hardware fast-sort engine. Thus, in the preferred embodiment, a hardware sort engine processes all the even terms and then all the odd terms in two clock cycles, with a repeat of such process until both the even and odd process results in no negative signed results. It can be shown that the average probability of full sort convergence can be achieved in N+2 clock cycles. Where N represents the number of terms loaded into the fast-sort array.

FIG. 9 illustrates an example that shows a simple 8 term sort with the IMC fast-sort algorithm. Procedure Example: At clock cycle #1, 7–5=2, thus sign is positive. 8–2=+4, 5–1=+4, 3–4=–1 thus negative sign and therefor at cycle two term 3,@p8 swaps with old 4,@p7 and 4,@p7 swaps position with 3,@p8 within array. At clock cycle #2, the odd terms are subtracted. 2–7=–5, 1–8=–7 and 3–5=–2 thus for clock #3 all three terms have negative results and swap positions. This procedure continues until clock cycle #7 where all signs are null (zero) or positive and again in clock cycle 8 all signs are null or positive. The array is now sorted. Note that the @pointer values track the changes so the execution engine can read more triangle data now in span order for the next process of hidden span rejection.

In the above example, eight cycles are required to converge a sort of eight values. With a preferred sort array width of 128 and a clock frequency of 100 Mhz, the average scan line can be sorted in 1.3 us. For improved sort speed a successive load of the sort array can be "seeded" by use of the sort results of the previous span sort operation. Thus, in a preferred embodiment, the "array-seed" table or the table which holds span sorted triangle pointers is used to converge the results more rapidly. The following flow chart represents preferred embodiment for load and sort algorithm used to sort an array of pointers based on positional values. Thus, given an array of triangle pointers and multiple X-positions, this algorithm will fast sort segments by X position in order, from smallest to largest, while retaining both triangle pointers and the initialization seed array.

The following procedure represents the preferred embodiment for load and sort algorithm used to sort "N" array pointers based on positional values.

Step 1) Execution engine reads from triangle top vertex pointer array into the onboard memory values required for the first step of 3DVDRL build.
(Note: in preferred embodiment these values may already be present in the IMC on chip memory from previous steps.)

Read External memory at static data pointer entry 1 (@tripntr1)

Write to IMC internal memory @Local_TriPntr1
For DIR=0, Vtop(x, z), Smain(x, z), Sopp1(x) or Sopp2(x), Sortho(z), (Vbot(y)−Vtop(y))
For DIR=1, Vtop(x, z), Smain1(x, z) or Smain2(x,z), Sopp(x), Sortho(z), (Vmid(y)−Vtop(y)) or (Vbot(y)−Vtop(y))

Step 2) Execution engine writes main(x) and TriPntr each to the sort array for each entry in the TriPntr array.
(Note: If the number of entries in the TriPntr array exceeds the number of positions in the fast sort array then the execution engine uses a standard bucket sort to screen entries during the load process. As described previously, in this process, the execution engine will examine the most significant bits of the main(x) value and discard the load if not within the load range. In most cases only the top two MSBs of the main(x) position is required.

Step3) The execution engine issues a "start-sort" to the fast sort array. During the fast sort operation and if this is not the top of screen or top of block, the execution engine will load and start the "Z-rules" process in conjunction with the next fast sort process. The Z-Rules engine is described later in this disclosure. Before the execution engine issues a "start-sort" instruction, it must first read the ordered triangle pointers from the fast sort array and store the pointer order in temporary workspace memory.

Step 4) After conversion of the fast sort engine, the execution engine moves the ordered triangle pointers into a temporary array. The execution engine preferably instructs an external hardware iteration to increment the main slopes of the triangles in preparation for the next span line 3DVDRL build. In an alternate embodiment, the execution engine can iterate the main slopes by firmware operation. The iteration process is as follows:

a) Read the TriPntr (first in order from temporary array) which now represents the first triangle to be drawn or closest to the left edge of the display.
b) Use the TriPntr to locate the triangle slope information used in the next step.
c) Read Smain(x) and the Xstart position and iterate.

$Xstart\_next = Xstart\_last + Smain(x)$ d) Load the first entry of the fast sort array with Xstart_new.
e) Continue the process until the fast sort array is full.
f) Remove and add TriPntr(s) as needed for "in-scope" operation Step 5) The execution engine again starts the conversion of the fast sort array and then begins processing the Z-rules algorithm for hidden surface removal.

Note: Preferably there are two blocks of data. One is incremented dynamic data for the next scan line, going to the fast-X-sort engine. The other is the sorted X data for the current scan line, which goes to the Z-rules engine. These two steps can be independent from intervention of the execution engine. The steps indicate a pipeline of rolling span lines processed first by the sort engine and second by the Z-rules engine.

Step 6) The execution engine, under control of the block cache controller, watches for triangle mid points and completion points by keeping a running log of Y(count) and comparing this value to Y(mid) and Y(bot). When a triangle has completed the TriPntr is no longer needed and space in the on-board triangle parameter cache is freed up for new triangle parameterization data. Note that a triangles attributes (static data, original vertex data) is not de-allocated until the entire 3D VDRL is completely built for that triangle.

Z-rules Algorithm, Hidden Surface Removal

In most conventional 3D rasterization systems a conventional Z-buffer is used to determine which fragments are in front or behind. This process of hidden surface removal is used to prevent drawing of objects that are behind other objects. In this conventional approach, time is wasted due to complete processing of triangle draw, and at the last moment, the eventual display pixels are masked based on a Z_buffer compare result. In the IMC invention, the hidden surface operation turns into a "hidden span" removal process and is done well before any triangle drawing process. Thus, fragments that are not visible on the display device are not processed and computation and draw time is improved. To accomplish this task the execution engine firmware is used to process a simple set of "rules" to determine which one dimensional spans overlap other spans in depth space. In an alternate embodiment, a separate hardwired engine can resolve the Z-rules hidden surface algorithm. In this alternate embodiment, the novel Z-rules state machine is controlled by the execution engine. All the required values to determine span visibility are loaded into the rules state machine by the execution engine. There are many cases where triangles overlay each other that must be considered. As a gross approximation, if no other triangles are within the x-start and x-end range of a triangle span segment it can be assumed that the z coordinate values of this section of an individual span will not matter, and that particular span segment will always be visible. These decisions are preferably made by the hardware z-rules engine. For the purpose of this disclosure most of this section talks in terms of a "less-than" Z comparison functions, and triangles being "nearer" or "farther" from each other. It should be noted that in fact the invention will implement any of eight comparison operations, and the operations either "pass" or "fail". Within this disclosure the "less-than" comparisons as documents are placeholders for the generalized comparison operations. Thus, all the rules defined for "less-than" can carry over to all eight of the generalized comparison operations. In addition, for representation of FIGS. 10–28 the slope sign for Z-ortho is such that "Z-back" implies an increasing negative value, while Z-Front implies an increasing positive value. Thus, for the following disclosure, a negative Z-ortho slope indicates a span that traverses from the front to back in the Z-plane.

Figure 10:
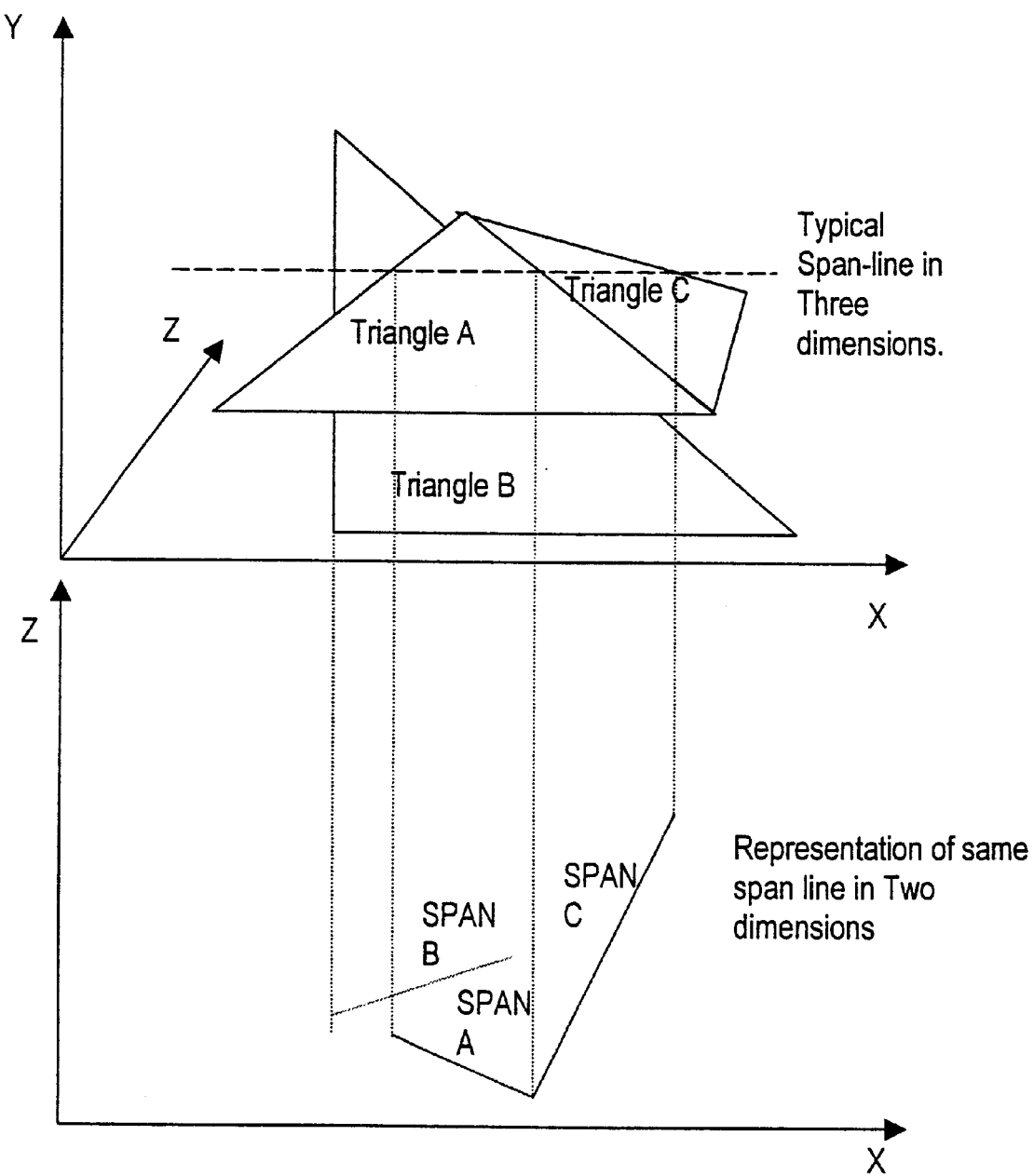
FIG. 10 illustrates how triangles are converted to spans and how spans are seen from the depth space orientation.
Figure 11:
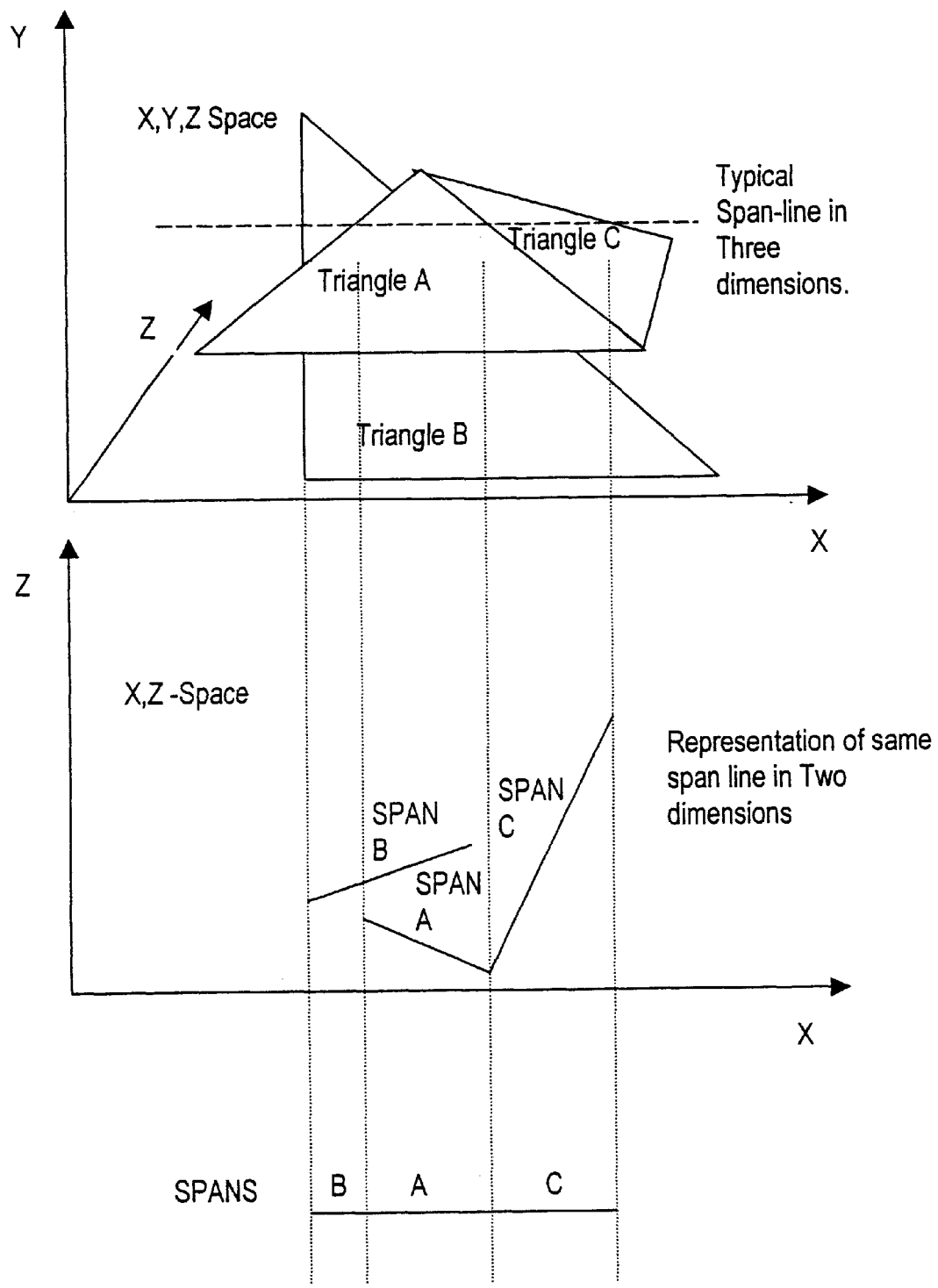
FIG. 11 illustrates span reduction to a single dimension.

FIG. 10 illustrates how triangles are converted to spans and how spans are seen from the depth space orientation. FIG. 11 illustrates span reduction to a single dimension.

As shown in FIG. 10, the transformation from three to two dimensions simplifies the hidden surface removal problem into depth slopes (Sortho(Z)) and positions (Xstart, Xstop). Also, in reference to FIG. 10, the fast sort array would determine that TriPntr order is B, A, C. This order is based on the Xstart position of each line segment. With the start and stop X positions and the orthogonal depth slopes for each segment, a set of rules can now be applied to determine hidden span information.

There are three simple conditions for the determination of span visibility. Totally hidden, totally visible, and partially visible. The totally hidden case is a simple comparison of complete inclusiveness of one span within another. To determine the totally hidden case the Xstarts and Xstops and Zstarts and Zstops or Zortho slopes (i.e. dz/dx) are required. During this first rule check for visibility, a quick determination of the partially hidden case may result. For the Totally Visible case, it is assumed that no other spans are within the same X region of any other spans. In this case a simple rule checks that the Xstop of the previous segment is less than or equal to the Xstart potion of the next span. A partially visible case is determined by not a totally hidden case and not a totally visible case. If the right endpoint of one segment has the same X and Z coordinates as the left endpoint of another segment, this is not a partially-visible case. Thus, Overlapping end points are not considered partially visible. Within most 3D objects, triangle edges and vertex points can be equal but do not overlap. In these cases, sub-pixel processing is used to determine the amounts of contribution between pixels that overlay each other at the intersections or when values are equal.

Partially visible spans are the most computationally intensive. A simple set of rules can determine segment visibility and intersection points.

The first observation is that depth or Z orthogonal slopes that are opposite in sign will never intersect as long as the starting points of each segment start such that the positive slope references a span start Z value that is greater-than the start Z value of the other negative slopes. Likewise, the same is true for negative slope values where the other span (positive slope) start Z value is greater-than the negative slope start value. In addition, Z orthogonal slopes of the same sign may never intersect based on start position for both X and Z and slope values. For example, in FIG. 12, The Z orthogonal slope value for Triangle B is greater than that of triangle A and the start position for triangle B is before that of Triangle A. It can therefore be seen that another rule may be applied: For span segments where, in comparison the first X value is smaller than the second X value, and the Z value of the first is greater than the Z value of the second, and the Zortho slope value of the first is less than the Zortho value of the second, then such lines will never intersect and therefore the span with greater Z-start will always be in front. Thus, based on orthogonal slopes and positions, a set of rules can be developed to determine the span segments and their start/stop visibility addresses. The process to define the conditions can be a simple look-up process and the results of the lookup determine if additional computation is required to resolve the hidden spans.

Figure 12:
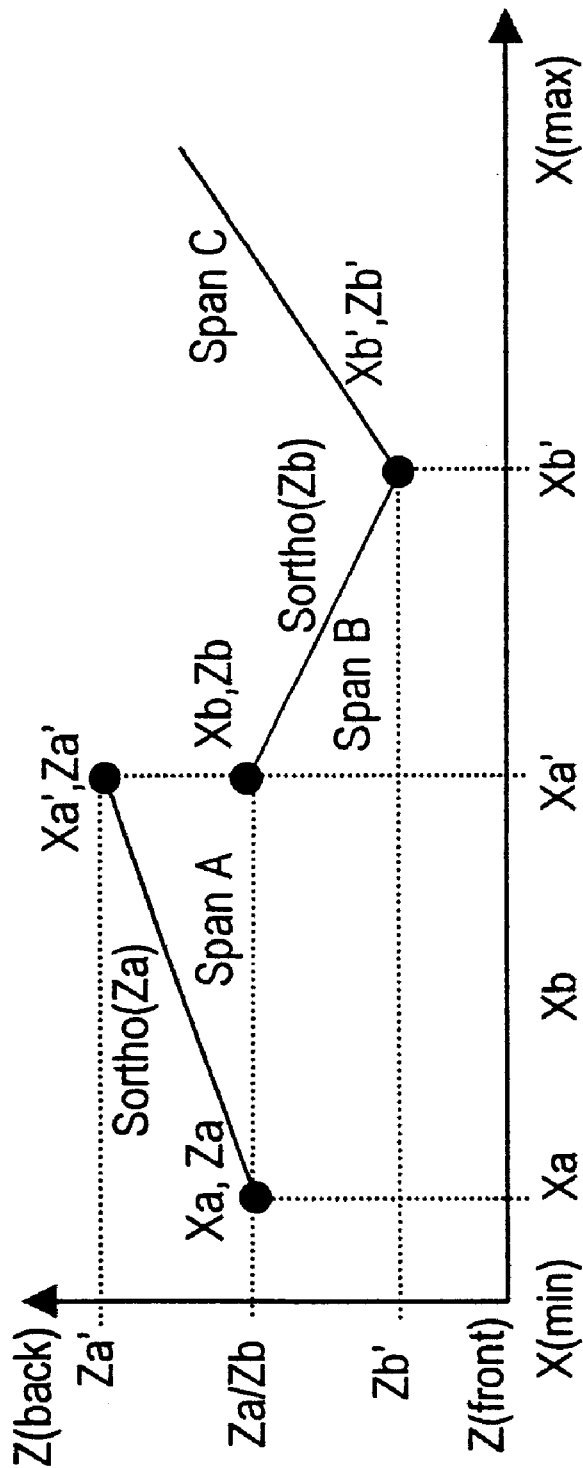
FIG. 12 illustrates an example of visible span segments.
Figure 13:
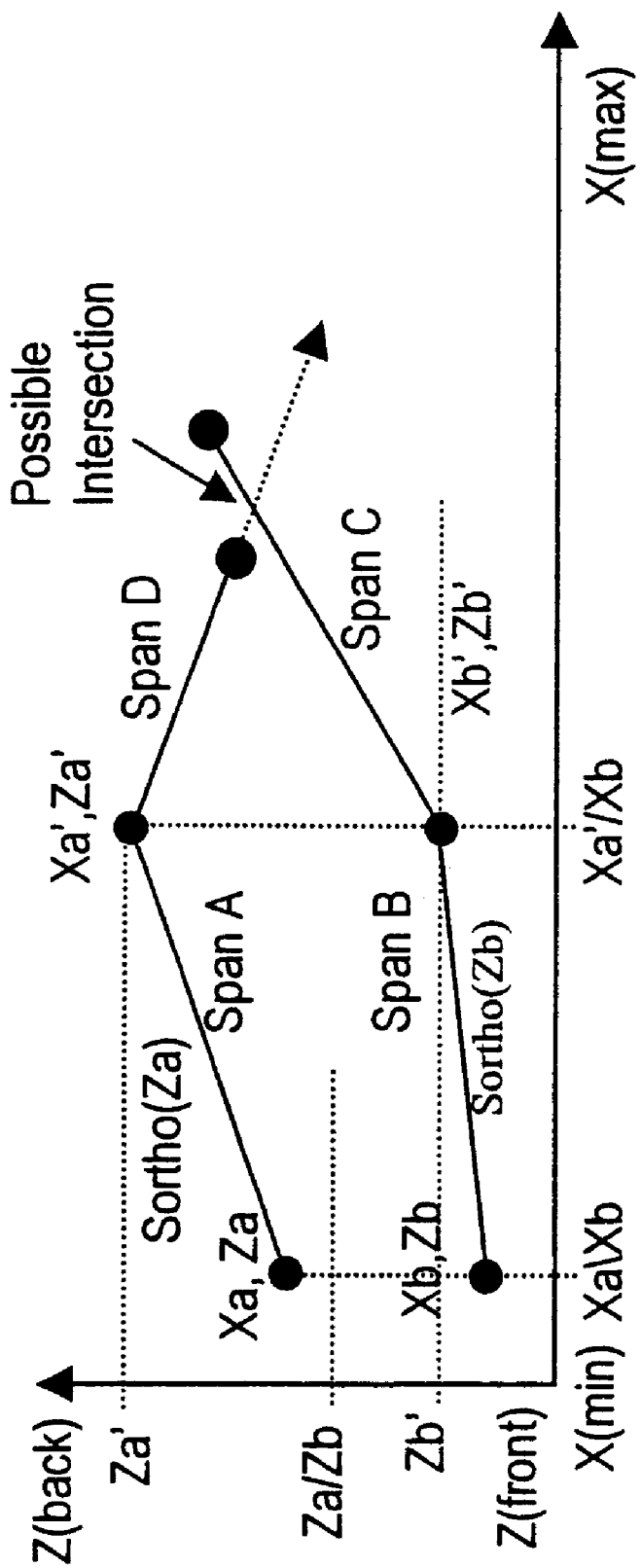
FIG. 13 illustrates an example of totally hidden span segments.

The following comprises a few examples which help explain the terminology, and the algorithm is described after these examples. FIGS. 12 and 13 show three typical cases of spans with depth in "X" space. For discussion sake, assume that the front or closest point to the eye is more positive(note that this nomenclature, Z more positive towards the eye, is opposite that of industry standard and that either nomenclature is correct) than the back or furthest point from the eye.

In such a case any spans that have a start position (Za) with a larger depth coordinate than the stop position (Za') will have a negative orthogonal slope (Sortho(Z)). Likewise, any span with a start depth position (Za) which is smaller than the depth stop position (Za') will have a positive orthogonal slope.

It can be assumed that the results from the fast sort array is: Span a, Span b, . . . Span n which indicates an order of the leftmost X coordinate Xa, Zb, . . . Xn of each span. The first test, Totally Visible Test, is dependent on X position only. As seen in FIG. 12, a span is considered totally visible if the stop position Xa' is less than the next span start Xb. If Equal (Xa'=Xb) then the span 'a' is totally visible if Za' is greater or equal to Zb. As for the second span 'b', an additional check for total visibility is when Xa' is equal to Xb then for span 'b' to be totally visible Zb must be greater than or equal to Za'. As seen in FIG. 12, span 'a' is not totally visible while span 'b' passes the rules check for totally visible. Totally visible spans are the most computationally simple and require no additional computation for hidden surface removal.

After determination of no total visibility, a test for other totally hidden spans is completed. As shown in FIG. 13, span 'a' has Xa greater than or equal to Xb and Xa' less than or equal to Xb'. Also, a quick test for Za less than or equal to Zb and Sortho(Za) less than or Equal to Sortho(Zb) will determine that span 'a' is totally hidden by span 'b'. A special case for intersection occurs when all conditions are met except Sortho(Za) is less than Sortho(Zb). In this case totally hidden spans must go through an intersection calculation. As seen in span 'd' and Span 'c' of FIG. 13, an intersection test will determine if span 'd' is partially visible. In such cases, the totally hidden test fails, and the z-rules check continues under the assumption that the span in question becomes partially visible. When spans are determined to be totally hidden they are removed from further calculations and excluded from presence in the 3DVDRL.

Figure 14:
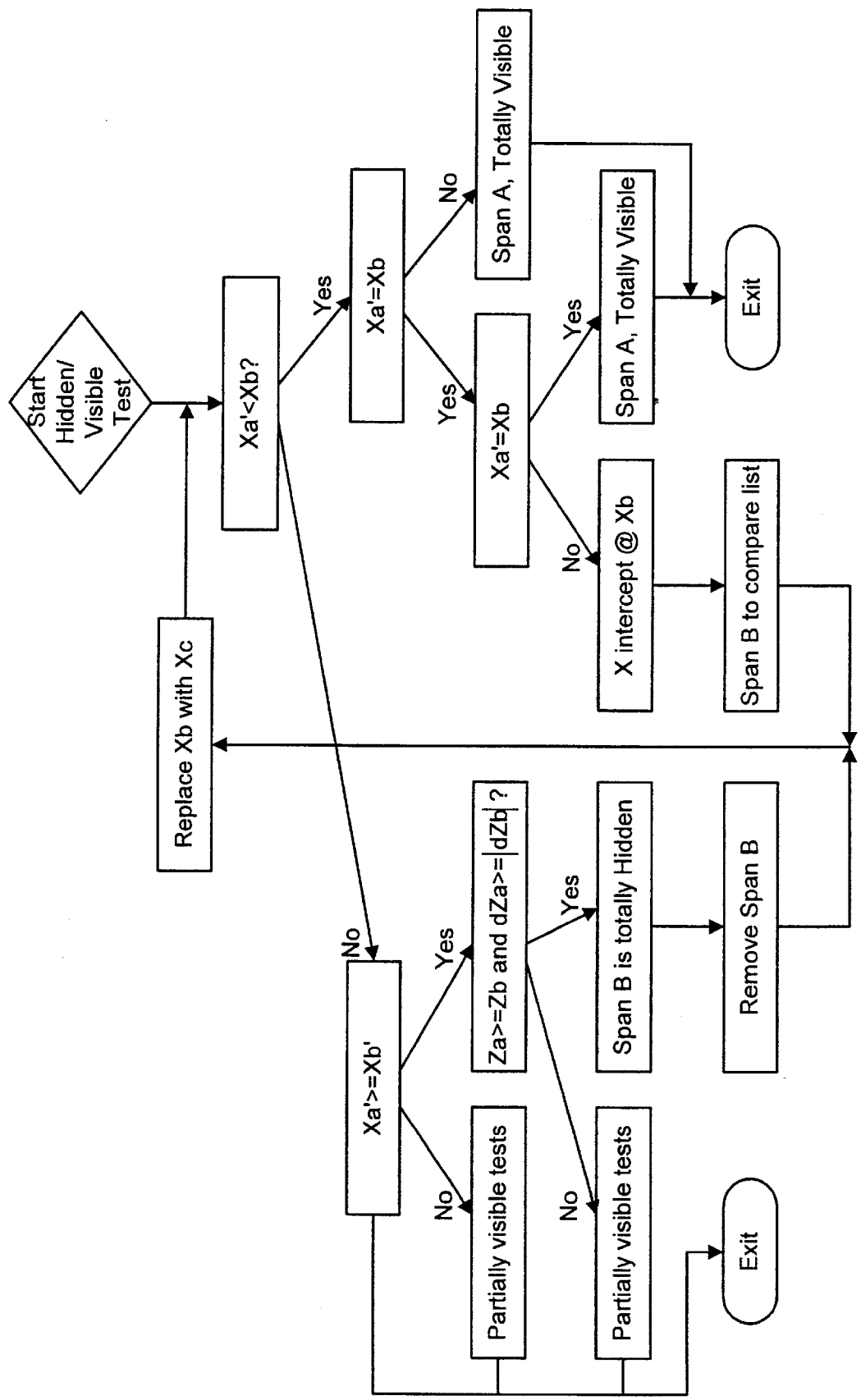
FIG. 14 is a flowchart diagram illustrating determination of hidden and visible span segments.

FIG. 14 shows the preferred embodiment for the flow to determine total hidden and total visibility in preparation for the intersections test flow. When a determination is made that a span is neither total visible nor totally hidden, then a first assumption is that the span is partially visible. One point of interest is that all spans start to the left and traverse to the right. This fact eliminates two of the four possible quadrants for Z slope determination. Slopes in Z can only be equal, positive or negative. Thus, all ortho slopes are between minus infinity (vertical up) and plus-infinity (vertical down). The most mathematically intensive operation is the solution for intersection of two spans. In the majority of the cases partial visibility can be determined without the solution to the Z position intersection. A set of rules according to the flowchart of FIG. 14 can be used to determine if a solution for the depth intersection is required. The flow from less complex to more complex solutions allows the spans hidden surface results to "fall-out" early such that no further computation is required for each particular span. Note that for documentation sake, the nomenclature of Slope=−1 implies that dz/dx is equal to minus infinity and Slope=1 implies that dz/dx is equal to plus infinity (arrow vertically down). Also, a value of Slope=0 implies that dx=dz (arrow is horizontal).

Figure 15:
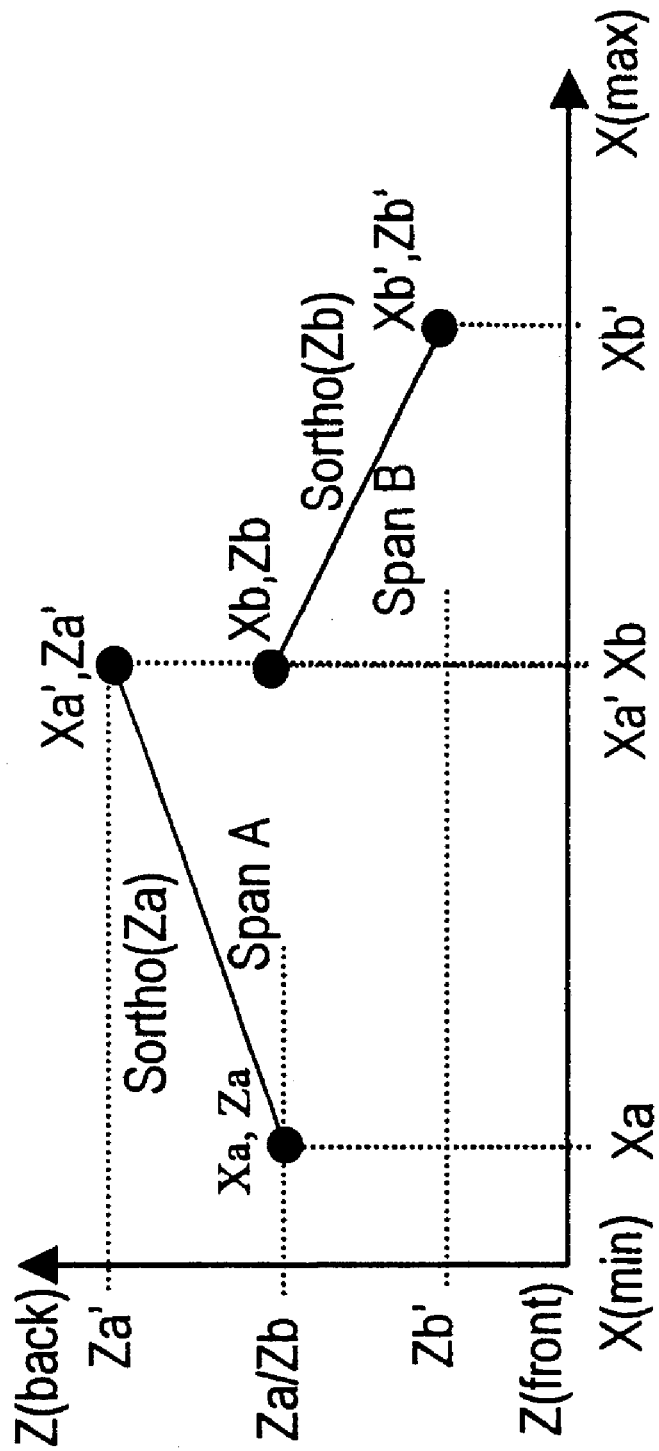
FIGS. 15–27 illustrate examples or cases of the operation of the flowchart of FIG. 14.

A number of cases can be illustrated to represent the flowchart indicated in FIG. 14. For example, Case #0 is shown in FIG. 15. When span 'b' starts where span 'a' ends, i.e. Xa'>=Xb, Then some simple rules can be established. Under most applications, the end and start points of separate span segments will overlap when Xa'=Xb and span 'A' is considered to be in front if Za'>=Zb. Thus, Span 'A' is always in front. Likewise, if Xa'>Xb, span 'A' is also always in front at Xa'. On the other hand, if Xa'=Xb and Za'<Zb, then Span 'A' at Xa' is hidden and the pixel at Xb is visible.

Figure 16:
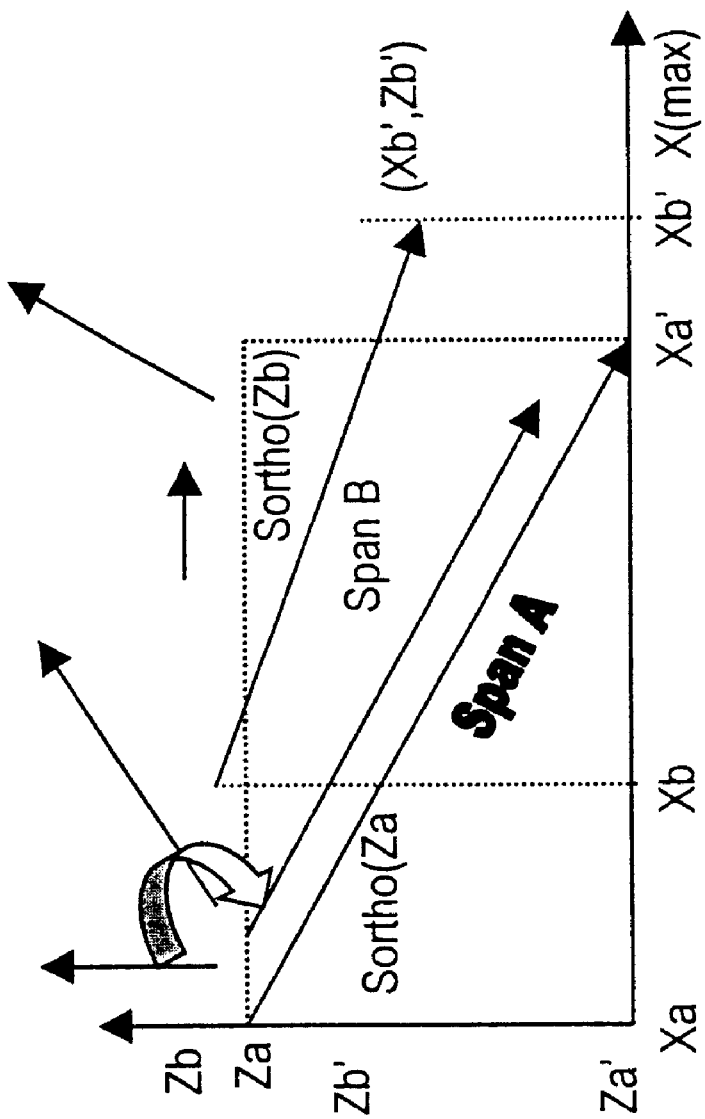
Figure 17:
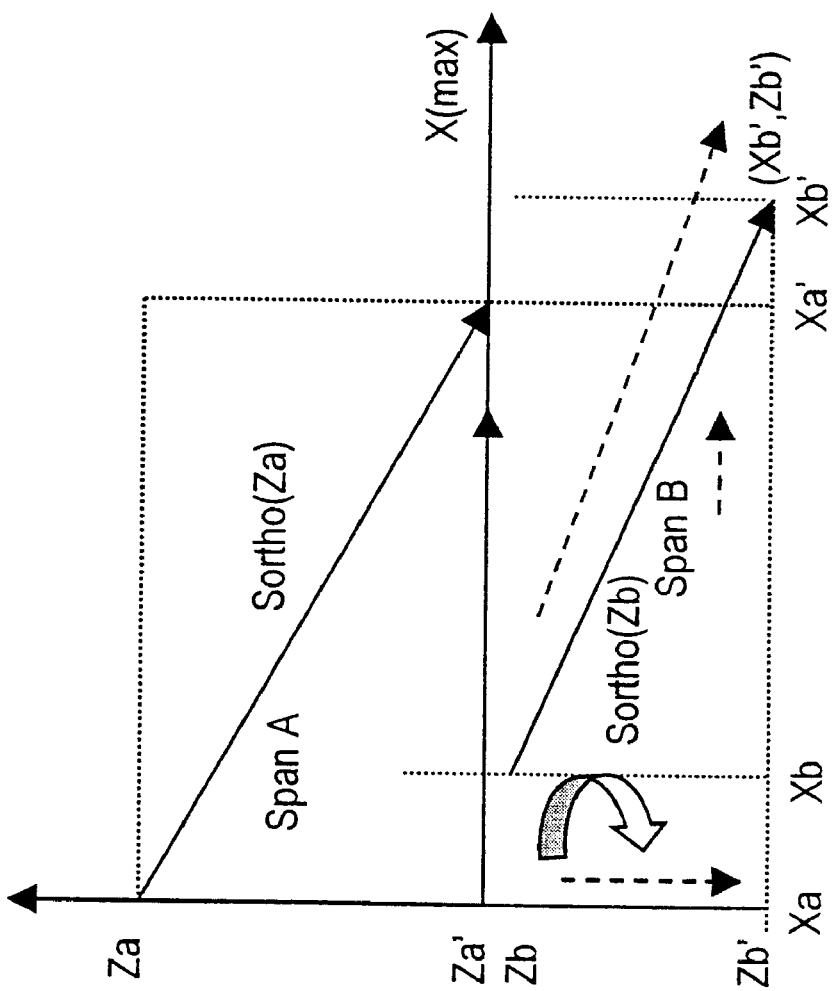

Case #1 is shown in FIG. 16. This case is for all Sortho(Za)>0 i.e. that the first span (leftmost) has a depth slope greater than zero. Note that as the Z-rules algorithm runs, the leftmost span is the one which has not been tested against the rules but has the smallest 'X' value. In the case shown in FIG. 16 span 'A' is tested against all of the other spans which have 'X' start positions to the right of the span 'A' start position that fall inside the range of Xa to Xa'. In the first case, span 'A' is always in front of span 'B' if span 'B' meets three criteria;

1) Sortho(Za)>0
AND
2) Sortho(Zb)<=Sortho(Za)
AND
3) Zb<=Za
THEN SPAN 'A' IN FRONT OF SPAN 'B'

For case #2, shown in FIG. 17, again Sortho(Za)>0. In this case, Sortho(Zb) must be greater than or equal to zero. If the following rules check is "true" for the three tests as indicated, then span 'B' is always in front of span 'A';

1) Sortho(Za)>0
AND
2) Sortho(Zb)>=0
AND
3) Zb>Za'
THEN SPAN 'B' IS IN FRONT OF SPAN 'A'

Figure 18:
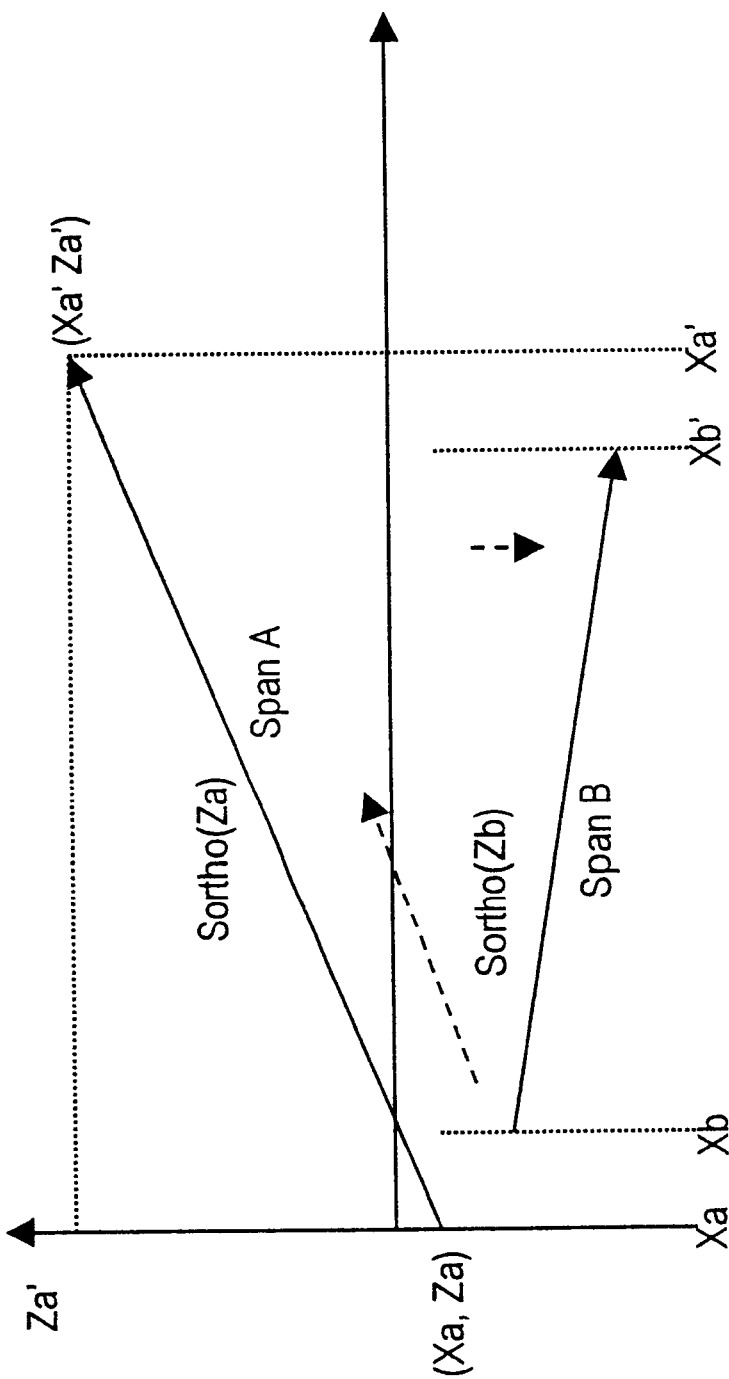

Case #3 in FIG. 18 shows that span 'B' is in front of span 'A' when the following rules are met;

Sortho(Za)<=0
AND
Sortho(Zb)>=Sortho(Za)
AND
Zb>Za
THEN, SPAN 'B' IS IN FRONT OF SPAN 'A'

Figure 19:
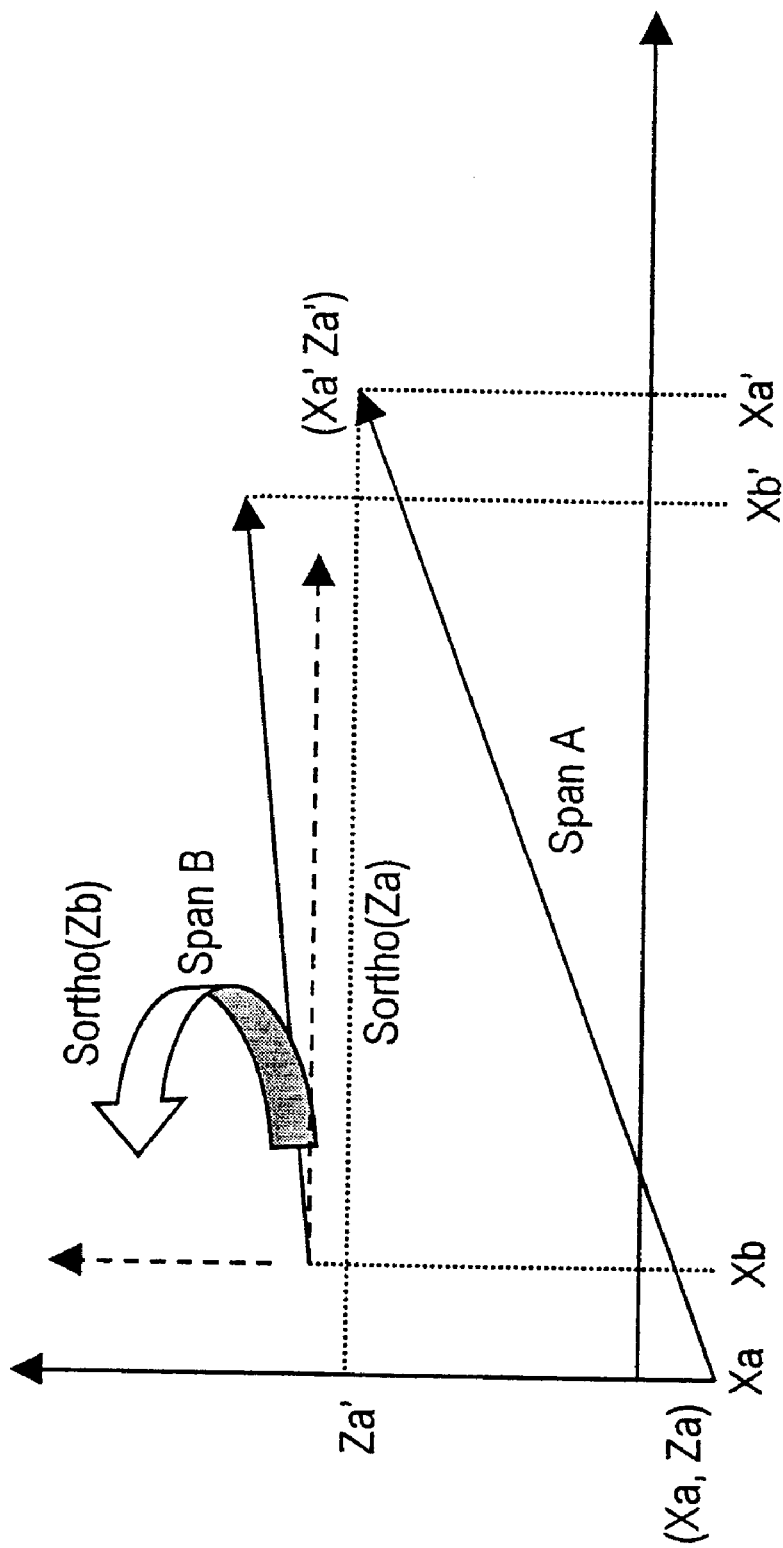

FIG. 19 shows the conditions for case #4. Here, when the next span segment is greater than the end of the last span and the slopes are both negative, then Span 'A' will be in front of Span 'B'. In order for this test to be seen the following rules must be met.

Sortho(Za)<=0
AND
Sortho(Zb)<=0
AND
Zb<Za'
THEN, SPAN 'A' IS IN FRONT OF SPAN 'B'

It can be seen that cases #1 through #4 will determine front/back (hidden or not hidden) spans that do not start or end within the area of the previous span which is under hidden rules based testing. In the previous cases, span 'B' was tested against span 'A' assuming that span A has an Xstart position which is less than or equal to that of span 'B'. In the following cases, tests are preformed on spans that intersect or start/end within the span area of the previous span. For the following cases an intersection of the spans under test must be calculated to determine visibility. The intersection solution is standard knowledge, and should be known to those who understand the art. Cases #5 and #6 determine span position of two spans when the first span, or reference span, is has a slope between negative one and zero.

Figure 20:
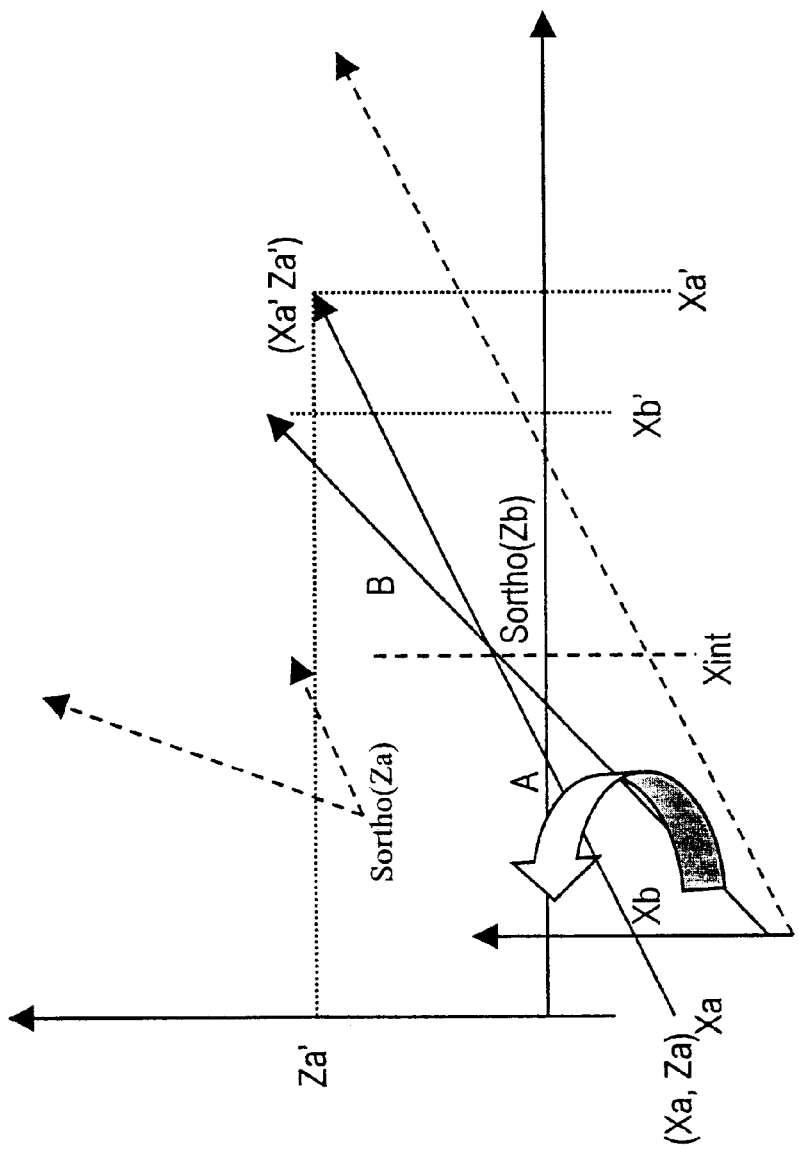

As shown in FIG. 20, case #5a shows test span 'B' as parallel with span 'A' up to a slope of negative one. For this case span 'A' has a negative slope. All tests against span 'B' are made to determine where the intersection point (Xint) with span 'A' exists, if at all. The following rules can be assumed;

-1<=Sortho(Za)<0
AND
Sortho(Zb)<Sortho(Za), Xb<=Xa'
AND
Xa'<Xint, Xb<Xint
THEN, SPAN 'B' IN FRONT OF SPAN 'A'
ELSE IF
-1<=Sortho(Za)<0
AND
Sortho(Zb)<Sortho(Za), Xb<=Xa'
AND
Xint<=Xb
THEN, SPAN 'A' IN FRONT OF SPAN 'B'
ELSE IF
-1<=Sortho(Za)<0
AND
Sortho(Zb)<Sortho(Za)
AND
Xa'>Xint>Xb
THEN, SPAN 'B' IN FRONT OF SPAN 'A' TO XINT, THEN SPAN 'A' IN FRONT OF 'B'

Figure 21:
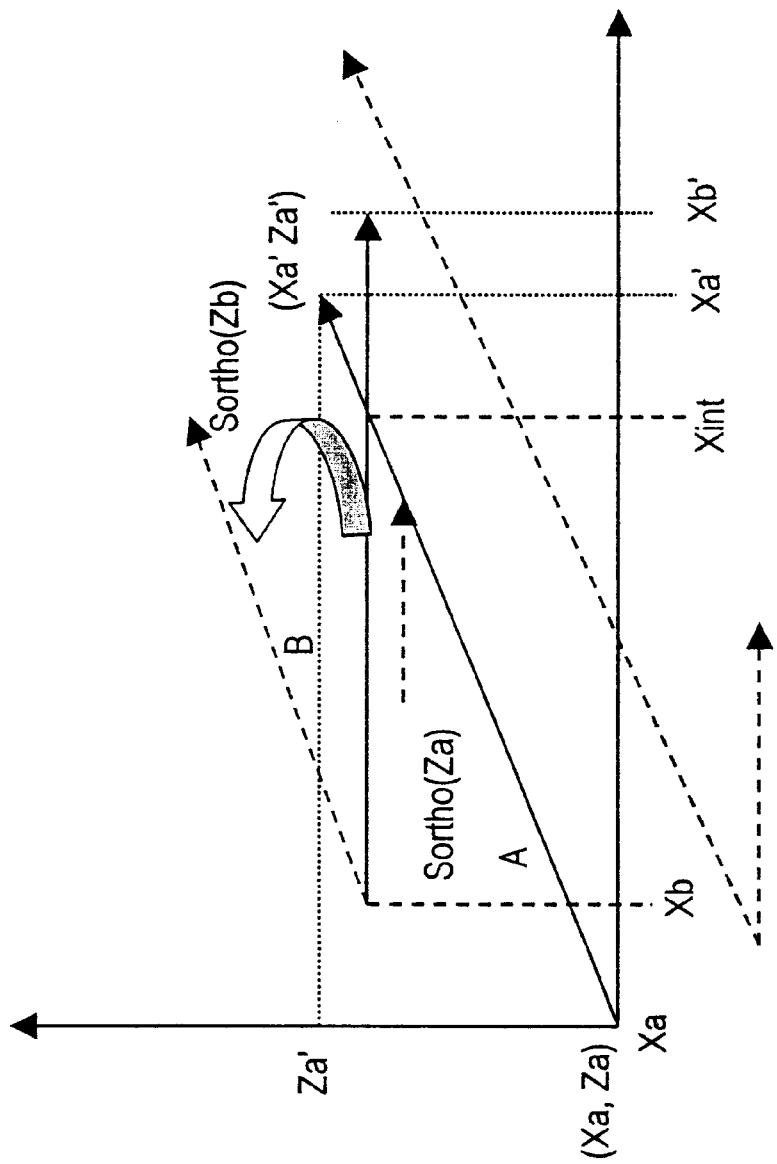
Figure 22:
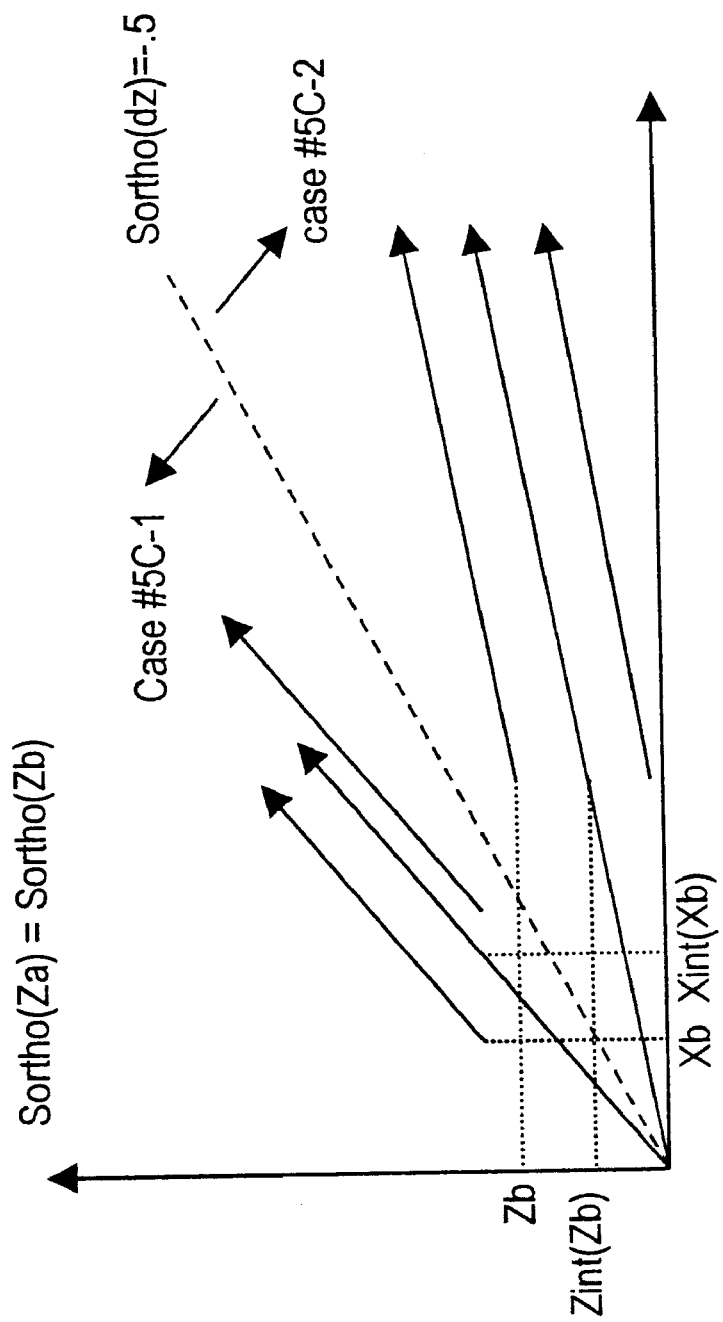
Figure 23:
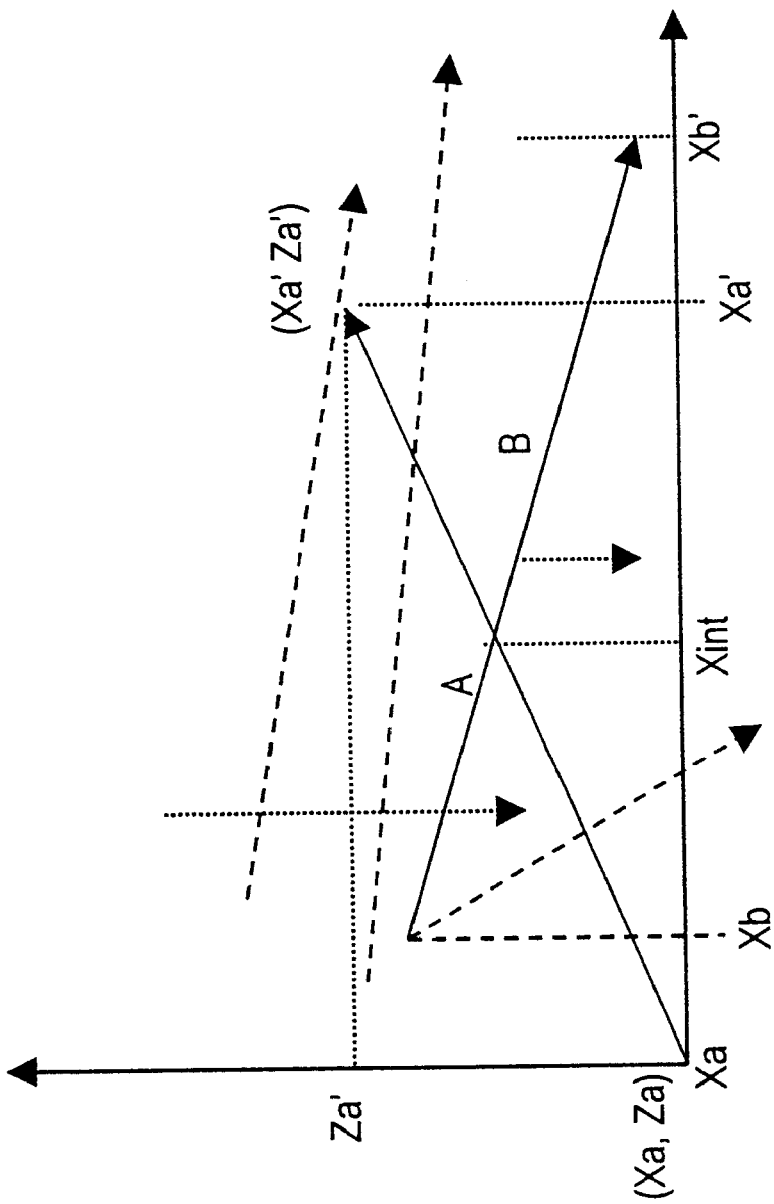

FIG. 21 shows case #5B. Here span 'B' can run parallel to span 'A' with a slope direction that varies to horizontal or a value of dz/da=zero. Span 'A' again has a negative slope. The following rules apply to determine hidden spans for the above case;

-1<=Sortho(Za)<0
AND
Sortho(Zb)>Sortho(Za)
AND
Xint<=Xb
THEN, SPAN 'B' IN FRONT OF SPAN 'A'
ELSE IF
-1<=Sortho(Za)<0
AND
Sortho(Zb)>Sortho(Za)
AND
Xa'<Xint>=Xb
THEN, SPAN 'A' IN FRONT OF SPAN 'B'
ELSE IF
-1<=Sortho(Za)<0
AND
Sortho(Zb)>Sortho(Za)
AND
Xa'>Xint>=Xb
THEN, SPAN 'A' IN FRONT OF SPAN 'B' TO XINT, THEN SPAN 'B' IN FRONT OF 'A'

When Sortho(Za)=Sortho(Zb) the situation requires a special test to determine span 'A' in front or span 'B' in front. When the span slopes are equal (parallel lines), a special intercept calculation must be determined. The following rules determine such a situation:

Case #5C-1
-1<=Sortho(Za)<-0.5
AND

Sortho(Zb)=Sortho(Za)
AND
Xint(Xb)<=Xb
THEN, SPAN 'B' IN FRONT OF SPAN 'A'
ELSE IF
−1<=Sortho(Za)<−0.5
AND
Sortho(Zb)=Sortho(Za)
AND
Xint(Xb)>Xb
THEN, SPAN 'A' IN FRONT OF SPAN 'B'
Case #5C-2
−0.5<=Sortho(Za)<0
AND
Sortho(Zb)=Sortho(Za)
AND
Zint(Xb)<=Zb
THEN, SPAN 'B' IN FRONT OF SPAN 'A'
ELSE IF
−1<=Sortho(Za)<−0.5
AND
Sortho(Zb)=Sortho(Za)
AND
Zint(Zb)>Zb
THEN, SPAN 'A' IN FRONT OF SPAN 'B'

Thus far, all intercept slopes have had a negative slope span 'A' and a negative span 'B'. For case #6 shown in FIG. 23 the slope for span 'B' is positive. This fact minimizes the number of possible tests to two. One for intersections and the other for vertical spans. Case #6A is solved according to the following;

−1<=Sortho(Za)<0
AND
Sortho(Zb)>0
AND
Xint<=Xb
AND
Slope(Zb) !=+/−1 (vertical)
THEN, SPAN 'B' IN FRONT OF SPAN 'A'
ELSE IF
−1<=Sortho(Za)<0
AND
Sortho(Zb)>0
AND
Xa'<=Xint>Xb
THEN, SPAN 'A' IN FRONT OF SPAN 'B'
ELSE IF
−1<=Sortho(Za)<0
AND
Sortho(Zb)>0
AND
Xa'>Xint>=Xb
THEN, SPAN 'A' IN FRONT OF SPAN 'B' TO XINT,
  THEN SPAN 'B' IN FRONT OF 'A'
IF Vertical, THEN
IF Sortho(Zb)=1
AND
IF Sortho(Za) !=−1

Zint>Zb'
THEN SPAN 'A' IN FRONT OF SPAN 'B'
ELSE IF
IF Sortho(Zb)=1
AND
Zint<=Zb'
THEN SPAN 'B' IN FRONT OF SPAN 'A'
IF Sortho(Zb)=1
AND
IF Sortho(Za)=−1
AND
Za>=Zb'
THEN SPAN 'A' IN FRONT OF SPAN 'B'
ELSE IF
IF Sortho(Zb)=1
AND
Sortho(Za)=−1
AND
Za<Zb'
THEN SPAN 'B' IN FRONT OF SPAN 'A'
ALSO,
IF Sortho(Za)=−1
AND
Sortho(Za)>Sortho(Zb)
THEN SPAN 'A' IN FRONT OF SPAN 'B'
ELSE IF
IF Sortho(Za)=−1
AND
Sortho(Za)<=Sortho(Zb)
THEN SPAN 'B' IN FRONT OF SPAN 'A'

Note: All reasonable 3D rendering rules say that no pixels should be affected by a vertical dz/dx polygon. The 3D execution and/or set-up engine will reject such polygons before they ever get to the X,Y sort or Z-rules engines.

Figure 24:
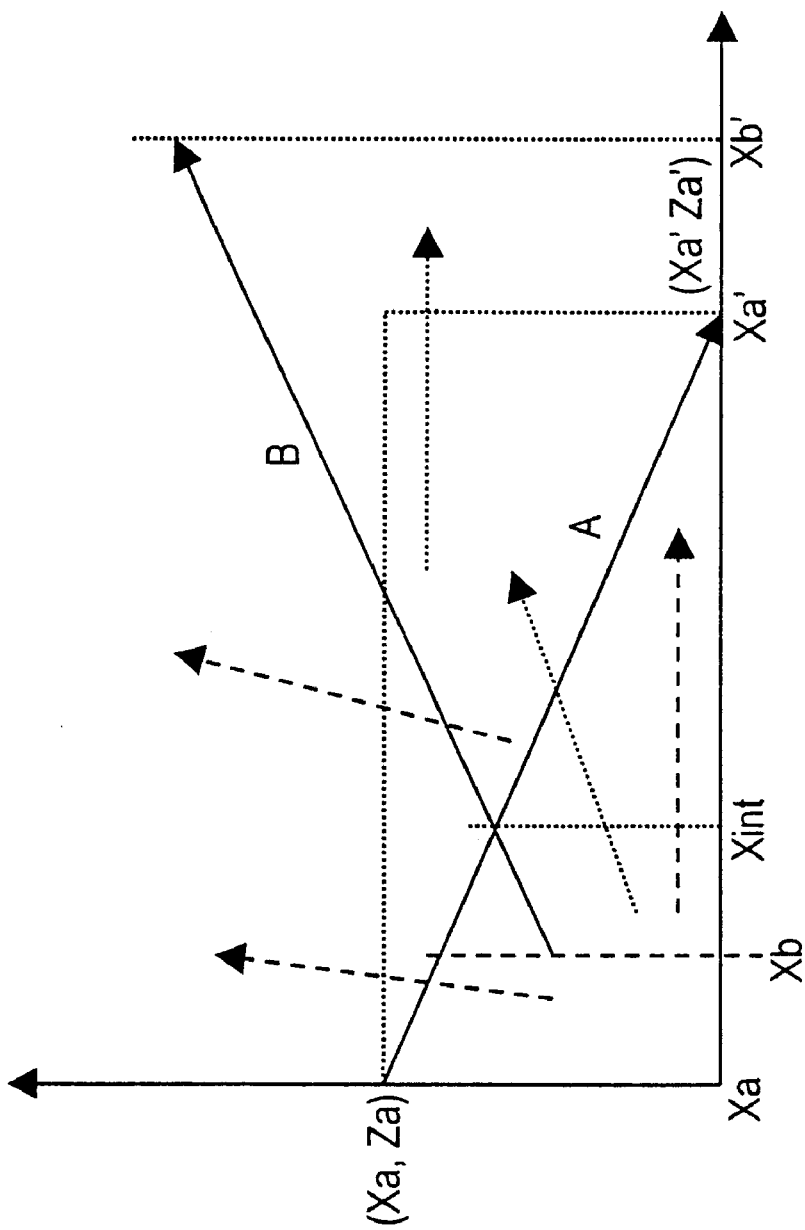

FIG. 24 shows case #7. Here span 'A' has a positive slope and span 'B' has a negative slope. In this case the following sequence will determine hidden span removal;

0<=Sortho(Za)<=1
AND
−1<=Sortho(Zb)<0
AND
Xint<Xb
AND
Sortho(Zb) !=1 (vertical)
THEN, SPAN 'A' IN FRONT OF SPAN 'B'
ELSE IF
0<=Sortho(Za)<=1
AND
−1<=Sortho(Zb)<0
AND
Sortho(Zb) !=1 (vertical)
AND
Xa'>Xint >Xb
THEN, SPAN 'B' IN FRONT TO XINT THEN SPAN 'A'
ELSE IF
0<=Sortho(Za)<=1
AND
−1<=Sortho(Zb)<0

Figure 25:
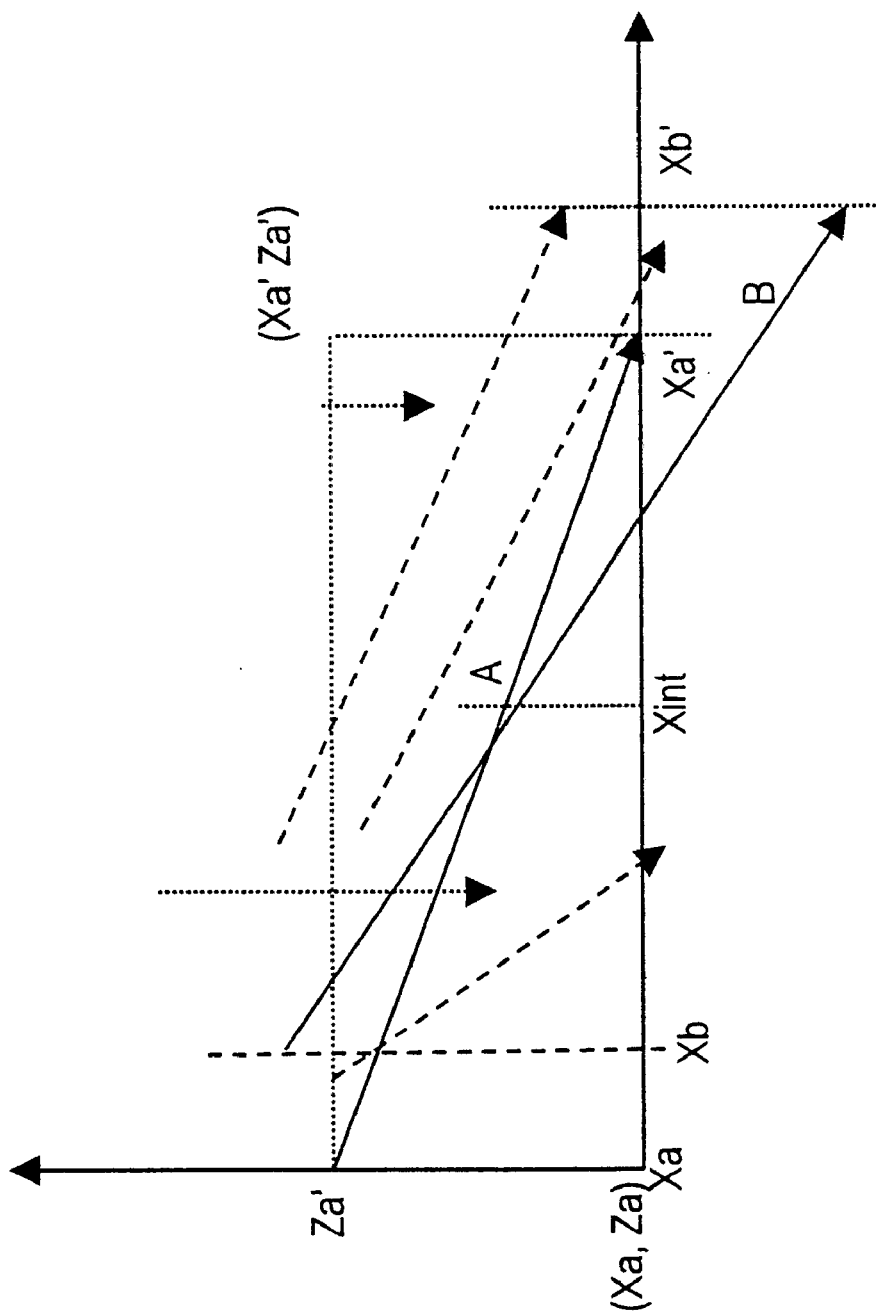

AND
Sortho(Zb) !=1 (vertical)
AND
Xa'<=Xint>=Xb
THEN, SPAN 'B' IN FRONT OF SPAN 'A'
ELSE IF
Sortho(Za)=1
AND
Sortho(Zb) !=−1
AND
Zint>=Za'
THEN SPAN 'B' IN FRONT OF SPAN 'A'
ELSE IF
Sortho(Za)=1
AND
Sortho(Zb) !=−1
AND
Zint<Za'
THEN SPAN 'B' IN FRONT OF SPAN 'A'
ELSE IF
Sortho(Za)=1
AND
Sortho(Zb)=−1
AND
Zb>Za'
THEN SPAN 'B' IN FRONT OF SPAN 'A'
ELSE IF
Sortho(Za)=1
AND
Sortho(Zb)=−1
AND
Za'>Zb
THEN SPAN 'A' IN FRONT OF SPAN 'B'
For FIG. 25, case #8 is shown below;
   0<=Sortho(Za)<=1
AND
Sortho(Za)<Sortho(Zb)
AND
Xint<Xb
AND
Slope(Zb) !=1 (vertical)
THEN, SPAN 'B' IN FRONT OF SPAN 'A'
ELSE IF
0<=Sortho(Za)<=1
AND
Sortho(Za)<Sortho(Zb)
AND
Xa'>=Xint<=Xb
THEN, SPAN 'A' IN FRONT OF SPAN 'B' TO XINT
   THEN SPAN 'A' IN FRONT
ELSE IF
0<=Sortho(Za)<=1
AND
Sortho(Za)<Sortho(Zb)
AND
Xint>=Xb
AND
Slope(Zb) !=1 (vertical)
THEN, SPAN 'A' IN FRONT OF SPAN 'B'
ELSE IF
IF Sortho(Zb)=1
AND
IF Sortho(Za) !=−1
Zb>=Za'
THEN SPAN 'B' IN FRONT OF SPAN 'A'
ELSE IF
IF Sortho(Zb)=1
AND
IF Sortho(Za) !=−1
Zb>=Za'
THEN SPAN 'B' IN FRONT OF SPAN 'A'
ELSE IF
IF Sortho(Zb)=1
AND
IF Sortho(Za)=1
AND
Za'>Zb'
THEN SPAN 'A' IN FRONT OF SPAN 'B'
ELSE IF
IF Sortho(Zb) 1
AND
Sortho(Za)=−1
AND
Zb'>=Za'
THEN SPAN 'B' IN FRONT OF SPAN 'A'

Figure 26:
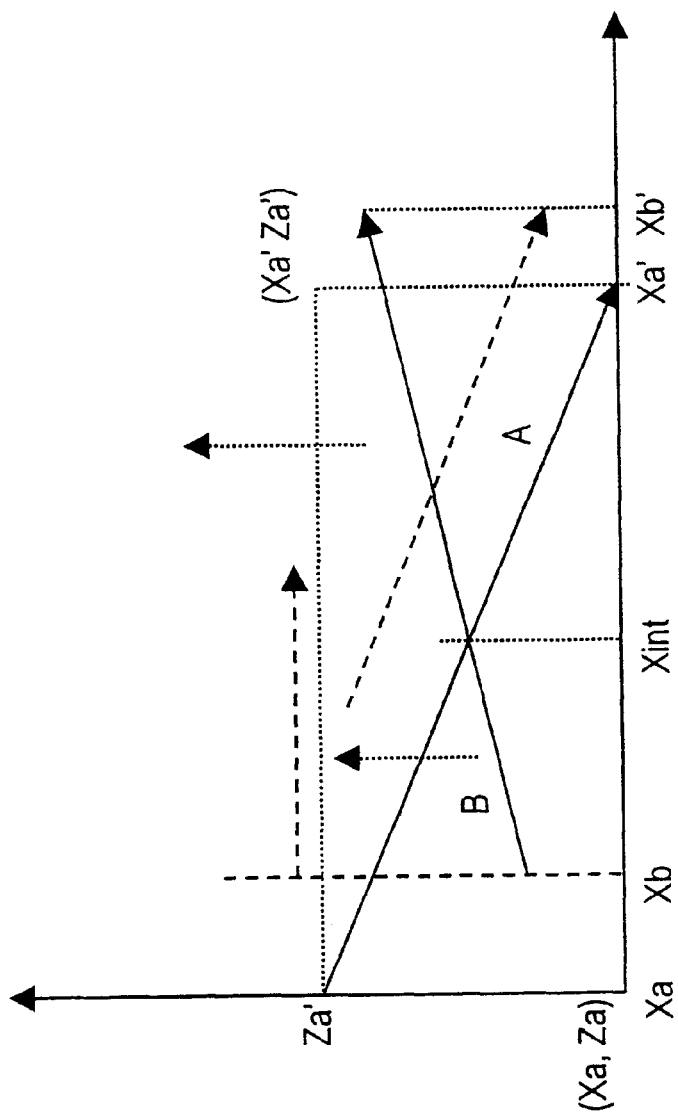

Case #9A can be seen in FIG. 26. Here span 'A' has a positive slope with range of zero to one, and span 'A' has a slope equal to or greater than span 'B'.
1) A in front of B if Xint<=Xb
2) B in front of A to Xint then A in front if Xa'>Xint>Xb
3) B in front of A if Xint>Xa'

Figure 27:
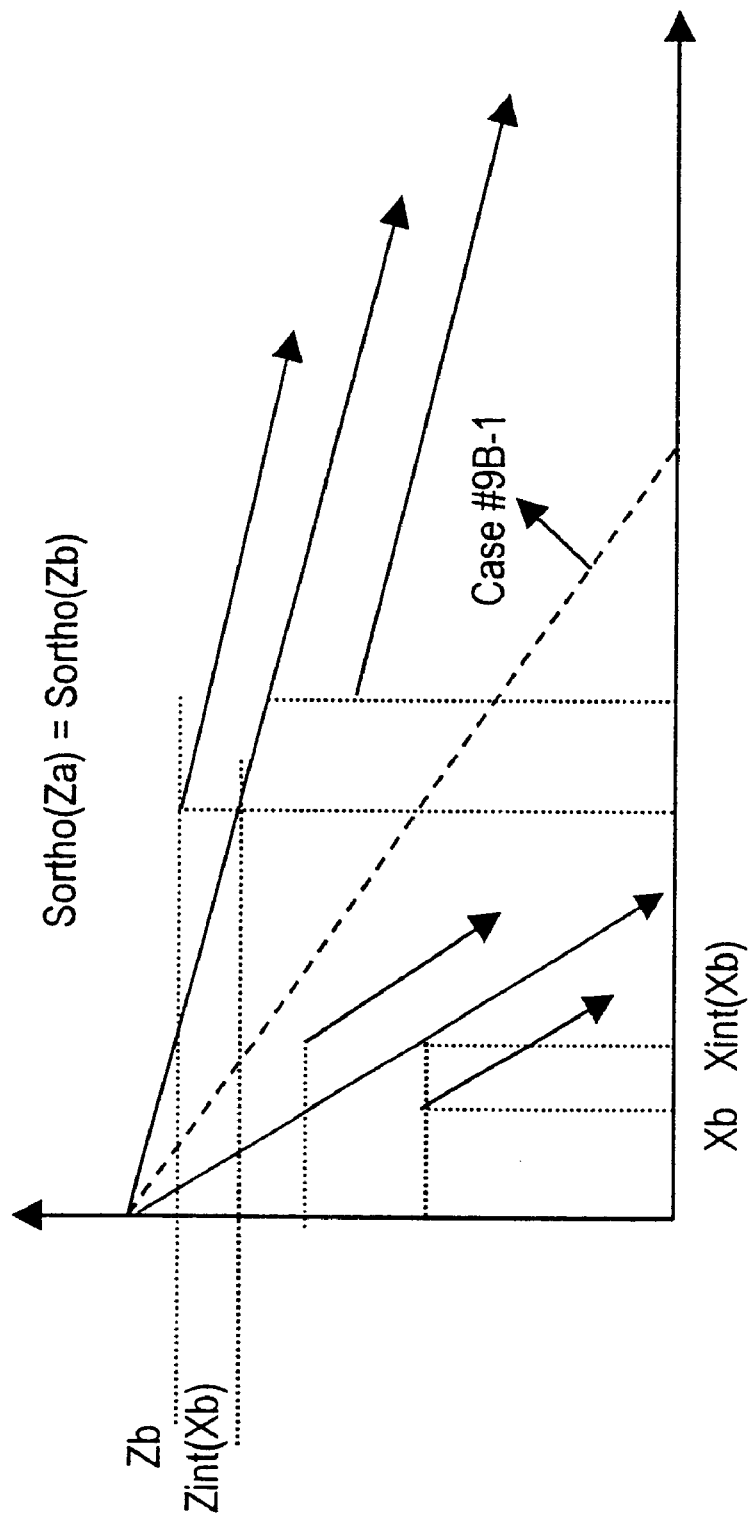

Special Parallel cases #9B-1 and #9B-2 are shown in FIG. 27, For Both cases #9B-1 and #9B-2 the following conditions must be true, Sortho(Za)=Sortho(Zb) and 1<=Sortho(Za)>=0.

In case #9B-1 0<=Sortho(Za)<=0.5, here we must solve for Zint(Xb). If Zint(Xb)>Zb then span 'A' is in front of span 'B'. Likewise if Zint(Xb)<=Zb then it is seen that B is in front if and A.

In case #9B-2 where 0.5<Sortho(Za)<=1, we must solve for Xint(Xb). Similarly if Xint(Xb)>=Xb then span 'B' is in front of span 'A'. Likewise if Xint(Xb)<Xb then span 'A' is in front of span 'B'.

In the preferred embodiment, these nine cases can be tested in dedicated hardware which can determine within a few clock cycles if one span is visible or hidden for complete traversal or partial traversal. In an alternate embodiment, software, firmware or micro-code, can determine hidden surface properties in a few more clock cycles.

The execution engine determines if additional spans must be sorted against one of the original spans for rejection or display. A single span may start, stop, start, stop many times as other multiple spans intersect the single span during x-direction traversal. The 3D-VDRL sort algorithm builds in mask values for spans that continue after being hidden by alternate spans. In addition, in the preferred embodiment for nomenclature sake, the span with the smallest 'X' address (relative to other compare spans) will always be termed the "base span" and alternate compare spans that begin within the run of the base span will be called "compare spans". In this fashion, the complete run of a base span will run through the complete rules-based Z-compare algorithm before entry of the next "base span" which was the previous first alternate "compare" span. Thus, the execution engine works from left to right with each sorted span entry from the sort array holding buffer to determine which segments of the span are visible and which are hidden. A list of triangle pointers is used as a reference with each span segment pointing to the triangle parameters for later processing by the 3D-VDRL engine.

The following is an example of multiple spans and how the execution engine builds the 3D-VDRL for each span.

Figure 28:
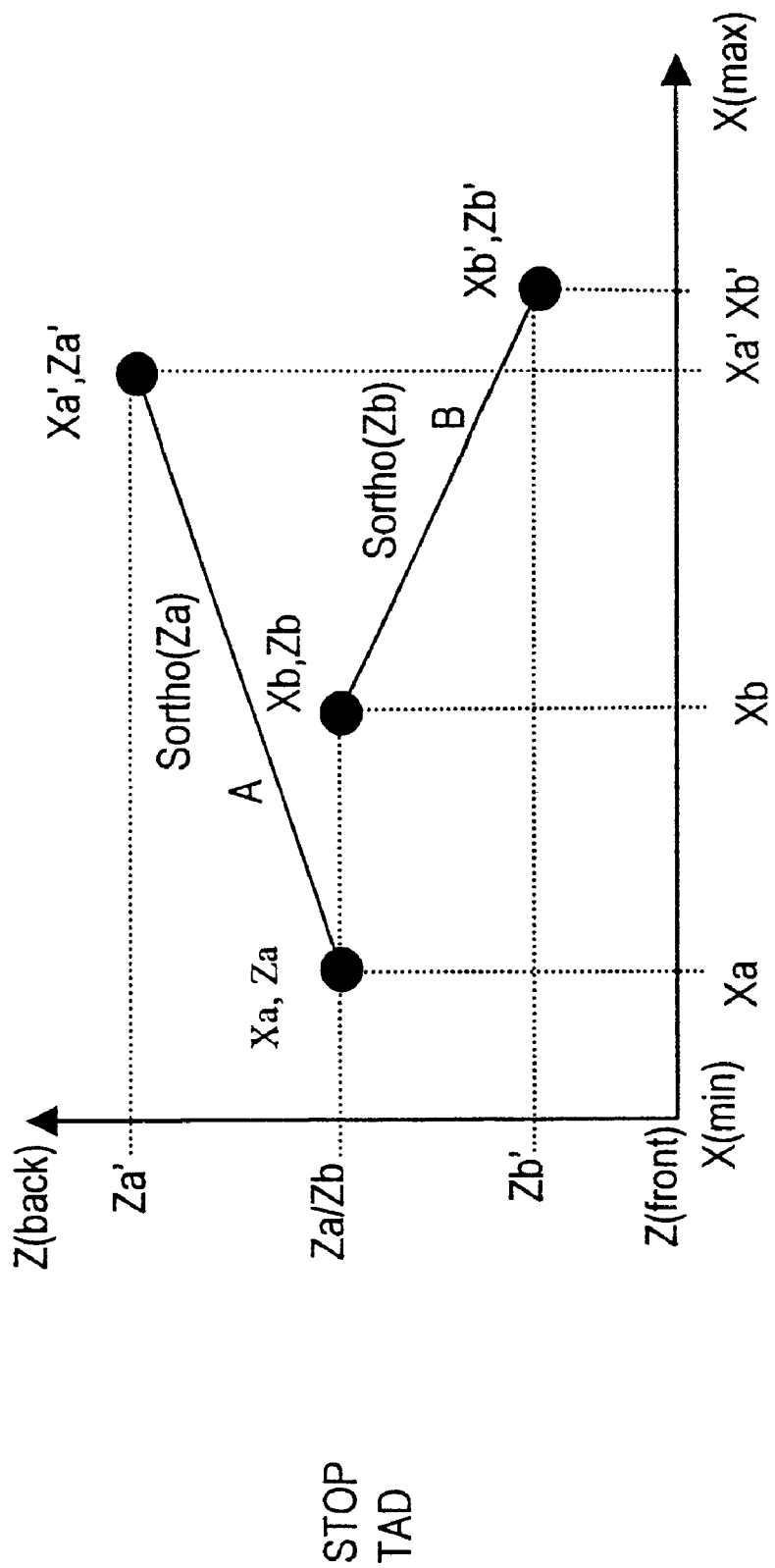
FIG. 28 illustrates how a new triangle starts and continues with an intermediate triangle embedded in the middle.

It can be assumed that the results from the fast sort array is Xa, Xb, ... Xn which indicate the leftmost X coordinate of each span. As shown in FIG. 28 A, Xa<Xb and Xa'>=Xb thus in this case span Xa is studied with the question is Za>Zb? Line B begins before line A ends, i.e. Xb<=Xa', i.e. Sortho(Za) is negative and Sortho(Zb) is a positive slope. For this particular case, Za=Zb and Xa!=Xb and the sign of Slope(Za) is opposite the sign Slope(Zb). This implies that the lines do not intersect.

The z-rules sub-block, controlled by the execution engine determines when and where (if any) overlapped triangle span segments cross. It is here where the execution engine or in an alternate embodiment an off-chip CPU begins to build the 3D video refresh display list. The result is the construction of a list of Xstart positions where pointers are used to assemble texture, color and lighting values for individual portions of the triangle fill process. Within such display lists for 3D objects is the start address for texture map reads or in a preferred embodiment a separate "render-mode" state and/or object array.. This data is assembled during VDRL engine processing of the display list. When triangles overlay or are hidden by other triangles, the process of building the 3DVDRL are altered.

FIG. 28 illustrates how a new triangle starts and continues with an intermediate triangle embedded in the middle.

3-D VDRL Execution

As the Execution engine, external CPU, RISC, or DSP processors, build the 3-D VDRL, the compression unit, preferably located within the memory controller unit, may compress the 3-D VDRL for storage into the system or off-screen frame buffer memory. This process is completed for each span line such that a plurality of compressed span lines are represented by a plurality of 3-D VDRLs which are linked together to form a display object ready for 3-D VDRL execution. In alternate embodiments, a single or partial 3-D VDRL(s) can be constructed with no span line or segment limit on the compression block size. Building a 3-D VDRL and storing a plurality of 3-D VDRL's (as in objects) allows independent draw rates and positions of objects on the display. These display objects are under control of the application specific interface program. Thus, decoupling the building of the virtual display list from the execution of the virtual display lists greatly improves multi-object synchronization, positions, draw-rates and also reduces the redraw timing as compared to prior art frame buffer based 3D architectures.

In the preferred embodiment, a VDRL engine reads the compressed 3-D VDRL, and decompresses the 3-D VDRL far in advance of actual triangle segment fill and rasterization performed by the Graphics Engine. In the preferred embodiment, a pre-fetch and decode of the 3-D VDRL will issue memory read (texture or source data reads) operation in advance of the rasterization process of the graphics engine. This greatly improves the throughput compared to conventional graphics engines that must wait for source data prior to rasterization through the graphics engine. Thus, the prefetch of 3-D VDRL instructions allows the internal cache memory to be filled with source information prior to the actual consumption of such source information by the Graphics Engine.

When all the source data is present, as indicated by the attributes and source addresses contained within the 3-D VDRL, the graphics engine proceeds with span segment fill and color processing operations. The present invention's performance is highly dependent on the amount of on-chip storage memory. Storage memory can hold pre-fetched 3-D VDRL instructions, in-scope triangle static data parameters, compressed texture blocks, and temporary storage for output span segments prior to compression back into off-screen or system memory. Thus, performance of the present invention scales with on-chip memory storage.

Static triangle data is maintained for in-scope triangles in the on-chip cache. Static data comprises all the orthogonal attributes, source addresses and parameter switches to fill individual span segments of each individual primitive. Attributes for orthogonal color slopes, diffuse and specular lighting, textures perspectives, Anti-aliasing sub-pixel information, span segment lengths, etc. are stored for entry into the Graphics Engine iteration and texture mapping units.

It should be noted that either compressed or non-compressed data formats are available in addition to Quality of Service of the compression as directed by the 3-D VDRL attributes assembled in to the virtual display list. Thus, objects that need less QoS will require even less bandwidth as the compression ratio can be dynamically adjusted on a per object of window basis, as indicated in patent disclosure entitled "Bandwidth reducing memory controller including scalable embedded parallel data compression and decompression" who's inventors are Thomas A. Dye, Manuel J. Alvarez II, and Peter Geiger.

During execution of the 3-D VDRL, multiple data is required. The 3-D VDRL will indicate in-scope triangle pointers which in-turn point to triangle static data needed to load the on-chip iteration units for orthogonal span segment fill. In addition, the 3-D VDRL will indicate the texture map source addresses Quality of Service (QoS) used for the decompression process prior to the texture mapping procedure in the Graphics Engine.

Graphics source data is preferably read into the on-chip cache memories for consumption by the Graphics Engines iteration and texture mapping units. In addition, the cache controllers for the Graphics Engine maintain a list of "in-Scope" primitives and manage the data reads and writes of the on-chip cache memories.

Completion of the 3-D VDRL execution process occurs when the Graphics Engine outputs the final span segments into either on-chip serial shift registers for display output or back to system memory. In alternate embodiments, the Graphics Engine may write the completed span segments back into off-screen memory such as frame buffer storage for display refresh at a later time. When the 3-D VDRL execution results are written back to memory for refresh at an alternate time, it should be noted that final objects may then be treated as 2-D VDRL objects and assembled into the normal video display refresh list for presentation on the display surface. This process of 2-D VDRL for output preferably uses the same VDRL pre-fetch engine, Graphics Engine, and output shift registers as used during execution of the 3-D VDRL. Thus, the present invention uses a single engine for draw data as for refresh data greatly reducing the gate count of implementation over prior art architectures.

Texture Mapping

In the present invention, textures maps are applied to each span segment as needed and under the direction of both the triangle static data values and the 3-D VDRL. In an alternate embodiment, to speed up the texture mapping and avoid context switches between segments that have alternate texture map source addresses, an extra stage can be added following the Z-rules engine. This stage is used to sort the remaining "visible" segments by texture number on either a per span line or scene basis. Thus, span segments that reference the same base texture map will be rendered together. When the above method is used per span-line, segments are rendered "out of order" (X-span direction) back to a line buffer which when output to display memory or refreshed to the monitor is addressed such that output data is written back "in-order". The same process can be done on an entire scene. In this case, all triangle spans for the entire scene are rendered together based on a reference to the same texture number. This method will be desirable as process and device speeds increase in the future. Currently, this method requires too large an overhead to be economically feasible using today's process technology.

The preferred method for organization and management of textures as source data is to use lossy data compression and decompression. Setting the QoS to "lossy" on an individual texture map basis allows for adjustment of the quality thus limiting the bandwidth and allowing operation on a variety of different performance machines. The IMC invention uses two cache buffers a compressed texture L2 cache and a non-compressed texture L1 cache. The 3D engine requests texture sources addresses based on the information located in the 3-D VDRL stream. This information is processed in advance of the actual rasterization of triangle span segments to ensure low latency operation. Texture map data has been compressed either by the original source of the application or by the compression engine of the IMC invention. Using the IMC compression engine gives the application programs more flexibility because they do not require a proprietary compression of data on their release medium. In addition, the IMC can compress the textures to a number of quality levels and compression ratios. During the actual run-time texture decompression process, the IMC invention reads the compressed source map data into the L2 compression cache located within the cross-bounds memory controller. The invention includes a high speed parallel decompression engine which reads and decompresses the compressed data from an L2 texture cache to an L1 texture cache. This method allows for more texture source to be resident on-chip for the texture mapping operation of the graphics engine. Thus, by use of a two tiered texture cache approach, and the use of compressed textures, texture map information is more likely to reside on-chip.

Process Pipeline

The IMC invention uses multiple stages of data flow pipelines to increase real time rasterization performance. These stages partition the entire process, so while one stage is in operation of one set of data type another is working on a different set. This data flow pipeline works well for streaming data such as video and graphics. This present invention separates the 3D data preparation and formatting from the 3D drawing, and from the actual refresh and display generation. Each of these data pipes is further reduced to additional data flow pipelines. For example, for retained mode operation, independent triangle generation, 3D-setup, and the Y-sort processes the entire scene prior to segment generation and the X-Sort (stage1) process for an entire span line. The X-Sort (stage-2) processes entire span sub-lines before the Z-rules and 3-D VDRL output generation proceed. This then concludes the 3D data preparation stage which occurs before the 3-D VDRL read and interpretation (3-D VDRL execution) by the VDRL engine and Graphics drawing engine. During this phase, the 3-D VDRL is read, and decompressed prior to the texture source address generation and read of compressed textures into the L2 compression cache. The 3D engine then processes all input source streams and outputs the results either directly to the DAC or preferably to a temporary off-screen storage surface. Once the 3D data is rasterized to off-screen memory, the 2-D VDRL process sees that a new source address is ready for refresh of the 3D surface to the display output device. The Refresh of data to the display output device is under control of the 2-D VDRL where the data preferably compressed for decompression and display to the output device. All these stages are pipelined such that while one stage is working on current data, other stages are working on previous more recent data. Thus, he present invention provides a balanced method of continual 3D output in a span by span rolling manner. The generation of each stage is dependent on results of the previous stage but is sufficiently de-coupled via external memory buffers that are compressed for faster access and less external memory bandwidth requirements. Thus the IMC architecture results in superior performance over architecture of prior art for continuous span generation using multiple media data types such as streaming video and graphics.

Memory Formats

Storage of pixels is preferably in multiple formats, supporting a different number of bits per pixel for independent objects and windows. Some of these formats are color expanded before entry into the graphics engine and then color compacted for storage back into the main memory. For pixel formats of eight or fewer bits per pixel, a lookup register(s) color conversion process (textures and color) expands the format to A,R,G,B of eight bits each as required by the graphics engine. The data storage format and word length for pixels stored in main memory is indicated below. In one embodiment, this memory configuration it is assumed that one parity bit per byte is used for parity data and for graphical display surfaces such extra bit per byte is used for anti-aliasing according to the present invention. This implies a 72 bit memory word becomes the base size for this implementation, or for preferred output format a 3,5,6,5 video pixel is used. Another way to look at this is that the parity and error in the main memory is not required for parity of graphical data and can be used for special formats of pixel data. In the preferred embodiment, a reuse parity bit is not used and an edge buffer is used for anti-aliasing support.

In summary, the pointer-based display list video refresh system and method of the present invention removes system bottle-necks and greatly increases performance when dealing with 2D/3D within a streaming video or graphical system. The system and method of the present invention uses a high level graphical protocol between the CPU and the IMC which reduces bus traffic and greatly increases bus bandwidth. Thus, in the preferred embodiment, a command stream of 3D Ordered vertex pointer lists, and associated vertex data is presented to the IMC for parameterization (via the internal execution unit), hidden surface removal (via the rules based depth buffer and fast sort core), and scan conversion by building a 3D virtual display refresh list. Execution of such list by the 3D-VDRL engine assembles graphical and video data (via the graphics engine) for data creation and manipulation which then outputs such data to the display device. Operations may be a combination of on-chip memory or system memory reads and writes either under control of the execution engine, or the video refresh engine(s). In the preferred embodiment, the 3D display surface operations located in the system memory are accomplished by pointer manipulation to such 3D data and not by the transfer of such data across the computer system or peripheral buses. This novel invention is a significant advance over the operation of current computer architectures and their associated graphic display subsystems.

Therefore, the present invention comprises a novel system and method for rendering and/or displaying 3D objects using a span line based method, wherein the method provides greatly increased performance over prior art designs.

We claim:

1. A method for rendering one or more three dimensional images, the method comprising:

receiving geometry data, wherein the geometry data includes a plurality of parameters defining a plurality of vertices, wherein said plurality of vertices are usable to form a plurality of polygon primitives, and wherein said plurality of polygon primitives represent a surface of at least one three-dimensional object;

constructing a 3D virtual display refresh list in a memory in response to the geometry data, wherein said constructing comprises:

performing setup on polygons defined by said vertices, wherein said performing setup includes assembling a list of the parameters for each of the vertices and determining slope values for the polygon edges;

positioning the polygons in a spanning manner using the vertices of the polygons and the slope values for the polygon edges; and constructing the 3D virtual display refresh list for each span line, the 3D virtual display refresh list comprising pointers which reference viewed polygon spans;

executing the 3D virtual display refresh list, wherein said executing includes reading the virtual display refresh list and generating pixel data in response thereto, wherein the pixel data is useable for rendering the one or more three dimensional images on a display device.

2. The method of claim 1, further comprising:

storing the pixel data into a system memory after said executing.

3. The method of claim 2, wherein the method operates to render the three dimensional images on a display screen of a display device, the method further comprising:

accessing the pixel data from the system memory; and displaying said pixel data on the display screen of the display device in response to said accessing, wherein the pixel data is displayed in a spanning manner, wherein said displaying displays the one or more three dimensional images on the display screen.

4. The method of claim 1, wherein the method operates to render the three dimensional images on a display screen of a display device, the method further comprising:

displaying said pixel data on the display screen of the display device in response to said executing, wherein the pixel data is displayed in a spanning manner, wherein said displaying displays the one or more three dimensional images on the display screen.

5. The method of claim 1, wherein said positioning the polygons in a spanning manner comprises positioning the polygons in a manner corresponding to how the polygons are displayed on a display device.

6. The method of claim 1, wherein said positioning the polygons in a spanning manner comprises:

performing a Y sort of the polygons to sort the polygons in a Y order; and performing an X sort of triangle segments for each span line.

7. The method of claim 1, further comprising:

performing a Z rules determination for each span line to eliminate unseen portions of polygons, wherein the Z rules determination is performed after said positioning the polygons in the spanning manner.

8. The method of claim 7, wherein said performing the Z rules determination operates to eliminate unseen triangle segments for one or more span lines.

9. The method of claim 1, further comprising:

compressing said pixel data to produce compressed pixel data;

storing said compressed pixel data into a memory;

decompressing said compressed pixel data after said storing to produce uncompressed pixel data; and displaying said uncompressed pixel data on the display screen of the display device after said decompressing, wherein said displaying displays the one or more 3D images.

10. The method of claim 1, wherein the 3D virtual display refresh list contains information to determine changes in a rasterization state of triangle span segments; and wherein said rasterization state is synchronized with the flow of 3D VDRL data through a 3D graphics engine.

11. The method of claim 1, wherein said constructing the 3D virtual display refresh list is performed a plurality of times to produce a plurality of 3D virtual display refresh lists;

wherein said executing comprises executing the plurality of 3D virtual display refresh lists to generate the pixel data.

12. The method of claim 1, further comprising:

storing polygon static data in a memory;

wherein said constructing the 3D virtual display refresh list includes utilizing the polygon static data in constructing the 3D virtual display refresh list.

13. The method of claim 12, wherein the 3D virtual display refresh list references a plurality of texture map source addresses;

wherein said executing includes accessing texture data using the texture map source addresses and generating at least a subset of the pixel data in response to the texture data.

14. The method of claim 12, wherein 3D virtual display refresh list references a plurality of compressed texture map source addresses;

wherein said executing includes:

reading the virtual display refresh list;

reading a plurality of compressed texture map source data using the texture map source addresses;

decompressing said compressed texture map source data to produce uncompressed texture map source data;

generating at least a subset of the pixel data in response to the uncompressed texture map source data.

15. The method of claim 12, wherein constructing and executing the 3D virtual display refresh list uses data cache management for improved performance; the method further comprising:

storing at least a portion of said polygon static data in a cache memory, wherein said storing includes performing allocation and reallocation of static data storage for constructing and/or executing the 3D virtual refresh list.

16. The method of claim 1, wherein the pixel data corresponds to the viewed polygon spans.

17. The method of claim 1, wherein the polygons are triangles;
wherein the 3D virtual display refresh list comprises pointers which reference viewed triangle spans; and
wherein the pixel data corresponds to the viewed triangle spans.

18. A method for rendering one or more three dimensional images, the method comprising:
receiving geometry data, wherein the geometry data includes a plurality of parameters defining a plurality of vertices, wherein said plurality of vertices are usable to form a plurality of polygon primitives, and wherein said plurality of polygon primitives represent a surface of at least one three-dimensional object;
constructing a 3D virtual display refresh list in a memory, wherein the 3D virtual display refresh list comprises pointers which reference viewed polygon spans, wherein said pointers reference the viewed polygon spans in a spanning manner as the viewed polygon spans are rendered on a display device; and
executing the 3D virtual display refresh list, wherein said executing includes reading the virtual display refresh list and generating pixel data in response thereto, wherein the pixel data is useable for rendering the one or more three dimensional images on a display device.

19. The method of claim 18, wherein said constructing the 3D virtual display refresh list comprises:
performing setup on polygons defined by said vertices, wherein said performing setup includes assembling a list of the parameters for each of the vertices and determining slope values for the polygon edges;
positioning the polygons in a spanning manner using the vertices of the polygons and the slope values for the polygon edges; and
constructing the 3D virtual display refresh list for each span line.

20. The method of claim 18, wherein the method operates to render the three dimensional images on a display screen of a display device, the method further comprising:
displaying said pixel data on the display screen of the display device after said executing, wherein said displaying displays the one or more three dimensional images on the display screen.

21. A system for rendering one or more three dimensional images, the system comprising:
an input for receiving geometry data, wherein the geometry data includes a plurality of parameters defining a plurality of vertices, wherein said plurality of vertices are usable to form a plurality of polygon primitives, and wherein said plurality of polygon primitives represent a surface of at least one three-dimensional object;
a memory for storing data;
a first engine coupled to the memory for constructing a 3D virtual display refresh list in the memory, wherein the first engine is operable to:
perform setup on polygons defined by said vertices, wherein said setup includes assembling a list of the parameters for each of the vertices and determining slope values for the polygon edges;
position the polygons in a spanning manner using the vertices of the polygons and the slope values for the polygon edges; and
construct the 3D virtual display refresh list for each span line, the 3D virtual display refresh list comprising pointers which reference viewed polygon spans; and
a second engine for executing the 3D virtual display refresh list, wherein the second engine is executable to read the virtual display refresh list and generate pixel data in response thereto, wherein the pixel data is useable for rendering the one or more three dimensional images on a display device.

22. The system of claim 21, wherein the pixel data is stored in the memory for later display.

23. The system of claim 21, wherein, in positioning the polygons in a spanning manner, the first engine is operable to:
perform a Y sort of the polygons to sort the polygons in a Y order; and
perform an X sort of triangle segments for each span line.

24. The system of claim 21, wherein the first engine is further operable to performing a Z rules determination for each span line to eliminate unseen portions of polygons, wherein the Z rules determination operates to eliminate unseen triangle segments for one or more span lines.

25. The system of claim 21, further comprising:
a display device coupled to the second engine;
wherein the second engine is operable to provide signals to the display device corresponding to the pixel data, and wherein the display device is operable to display the one or more three dimensional images on the display screen in response to the signals.

26. The system of claim 25, wherein the polygons are positioned in a spanning manner corresponding to how the polygons are displayed on the display device.

27. The system of claim 25, further comprising:
a compression/decompression engine, wherein the compression/decompression engine is operable to compress said pixel data to produce compressed pixel data and store said compressed pixel data into the memory;
wherein the compression/decompression engine is further operable to decompress said compressed pixel data to produce uncompressed pixel data and provide the uncompressed pixel data to the display device for display.

28. The system of claim 21, wherein the 3D virtual display refresh list contains information to determine changes in a rasterization state of triangle span segments; and
wherein said rasterization state is synchronized with the flow of 3D VDRL data through the second engine.

29. The system of claim 21, wherein the first engine is operable to construct a plurality of 3D virtual display refresh lists;
wherein the second engine is operable to execute the plurality of 3D virtual display refresh lists to generate the pixel data.

30. The system of claim 21,
wherein the memory stores polygon static data;
wherein the second engine is operable to utilize the polygon static data in constructing the 3D virtual display refresh list.

31. The system of claim 30, wherein the 3D virtual display refresh list references a plurality of texture map source addresses;
wherein, in executing the 3D virtual display refresh list, the second engine is operable to access texture data using the texture map source addresses and generate at least a subset of the pixel data in response to the texture data.

32. The system of claim 30, further comprising:
a compression/decompression engine;
wherein 3D virtual display refresh list references a plurality of compressed texture map source addresses;
wherein, in executing the 3D virtual display refresh list, the second engine is operable to:
read the virtual display refresh list;
read a plurality of compressed texture map source data using the texture map source addresses;
wherein the compression/decompression engine is operable to decompress the compressed texture map source data to produce uncompressed texture map source data; and
generate at least a subset of the pixel data in response to the uncompressed texture map source data.

33. The system of claim 30, further comprising:
a cache memory for storing at least a portion of said polygon static data, wherein the first and second processors are coupled to the cache memory and are operable to perform allocation and reallocation of static data storage in the cache memory for constructing and/or executing the 3D virtual refresh list.

34. A system for rendering one or more three dimensional images, the system comprising:
an input for receiving geometry data, wherein the geometry data includes a plurality of parameters defining a plurality of vertices, wherein said plurality of vertices are usable to form a plurality of polygon primitives, and wherein said plurality of polygon primitives represent a surface of at least one three-dimensional object;
a memory for storing data;
a first engine coupled to the memory for constructing a 3D virtual display refresh list in the memory, wherein the 3D virtual display refresh list comprises pointers which reference viewed polygon spans; and
a second engine for executing the 3D virtual display refresh list, wherein the second engine is executable to read the virtual display refresh list and generate pixel data in response thereto, wherein the pixel data is useable for rendering the one or more three dimensional images on a display device.

35. The system of claim 34, wherein, in constructing the 3D virtual display refresh list, the first engine is operable to:
perform setup on polygons defined by said vertices, wherein said setup includes assembling a list of the parameters for each of the vertices and determining slope values for the polygon edges;
position the polygons in a spanning manner using the vertices of the polygons and the slope values for the polygon edges; and
construct the 3D virtual display refresh list for each span line.

36. A method for rendering one or more three dimensional images, the method comprising:
receiving geometry data, wherein the geometry data includes a plurality of parameters defining a plurality of vertices, wherein said plurality of vertices are usable to form a plurality of line primitives, and wherein said plurality of line primitives represent a surface of at least one three-dimensional object;
constructing a 3D virtual display refresh list in a memory in response to the geometry data, wherein the 3D virtual display refresh list is constructed for a plurality of span lines, wherein the 3D virtual display refresh list comprises pointers which reference viewed line primitives;
executing the 3D virtual display refresh list, wherein said executing includes reading the virtual display refresh list and generating pixel data in response thereto, wherein the pixel data is useable for rendering the one or more three dimensional images on a display device.

37. The method of claim 36, wherein said constructing the 3D virtual display refresh list comprises:
performing setup on the line primitives defined by said vertices, wherein said performing setup includes assembling a list of the parameters for each of the vertices;
positioning the line primitives in a spanning manner using vertex position information of the vertices; and
constructing the 3D virtual display refresh list for each span line.

38. The method of claim 37, wherein said positioning the line primitives in a spanning manner comprises:
performing a Y sort of the line primitives to sort the line primitives in a Y order; and
performing an X sort of vertices for position within each span line.

39. The method of claim 37, further comprising:
performing a Z rules determination for each span line to eliminate unseen lines, wherein the Z rules determination is performed after said positioning the line primitives in the spanning manner.

40. The method of claim 36, further comprising:
displaying said pixel data on the display screen of the display device in response to said executing, wherein the pixel data is displayed in a spanning manner, wherein said displaying displays the one or more three dimensional images on the display screen.

41. A method for rendering one or more three dimensional images, the method comprising:
receiving geometry data, wherein the geometry data includes a plurality of parameters defining a plurality of vertices, wherein said plurality of vertices are usable to form a plurality of point primitives, and wherein said plurality of point primitives represent a surface of at least one three-dimensional object;
constructing a 3D virtual display refresh list in a memory in response to the geometry data, wherein said constructing comprises:
performing setup on points defined by said vertices, wherein said performing setup includes assembling a list of the parameters for each of the vertices;
positioning the points in a spanning manner using vertex position information of the points; and
constructing the 3D virtual display refresh list for each span line, the 3D virtual display refresh list comprising pointers which reference viewed points; and
executing the 3D virtual display refresh list, wherein said executing includes reading the virtual display refresh list and generating pixel data in response thereto, wherein the pixel data is useable for rendering the one or more three dimensional images on a display device.

42. The method of claim 41, further comprising:
displaying said pixel data on the display screen of the display device in response to said executing, wherein the pixel data is displayed in a spanning manner, wherein said displaying displays the one or more three dimensional images on the display screen.

* * * * *